US010111099B2

(12) United States Patent
Hunt et al.

(10) Patent No.: US 10,111,099 B2
(45) Date of Patent: *Oct. 23, 2018

(54) DISTRIBUTING CONTENT IN MANAGED WIRELESS DISTRIBUTION NETWORKS

(71) Applicant: Microsoft Technology Licensing, LLC, Redmond, WA (US)

(72) Inventors: Brandon T. Hunt, Redmond, WA (US); Alexander Burba, Seattle, WA (US); Michael J. Gallop, Sammamish, WA (US); Frank R. Morrison, III, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,785

(22) Filed: May 12, 2014

(65) Prior Publication Data
US 2015/0327068 A1 Nov. 12, 2015

(51) Int. Cl.
*G06F 21/10* (2013.01)
*H04W 12/08* (2009.01)
(Continued)

(52) U.S. Cl.
CPC ............ *H04W 12/08* (2013.01); *G06F 21/10* (2013.01); *H04L 63/10* (2013.01); *H04L 67/104* (2013.01); *H04W 84/18* (2013.01)

(58) Field of Classification Search
CPC ....... H04W 12/08; H04W 84/18; H04W 4/08; H04L 63/10; H04L 67/104; H04L 67/108;
(Continued)

(56) References Cited

U.S. PATENT DOCUMENTS 4,868,653 A 9/1989 Golin et al.
5,060,170 A 10/1991 Bourgeois
(Continued)

FOREIGN PATENT DOCUMENTS

CN 1622646 6/2005
CN 1830025 9/2006
(Continued)

OTHER PUBLICATIONS

"Centrally Managed Wireless Networks", Retrieved From: <http://www.burconix.com/?p=services-centrally-managed-wireless> Nov. 18, 2013, Sep. 5, 2013, 2 Pages.
(Continued)

*Primary Examiner* — Mohammed Waliullah
(74) *Attorney, Agent, or Firm* — Rainier Patents, P.S.

(57) ABSTRACT

Multiple portions of protected content to host on a device are identified by the device, the multiple portions including one or more portions of each of one or more pieces of protected content. The multiple portions are obtained and stored on the device. The device is one of multiple devices in a managed wireless distribution network that allows portions of protected content to be transferred among the multiple devices via multiple wireless networks hosted by various ones of the multiple devices, and the device is configured to store portions of protected content that can be consumed by a user of the device only if the user of the device has permission to consume the protected content. Participation of the device in the managed wireless distribution network can also be identified, and a reward generated based on the participation of the device in the managed wireless distribution network.

20 Claims, 14 Drawing Sheets

(51) Int. Cl.
*H04L 29/06* (2006.01)
*H04L 29/08* (2006.01)
*H04W 84/18* (2009.01)

(58) Field of Classification Search
CPC .......... H04L 29/08306; H04L 65/4084; G06F 21/10; G06F 17/30206; G06F 2221/0788
USPC .......................................................... 726/4
See application file for complete search history.

(56) References Cited

U.S. PATENT DOCUMENTS

| | | |
|---|---|---|
| 5,149,919 A | 9/1992 | Greanias et al. |
| 5,241,682 A | 8/1993 | Bryant et al. |
| 5,353,133 A | 10/1994 | Bernkopf |
| 5,450,586 A | 9/1995 | Kuzara et al. |
| 5,475,425 A | 12/1995 | Przyborski et al. |
| 5,544,258 A | 8/1996 | Levien |
| 5,687,011 A | 11/1997 | Mowry |
| 5,717,957 A | 2/1998 | Lin |
| 5,778,404 A | 7/1998 | Capps et al. |
| 5,831,594 A | 11/1998 | Tognazzini et al. |
| 5,867,709 A | 2/1999 | Klencke |
| 5,903,566 A | 5/1999 | Flammer, III |
| 5,956,479 A | 9/1999 | McInerney et al. |
| 5,964,879 A | 10/1999 | Dunstan |
| 6,028,960 A | 2/2000 | Graf et al. |
| 6,151,643 A | 11/2000 | Cheng et al. |
| 6,167,337 A | 12/2000 | Gillick et al. |
| 6,167,377 A | 12/2000 | Gillick et al. |
| 6,185,528 B1 | 2/2001 | Fissore |
| 6,232,972 B1 | 5/2001 | Arcuri et al. |
| 6,263,308 B1 | 7/2001 | Heckerman et al. |
| 6,282,709 B1 | 8/2001 | Reha et al. |
| 6,283,858 B1 | 9/2001 | Hayes et al. |
| 6,297,825 B1 | 10/2001 | Madden et al. |
| 6,339,437 B1 | 1/2002 | Nielsen |
| 6,349,406 B1 | 2/2002 | Levine et al. |
| 6,374,369 B1 | 4/2002 | O'Donnell |
| 6,389,181 B2 | 5/2002 | Shaffer et al. |
| 6,452,597 B1 | 9/2002 | Goldberg et al. |
| 6,452,915 B1 | 9/2002 | Jorgensen |
| 6,603,491 B2 | 8/2003 | Lemelson et al. |
| 6,683,982 B1 | 1/2004 | Kohn |
| 6,757,027 B1 | 6/2004 | Edwards et al. |
| 6,847,386 B2 | 1/2005 | Paleiov |
| 6,854,073 B2 | 2/2005 | Bates et al. |
| 6,879,709 B2 | 4/2005 | Tian et al. |
| 6,934,370 B1 | 8/2005 | Leban et al. |
| 6,970,947 B2 | 11/2005 | Ebling et al. |
| 7,082,211 B2 | 7/2006 | Simon et al. |
| 7,146,296 B1 | 12/2006 | Carlbom et al. |
| 7,171,432 B2 | 1/2007 | Wildhagen |
| 7,194,114 B2 | 3/2007 | Schneiderman |
| 7,200,561 B2 | 4/2007 | Moriya et al. |
| 7,251,812 B1 | 7/2007 | Jhanwar et al. |
| 7,254,257 B2 | 8/2007 | Kim et al. |
| 7,337,112 B2 | 2/2008 | Moriya et al. |
| 7,370,043 B1 | 5/2008 | Shelton et al. |
| 7,380,003 B1 | 5/2008 | Guo et al. |
| 7,387,539 B2 | 6/2008 | Trenne |
| 7,400,439 B2 | 7/2008 | Holman |
| 7,443,791 B2 | 10/2008 | Barrett et al. |
| 7,443,807 B2 | 10/2008 | Cutler |
| 7,458,825 B2 | 12/2008 | Atsmon et al. |
| 7,466,986 B2 | 12/2008 | Halcrow et al. |
| 7,496,910 B2 | 2/2009 | Voskuil |
| 7,525,928 B2 | 4/2009 | Cutler |
| 7,551,754 B2 | 6/2009 | Steinberg et al. |
| 7,570,390 B2 | 8/2009 | Mitsunaga |
| 7,577,295 B2 | 8/2009 | Constantin et al. |
| 7,577,297 B2 | 8/2009 | Mori et al. |
| 7,580,952 B2 | 8/2009 | Logan et al. |
| 7,584,285 B2 | 9/2009 | Hudson et al. |
| 7,606,375 B2 | 10/2009 | Bailey et al. |
| 7,614,046 B2 | 11/2009 | Daniels et al. |
| 7,639,877 B2 | 12/2009 | Shiota et al. |
| 7,690,042 B2 | 3/2010 | Rantalahti |
| 7,697,557 B2 | 4/2010 | Segel |
| 7,703,036 B2 | 4/2010 | Satterfield |
| 7,715,598 B2 | 5/2010 | Li et al. |
| 7,716,643 B2 | 5/2010 | Goldin |
| 7,680,327 B2 | 6/2010 | Weiss |
| 7,729,902 B1 | 6/2010 | Gupta |
| 7,738,870 B2 | 6/2010 | Howard |
| 7,751,599 B2 | 7/2010 | Chen et al. |
| 7,756,538 B2 | 7/2010 | Bonta et al. |
| 7,765,194 B1 | 7/2010 | Sharma et al. |
| 7,766,498 B2 | 8/2010 | Sampsell |
| 7,779,367 B2 | 8/2010 | Oshiro et al. |
| 7,783,629 B2 | 8/2010 | Li et al. |
| 7,783,777 B1 | 8/2010 | Pabla et al. |
| 7,835,910 B1 | 11/2010 | Hakkani-Tur et al. |
| 7,864,967 B2 | 1/2011 | Takeuchi et al. |
| 7,865,952 B1 | 1/2011 | Hopwood et al. |
| 7,881,479 B2 | 2/2011 | Asada |
| 7,900,011 B2 | 3/2011 | Amundsen et al. |
| 7,959,308 B2 | 6/2011 | Freeman et al. |
| 7,970,350 B2 | 6/2011 | Sheynman et al. |
| 7,970,901 B2 | 6/2011 | Lipscomb et al. |
| 7,978,925 B1 | 7/2011 | Souchard |
| 8,015,006 B2 | 9/2011 | Kennewick et al. |
| 8,026,830 B2 | 9/2011 | Womble et al. |
| 8,074,213 B1 | 12/2011 | Holtz |
| 8,078,623 B2 | 12/2011 | Chou et al. |
| 8,091,074 B2 | 1/2012 | Lyon-Smith |
| 8,107,243 B2 | 1/2012 | Guccione et al. |
| 8,149,748 B2 | 4/2012 | Bata et al. |
| 8,150,098 B2 | 4/2012 | Gallagher et al. |
| 8,154,384 B2 | 4/2012 | Hirai |
| 8,155,400 B2 | 4/2012 | Bronstein et al. |
| 8,165,352 B1 | 4/2012 | Mohanty |
| 8,170,298 B2 | 5/2012 | Li et al. |
| 8,189,807 B2 | 5/2012 | Cutler |
| 8,194,177 B2 | 6/2012 | Jung et al. |
| 8,212,294 B2 | 7/2012 | Hoke |
| 8,212,894 B2 | 7/2012 | Nozaki et al. |
| 8,213,333 B2 | 7/2012 | Greel et al. |
| 8,213,690 B2 | 7/2012 | Okada et al. |
| 8,224,036 B2 | 7/2012 | Maruyama et al. |
| 8,229,729 B2 | 7/2012 | Sarikaya et al. |
| 8,232,962 B2 | 7/2012 | Buck |
| 8,239,446 B2 | 8/2012 | Navar et al. |
| 8,245,043 B2 | 8/2012 | Cutler |
| 8,275,615 B2 | 9/2012 | Kozat |
| 8,296,107 B2 | 10/2012 | Turner et al. |
| 8,296,673 B2 | 10/2012 | Lipstein et al. |
| 8,302,006 B2 | 10/2012 | Stanek et al. |
| 8,306,280 B2 | 11/2012 | Nozaki et al. |
| 8,316,237 B1 | 11/2012 | Felsher et al. |
| 8,321,220 B1 | 11/2012 | Chotimongkol et al. |
| 8,326,634 B2 | 12/2012 | Di Cristo et al. |
| 8,330,869 B2 | 12/2012 | Murashita et al. |
| 8,331,632 B1 | 12/2012 | Mohanty et al. |
| 8,345,934 B2 | 1/2013 | Obrador et al. |
| 8,346,563 B1 | 1/2013 | Hjelm et al. |
| 8,358,811 B2 | 1/2013 | Adams et al. |
| 8,364,717 B2 | 1/2013 | Delling et al. |
| 8,368,540 B2 | 2/2013 | Perkins et al. |
| 8,373,829 B2 | 2/2013 | Hara et al. |
| 8,374,122 B2 | 2/2013 | Meier et al. |
| 8,375,456 B2 | 2/2013 | Li et al. |
| 8,384,694 B2 | 2/2013 | Powell et al. |
| 8,384,791 B2 | 2/2013 | Porter et al. |
| 8,392,594 B2 | 3/2013 | Georgis et al. |
| 8,397,163 B1 | 3/2013 | Sran |
| 8,400,332 B2 | 3/2013 | Szwabowski et al. |
| 8,406,206 B2 | 3/2013 | Chiang |
| 8,407,472 B2 | 3/2013 | Hao et al. |
| 8,410,903 B2 | 4/2013 | Hirai |
| 8,412,521 B2 | 4/2013 | Mathias et al. |
| 8,413,198 B2 | 4/2013 | Connor et al. |
| 8,421,874 B2 | 4/2013 | Okamoto et al. |
| 8,448,847 B2 | 5/2013 | Lee |

(56) References Cited

U.S. PATENT DOCUMENTS

| | | | |
|---|---|---|---|
| 8,488,847 B2 | 5/2013 | Lee | |
| 8,468,548 B2 | 6/2013 | Kulkarni et al. | |
| 8,484,314 B2 | 7/2013 | Luna et al. | |
| 8,493,992 B2 | 7/2013 | Sella et al. | |
| 8,495,372 B2 | 7/2013 | Bailey et al. | |
| 8,504,823 B2 | 8/2013 | Carpenter | |
| 8,516,471 B2 | 8/2013 | Bhakta et al. | |
| 8,522,209 B2 | 8/2013 | Wintergerst et al. | |
| 8,526,683 B2 | 9/2013 | Maruyama et al. | |
| 8,527,602 B1 | 9/2013 | Rasmussen et al. | |
| 8,532,347 B2 | 9/2013 | Bourdev | |
| 8,535,075 B1 | 9/2013 | Golko et al. | |
| 8,538,091 B2 | 9/2013 | Kaneda et al. | |
| 8,539,477 B2 | 9/2013 | Balascio et al. | |
| 8,549,150 B1* | 10/2013 | Roseman | H04N 21/2181 370/351 |
| 8,555,364 B2 | 10/2013 | Filippi et al. | |
| 8,559,722 B2 | 10/2013 | Tsuji | |
| 8,571,866 B2 | 10/2013 | Melamed et al. | |
| 8,611,678 B2 | 12/2013 | Hanson et al. | |
| 8,614,734 B2 | 12/2013 | Cutler | |
| 8,619,062 B2 | 12/2013 | Powell et al. | |
| 8,620,351 B2 | 12/2013 | Karaoguz | |
| 8,620,649 B2 | 12/2013 | Gao | |
| 8,626,932 B2 | 1/2014 | Lydon et al. | |
| 8,631,350 B2 | 1/2014 | Lepage et al. | |
| 8,670,850 B2 | 3/2014 | Soulodre | |
| 8,686,600 B2 | 4/2014 | Terlizzi et al. | |
| 8,701,102 B2 | 4/2014 | Appiah et al. | |
| 8,705,806 B2 | 4/2014 | Nakano | |
| 8,719,603 B2 | 5/2014 | Belesiu | |
| 8,756,507 B2* | 6/2014 | Fong | H04H 60/27 715/716 |
| 8,761,512 B1 | 6/2014 | Buddemeier | |
| 8,776,166 B1 | 7/2014 | Erickson et al. | |
| 8,924,315 B2 | 12/2014 | Archambeau | |
| 8,935,673 B1 | 1/2015 | Ashkenazi et al. | |
| 9,017,092 B1 | 4/2015 | McCracken et al. | |
| 9,058,311 B1* | 6/2015 | Bertz | G06F 17/2235 |
| 9,088,891 B2 | 7/2015 | Belton et al. | |
| 9,239,773 B1 | 1/2016 | Teplitsky et al. | |
| 9,330,630 B2 | 5/2016 | Kerofsky | |
| 9,367,490 B2 | 6/2016 | Huang et al. | |
| 9,384,334 B2 | 7/2016 | Burba et al. | |
| 9,384,335 B2 | 7/2016 | Hunt et al. | |
| 9,324,323 B1 | 8/2016 | Bikel et al. | |
| 9,430,667 B2 | 8/2016 | Burba et al. | |
| 9,460,493 B2 | 10/2016 | Suri et al. | |
| 9,477,625 B2 | 10/2016 | Huang et al. | |
| 9,510,125 B2 | 11/2016 | Raghuvanshi et al. | |
| 9,606,788 B2 | 3/2017 | Nachimuthu et al. | |
| 9,639,742 B2 | 5/2017 | Lee et al. | |
| 9,703,681 B2 | 7/2017 | Taylor et al. | |
| 9,717,006 B2 | 7/2017 | Haugen et al. | |
| 9,720,548 B2 | 8/2017 | Powell | |
| 2001/0000356 A1 | 4/2001 | Woods | |
| 2002/0078091 A1 | 6/2002 | Vu et al. | |
| 2002/0083041 A1 | 6/2002 | Achlioptas | |
| 2002/0101918 A1 | 8/2002 | Rodman et al. | |
| 2002/0116171 A1 | 8/2002 | Russell | |
| 2002/0143855 A1 | 10/2002 | Traversat et al. | |
| 2002/0149924 A1 | 10/2002 | Falicoff et al. | |
| 2003/0031177 A1 | 2/2003 | Robidas et al. | |
| 2003/0064142 A1 | 4/2003 | Wagner et al. | |
| 2003/0068100 A1 | 4/2003 | Covell et al. | |
| 2003/0072486 A1 | 4/2003 | Loui et al. | |
| 2003/0125948 A1 | 7/2003 | Lyudovyk | |
| 2003/0182414 A1 | 9/2003 | O'Neill | |
| 2003/0212543 A1 | 11/2003 | Epstein | |
| 2003/0212544 A1 | 11/2003 | Acero | |
| 2004/0032831 A1 | 2/2004 | Matthews | |
| 2004/0040021 A1 | 2/2004 | Bharati et al. | |
| 2004/0088726 A1 | 5/2004 | Ma et al. | |
| 2004/0168165 A1 | 8/2004 | Kokkinen | |
| 2004/0210752 A1 | 10/2004 | Rao | |
| 2004/0240711 A1 | 12/2004 | Hamza et al. | |
| 2005/0039169 A1 | 2/2005 | Hsu et al. | |
| 2005/0052427 A1 | 3/2005 | Wu et al. | |
| 2005/0058297 A1 | 3/2005 | Jot et al. | |
| 2005/0065789 A1 | 3/2005 | Yacoub | |
| 2005/0091057 A1 | 4/2005 | Mark et al. | |
| 2005/0114625 A1 | 5/2005 | Snyder | |
| 2005/0144013 A1 | 6/2005 | Fujimoto et al. | |
| 2005/0144616 A1 | 6/2005 | Hammond et al. | |
| 2005/0163372 A1 | 7/2005 | Kida et al. | |
| 2005/0165598 A1 | 7/2005 | Cote et al. | |
| 2005/0165839 A1 | 7/2005 | Madan et al. | |
| 2005/0177515 A1 | 8/2005 | Kalavade et al. | |
| 2005/0177624 A1 | 8/2005 | Oswald et al. | |
| 2005/0198407 A1 | 9/2005 | Lee | |
| 2005/0245243 A1 | 11/2005 | Zuniga | |
| 2006/0009996 A1 | 1/2006 | Lipscomb et al. | |
| 2006/0034542 A1 | 2/2006 | Aoyama | |
| 2006/0036965 A1 | 2/2006 | Harris et al. | |
| 2006/0046709 A1 | 3/2006 | Krumm et al. | |
| 2006/0058009 A1 | 3/2006 | Vogedes et al. | |
| 2006/0088209 A1 | 4/2006 | Yu et al. | |
| 2006/0156222 A1 | 7/2006 | Chi et al. | |
| 2006/0174017 A1 | 8/2006 | Robertson | |
| 2006/0200477 A1 | 9/2006 | Barrenechea | |
| 2006/0212867 A1 | 9/2006 | Fields et al. | |
| 2006/0244845 A1 | 11/2006 | Craig et al. | |
| 2006/0250834 A1 | 11/2006 | Chinn et al. | |
| 2006/0253491 A1 | 11/2006 | Gokturk | |
| 2006/0277478 A1 | 12/2006 | Seraji et al. | |
| 2006/0280341 A1 | 12/2006 | Koshizen | |
| 2006/0287856 A1 | 12/2006 | He et al. | |
| 2006/0290705 A1 | 12/2006 | White | |
| 2007/0002478 A1 | 1/2007 | Mowry | |
| 2007/0038436 A1 | 2/2007 | Cristo et al. | |
| 2007/0053607 A1 | 3/2007 | Mitsunaga | |
| 2007/0055752 A1 | 3/2007 | Wiegand et al. | |
| 2007/0055936 A1 | 3/2007 | Dhanjal et al. | |
| 2007/0058878 A1 | 3/2007 | Gomilla et al. | |
| 2007/0074168 A1 | 3/2007 | Bates et al. | |
| 2007/0128979 A1 | 6/2007 | Shackelford | |
| 2007/0147318 A1 | 6/2007 | Ross et al. | |
| 2007/0150428 A1 | 6/2007 | Webb | |
| 2007/0156392 A1 | 7/2007 | Balchandran et al. | |
| 2007/0157313 A1 | 7/2007 | Denton | |
| 2007/0172099 A1 | 7/2007 | Park | |
| 2007/0188477 A1 | 8/2007 | Rehm | |
| 2007/0198950 A1 | 8/2007 | Dodge et al. | |
| 2007/0203863 A1 | 8/2007 | Gupta | |
| 2007/0226649 A1 | 9/2007 | Agmon | |
| 2007/0233879 A1 | 10/2007 | Woods | |
| 2007/0234048 A1 | 10/2007 | Ziv | |
| 2007/0271086 A1 | 11/2007 | Peters et al. | |
| 2007/0294061 A1 | 12/2007 | Carlbom et al. | |
| 2008/0004877 A1 | 1/2008 | Tian | |
| 2008/0005114 A1 | 1/2008 | Li | |
| 2008/0014563 A1 | 1/2008 | Visani | |
| 2008/0037438 A1 | 2/2008 | Twiss et al. | |
| 2008/0037442 A1 | 2/2008 | Bill | |
| 2008/0046425 A1 | 2/2008 | Perski | |
| 2008/0055278 A1 | 3/2008 | Locker et al. | |
| 2008/0066181 A1 | 3/2008 | Haveson et al. | |
| 2008/0069364 A1 | 3/2008 | Itou et al. | |
| 2008/0089299 A1 | 4/2008 | Lindsley et al. | |
| 2008/0089561 A1 | 4/2008 | Zhang | |
| 2008/0137875 A1 | 6/2008 | Zong et al. | |
| 2008/0143674 A1 | 6/2008 | Molander et al. | |
| 2008/0165701 A1 | 7/2008 | Ananthanarayanan et al. | |
| 2008/0175190 A1 | 7/2008 | Lee et al. | |
| 2008/0183751 A1 | 7/2008 | Cazier et al. | |
| 2008/0192820 A1 | 8/2008 | Brooks et al. | |
| 2008/0195388 A1 | 8/2008 | Bower et al. | |
| 2008/0204598 A1 | 8/2008 | Maurer et al. | |
| 2008/0209354 A1 | 8/2008 | Stanek et al. | |
| 2008/0212894 A1 | 9/2008 | Demirli et al. | |
| 2008/0215183 A1 | 9/2008 | Chen | |
| 2008/0235017 A1 | 9/2008 | Satomura | |
| 2008/0253564 A1* | 10/2008 | Kahn | H04N 7/20 380/200 |

(56) References Cited

U.S. PATENT DOCUMENTS

| | | |
|---|---|---|
| 2008/0263130 A1 | 10/2008 | Michalowitz et al. |
| 2008/0273708 A1 | 11/2008 | Sandgren et al. |
| 2008/0313264 A1* | 12/2008 | Pestoni .................. G06F 21/10 709/202 |
| 2009/0028380 A1 | 1/2009 | Hillebrand et al. |
| 2009/0030697 A1 | 1/2009 | Cerra et al. |
| 2009/0046864 A1 | 2/2009 | Mahabub et al. |
| 2009/0055389 A1 | 2/2009 | Schilit et al. |
| 2009/0055461 A1 | 2/2009 | Georgis et al. |
| 2009/0083148 A1 | 3/2009 | Hwang et al. |
| 2009/0087099 A1 | 4/2009 | Nakamura |
| 2009/0089801 A1 | 4/2009 | Jones et al. |
| 2009/0100384 A1 | 4/2009 | Louch |
| 2009/0100459 A1 | 4/2009 | Riedl et al. |
| 2009/0100489 A1 | 4/2009 | Strothmann |
| 2009/0116749 A1 | 5/2009 | Cristinacce et al. |
| 2009/0144705 A1 | 6/2009 | Oda |
| 2009/0180671 A1 | 7/2009 | Lee |
| 2009/0185723 A1 | 7/2009 | Kurtz |
| 2009/0187593 A1 | 7/2009 | Chen et al. |
| 2009/0210328 A1 | 8/2009 | Fomenko et al. |
| 2009/0228820 A1 | 9/2009 | Kim et al. |
| 2009/0259667 A1 | 10/2009 | Wang et al. |
| 2009/0271735 A1 | 10/2009 | Anderson et al. |
| 2009/0292687 A1 | 11/2009 | Fan |
| 2009/0300596 A1 | 12/2009 | Tyhurst et al. |
| 2009/0313330 A1* | 12/2009 | Sakamoto .......... H04N 21/2402 709/204 |
| 2009/0313546 A1 | 12/2009 | Katpelly et al. |
| 2010/0004930 A1 | 1/2010 | Strope |
| 2010/0011123 A1 | 1/2010 | Dantzig et al. |
| 2010/0015956 A1 | 1/2010 | Qu et al. |
| 2010/0027663 A1 | 2/2010 | Dai et al. |
| 2010/0045682 A1 | 2/2010 | Ford et al. |
| 2010/0054544 A1 | 3/2010 | Arguelles |
| 2010/0076941 A1 | 3/2010 | Dotsenko et al. |
| 2010/0082478 A1 | 4/2010 | Van Der Veen et al. |
| 2010/0103117 A1 | 4/2010 | Townsend et al. |
| 2010/0111059 A1 | 5/2010 | Bappu et al. |
| 2010/0114890 A1 | 5/2010 | Hagar |
| 2010/0121954 A1 | 5/2010 | Yang et al. |
| 2010/0128863 A1 | 5/2010 | Krum et al. |
| 2010/0135038 A1 | 6/2010 | Handschy et al. |
| 2010/0141666 A1 | 6/2010 | Christopher et al. |
| 2010/0189313 A1 | 7/2010 | Prokoski |
| 2010/0205177 A1 | 8/2010 | Sato |
| 2010/0211695 A1 | 8/2010 | Steinmetz et al. |
| 2010/0211908 A1 | 8/2010 | Luk et al. |
| 2010/0229222 A1 | 9/2010 | Li et al. |
| 2010/0251206 A1 | 9/2010 | Horiuchi et al. |
| 2010/0251230 A1 | 9/2010 | O'Farrel et al. |
| 2010/0295774 A1 | 11/2010 | Hennessey |
| 2010/0312546 A1 | 12/2010 | Chang et al. |
| 2011/0006603 A1 | 1/2011 | Robinson et al. |
| 2011/0007174 A1 | 1/2011 | Bacivarov et al. |
| 2011/0009075 A1 | 1/2011 | Jantunen et al. |
| 2011/0010171 A1 | 1/2011 | Talwar et al. |
| 2011/0010424 A1 | 1/2011 | Fox et al. |
| 2011/0016333 A1 | 1/2011 | Scott et al. |
| 2011/0023111 A1 | 1/2011 | Gunadisastra et al. |
| 2011/0043490 A1 | 2/2011 | Powell et al. |
| 2011/0052081 A1 | 3/2011 | Onoe et al. |
| 2011/0055901 A1* | 3/2011 | Karaoguz ............... G06F 21/10 726/4 |
| 2011/0055935 A1* | 3/2011 | Karaoguz ............... G06F 21/10 726/29 |
| 2011/0064331 A1 | 3/2011 | Andres Del Valle |
| 2011/0071841 A1 | 3/2011 | Fomenko et al. |
| 2011/0081023 A1 | 4/2011 | Raghuvanshi et al. |
| 2011/0091113 A1 | 4/2011 | Ito |
| 2011/0093459 A1 | 4/2011 | Dong et al. |
| 2011/0099538 A1 | 4/2011 | Pujala et al. |
| 2011/0129159 A1 | 6/2011 | Cifarelli |
| 2011/0135166 A1 | 6/2011 | Wechsler |
| 2011/0144999 A1 | 6/2011 | Jang et al. |
| 2011/0153324 A1 | 6/2011 | Ballinger et al. |
| 2011/0158536 A1 | 6/2011 | Nakano |
| 2011/0010319 A1 | 7/2011 | Harada |
| 2011/0138064 A1 | 7/2011 | Rieger et al. |
| 2011/0167181 A1 | 7/2011 | Minoo et al. |
| 2011/0173556 A1 | 7/2011 | Czerwinski et al. |
| 2011/0176058 A1 | 7/2011 | Biswas et al. |
| 2011/0177481 A1 | 7/2011 | Haff et al. |
| 2011/0179182 A1 | 7/2011 | Vadla et al. |
| 2011/0208980 A1 | 8/2011 | Brooks et al. |
| 2011/0225366 A1* | 9/2011 | Izadi ..................... G06F 1/1626 711/118 |
| 2011/0231676 A1 | 9/2011 | Atkins et al. |
| 2011/0283266 A1 | 11/2011 | Gallagher et al. |
| 2011/0289482 A1 | 11/2011 | Bentlye |
| 2011/0321029 A1 | 12/2011 | Kern et al. |
| 2012/0014560 A1 | 1/2012 | Obrador et al. |
| 2012/0027311 A1 | 2/2012 | Cok |
| 2012/0029661 A1 | 2/2012 | Jones et al. |
| 2012/0030325 A1 | 2/2012 | Silverman et al. |
| 2012/0030682 A1 | 2/2012 | Shaffer et al. |
| 2012/0054624 A1 | 3/2012 | Owens et al. |
| 2012/0065976 A1 | 3/2012 | Deng |
| 2012/0066642 A1 | 3/2012 | Shi |
| 2012/0071174 A1 | 3/2012 | Bao et al. |
| 2012/0072528 A1 | 3/2012 | Rimac et al. |
| 2012/0076427 A1 | 3/2012 | Hibino et al. |
| 2012/0078690 A1 | 3/2012 | Harriman et al. |
| 2012/0079372 A1 | 3/2012 | Kandekar et al. |
| 2012/0084086 A1 | 4/2012 | Gilbert |
| 2012/0096121 A1 | 4/2012 | Hao et al. |
| 2012/0106859 A1 | 5/2012 | Cheatle |
| 2012/0120678 A1 | 5/2012 | Su |
| 2012/0134139 A1 | 5/2012 | Jang et al. |
| 2012/0144288 A1 | 6/2012 | Caruso et al. |
| 2012/0169791 A1 | 7/2012 | Whitehead et al. |
| 2012/0179674 A1 | 7/2012 | Delling et al. |
| 2012/0188382 A1 | 7/2012 | Morrison et al. |
| 2012/0224388 A1 | 9/2012 | Lin |
| 2012/0225652 A1 | 9/2012 | Martinez et al. |
| 2012/0232787 A1 | 9/2012 | Kunath et al. |
| 2012/0232885 A1 | 9/2012 | Barbosa et al. |
| 2012/0235887 A1 | 9/2012 | Border et al. |
| 2012/0242598 A1 | 9/2012 | Won et al. |
| 2012/0245944 A1 | 9/2012 | Gruber |
| 2012/0246458 A1 | 9/2012 | Jain et al. |
| 2012/0250535 A1 | 10/2012 | Delling et al. |
| 2012/0253799 A1 | 10/2012 | Bangalore |
| 2012/0253802 A1 | 10/2012 | Heck et al. |
| 2012/0254086 A1 | 10/2012 | Deng |
| 2012/0254153 A1 | 10/2012 | Abraham et al. |
| 2012/0254161 A1 | 10/2012 | Zhang et al. |
| 2012/0254227 A1 | 10/2012 | Heck et al. |
| 2012/0256967 A1 | 10/2012 | Baldwin et al. |
| 2012/0265531 A1 | 10/2012 | Bennett |
| 2012/0266140 A1 | 10/2012 | Bates |
| 2012/0269355 A1 | 10/2012 | Chandak et al. |
| 2012/0271617 A1 | 10/2012 | Nakajima et al. |
| 2012/0278430 A1 | 11/2012 | Lehane et al. |
| 2012/0290293 A1 | 11/2012 | Hakkani-Tur et al. |
| 2012/0293543 A1 | 11/2012 | Jardine-Skinner |
| 2012/0303565 A1 | 11/2012 | Deng et al. |
| 2012/0308124 A1 | 12/2012 | Belhumeur et al. |
| 2012/0310523 A1 | 12/2012 | Delling et al. |
| 2012/0313865 A1 | 12/2012 | Pearce |
| 2012/0317197 A1 | 12/2012 | De Foy et al. |
| 2012/0324069 A1 | 12/2012 | Nori et al. |
| 2012/0327040 A1 | 12/2012 | Simon et al. |
| 2012/0327042 A1 | 12/2012 | Harley et al. |
| 2012/0330887 A1 | 12/2012 | Young et al. |
| 2012/0331102 A1 | 12/2012 | Ertugrul |
| 2012/0331111 A1 | 12/2012 | Wu et al. |
| 2013/0013936 A1 | 1/2013 | Lin et al. |
| 2013/0014050 A1 | 1/2013 | Queru |
| 2013/0016055 A1 | 1/2013 | Chuang |
| 2013/0019175 A1 | 1/2013 | Kotler et al. |
| 2013/0021373 A1 | 1/2013 | Vaught et al. |
| 2013/0031476 A1 | 1/2013 | Coin et al. |
| 2013/0058274 A1 | 3/2013 | Scherzer et al. |

(56) References Cited

U.S. PATENT DOCUMENTS

| | | |
|---|---|---|
| 2013/0065576 A1 | 3/2013 | Basir |
| 2013/0073725 A1 | 3/2013 | Bordeleau et al. |
| 2013/0078869 A1 | 3/2013 | Golko et al. |
| 2013/0085756 A1 | 4/2013 | Chotimongkol et al. |
| 2013/0086461 A1 | 4/2013 | Ashley-Rollman et al. |
| 2013/0086507 A1 | 4/2013 | Poston et al. |
| 2013/0091205 A1 | 4/2013 | Kotler et al. |
| 2013/0091440 A1 | 4/2013 | Kotler et al. |
| 2013/0091453 A1 | 4/2013 | Kotler |
| 2013/0091465 A1 | 4/2013 | Kikin-Gil et al. |
| 2013/0091534 A1 | 4/2013 | Gilde et al. |
| 2013/0094445 A1 | 4/2013 | De Foy et al. |
| 2013/0097481 A1 | 4/2013 | Kotler et al. |
| 2013/0097490 A1 | 4/2013 | Kotler et al. |
| 2013/0106725 A1 | 5/2013 | Bakken et al. |
| 2013/0106740 A1 | 5/2013 | Yilmaz et al. |
| 2013/0106977 A1 | 5/2013 | Chu et al. |
| 2013/0108065 A1 | 5/2013 | Mullins et al. |
| 2013/0115821 A1 | 5/2013 | Golko et al. |
| 2013/0117470 A1 | 5/2013 | Terlizzi et al. |
| 2013/0117658 A1 | 5/2013 | Fidler et al. |
| 2013/0127982 A1 | 5/2013 | Zhang et al. |
| 2013/0128364 A1 | 5/2013 | Wheeler et al. |
| 2013/0132614 A1 | 5/2013 | Bajpai et al. |
| 2013/0138436 A1 | 5/2013 | Yu |
| 2013/0148864 A1 | 6/2013 | Dolson et al. |
| 2013/0151441 A1 | 6/2013 | Archambeau |
| 2013/0151681 A1 | 6/2013 | Dournov et al. |
| 2013/0151975 A1 | 6/2013 | Shadi et al. |
| 2013/0152092 A1 | 6/2013 | Yadgar |
| 2013/0156275 A1 | 6/2013 | Amacker et al. |
| 2013/0159021 A1 | 6/2013 | Felsher |
| 2013/0166742 A1 | 6/2013 | Wiener et al. |
| 2013/0173604 A1 | 7/2013 | Li et al. |
| 2013/0174047 A1 | 7/2013 | Sivakumar et al. |
| 2013/0179067 A1 | 7/2013 | Trowbridge et al. |
| 2013/0185065 A1 | 7/2013 | Tzirkel-Hancock et al. |
| 2013/0185163 A1* | 7/2013 | Krikorian .......... G06Q 30/0273 705/14.69 |
| 2013/0188032 A1 | 7/2013 | Vertegaal |
| 2013/0191781 A1 | 7/2013 | Radakovitz et al. |
| 2013/0212484 A1 | 8/2013 | Joshi et al. |
| 2013/0217414 A1 | 8/2013 | Nagaraj |
| 2013/0226587 A1 | 8/2013 | Cheung |
| 2013/0227398 A1 | 8/2013 | Bolstad |
| 2013/0227415 A1 | 8/2013 | Gregg et al. |
| 2013/0231130 A1 | 9/2013 | Cherian et al. |
| 2013/0231862 A1 | 9/2013 | Delling et al. |
| 2013/0234913 A1 | 9/2013 | Thangadorai et al. |
| 2013/0238729 A1 | 9/2013 | Holzman et al. |
| 2013/0238819 A1 | 9/2013 | Oljaca et al. |
| 2013/0242964 A1 | 9/2013 | Hassan et al. |
| 2013/0243328 A1 | 9/2013 | Irie |
| 2013/0252636 A1 | 9/2013 | Chang et al. |
| 2013/0254412 A1 | 9/2013 | Menezes et al. |
| 2013/0266196 A1 | 10/2013 | Kono |
| 2013/0275779 A1 | 10/2013 | He |
| 2013/0293530 A1 | 11/2013 | Perez et al. |
| 2013/0297700 A1 | 11/2013 | Hayton et al. |
| 2013/0298185 A1 | 11/2013 | Koneru et al. |
| 2013/0315235 A1 | 11/2013 | Foo |
| 2013/0318249 A1 | 11/2013 | McDonough et al. |
| 2013/0321390 A1 | 12/2013 | Latta et al. |
| 2013/0325148 A1 | 12/2013 | Mustafa et al. |
| 2013/0335301 A1 | 12/2013 | Wong et al. |
| 2013/0339478 A1 | 12/2013 | Edge |
| 2013/0342637 A1 | 12/2013 | Felkai et al. |
| 2013/0346494 A1 | 12/2013 | Nakfour et al. |
| 2014/0004741 A1 | 1/2014 | Jol et al. |
| 2014/0006420 A1 | 1/2014 | Sparrow et al. |
| 2014/0007215 A1 | 1/2014 | Romano et al. |
| 2014/0009109 A1 | 1/2014 | Lee et al. |
| 2014/0019626 A1 | 1/2014 | Hubler et al. |
| 2014/0019893 A1 | 1/2014 | Gudmundsson et al. |
| 2014/0019896 A1 | 1/2014 | Satterfield |
| 2014/0025380 A1 | 1/2014 | Koch et al. |
| 2014/0029859 A1 | 1/2014 | Libin |
| 2014/0046914 A1 | 2/2014 | Das et al. |
| 2014/0050419 A1 | 2/2014 | Lerios et al. |
| 2014/0072242 A1 | 3/2014 | Wei et al. |
| 2014/0075523 A1 | 3/2014 | Tuomaala et al. |
| 2014/0107921 A1 | 4/2014 | Delling et al. |
| 2014/0108979 A1 | 4/2014 | Davidson et al. |
| 2014/0141635 A1 | 5/2014 | Saunders |
| 2014/0157169 A1 | 6/2014 | Kikin-gil |
| 2014/0173602 A1 | 6/2014 | Kikin-gil et al. |
| 2014/0181708 A1 | 6/2014 | Kikin-gil et al. |
| 2014/0210797 A1 | 7/2014 | Kreek et al. |
| 2014/0214410 A1 | 7/2014 | Jang |
| 2014/0222729 A1 | 8/2014 | Dasgupta et al. |
| 2014/0223334 A1 | 8/2014 | Jensen |
| 2014/0253522 A1 | 9/2014 | Cueto |
| 2014/0257803 A1 | 9/2014 | Yu et al. |
| 2014/0258405 A1* | 9/2014 | Perkin .................. H04W 4/021 709/204 |
| 2014/0282415 A1 | 9/2014 | Ovadia et al. |
| 2014/0297412 A1* | 10/2014 | Fong ...................... H04H 60/27 705/14.55 |
| 2014/0304297 A1* | 10/2014 | Lian ....................... G06F 21/10 707/769 |
| 2014/0317602 A1 | 10/2014 | Zuo |
| 2014/0341443 A1 | 11/2014 | Cao |
| 2014/0358537 A1 | 12/2014 | Gilbert |
| 2014/0359593 A1 | 12/2014 | Cohen et al. |
| 2014/0359709 A1 | 12/2014 | Nassar |
| 2014/0372112 A1 | 12/2014 | Xue et al. |
| 2014/0379326 A1 | 12/2014 | Sarikaya et al. |
| 2014/0379353 A1 | 12/2014 | Boies et al. |
| 2015/0082291 A1 | 3/2015 | Thomas et al. |
| 2015/0082292 A1 | 3/2015 | Satash et al. |
| 2015/0082293 A1 | 3/2015 | Satish et al. |
| 2015/0082296 A1 | 3/2015 | Satish et al. |
| 2015/0100312 A1 | 4/2015 | Bocchieri |
| 2015/0161993 A1 | 6/2015 | Sainath |
| 2015/0161994 A1 | 6/2015 | Tang |
| 2015/0170020 A1 | 6/2015 | Garimella |
| 2015/0255061 A1 | 9/2015 | Xue et al. |
| 2015/0255069 A1 | 9/2015 | Adams et al. |
| 2015/0277682 A1 | 10/2015 | Kaufthal |
| 2015/0277708 A1 | 10/2015 | Rodrig et al. |
| 2015/0278191 A1 | 10/2015 | Levit et al. |
| 2015/0310040 A1 | 10/2015 | Chan et al. |
| 2015/0310261 A1 | 10/2015 | Lee et al. |
| 2015/0310858 A1 | 10/2015 | Li et al. |
| 2015/0317147 A1 | 11/2015 | Nachimuthu et al. |
| 2015/0317313 A1 | 11/2015 | Lv et al. |
| 2015/0317510 A1 | 11/2015 | Lee |
| 2015/0324555 A1 | 11/2015 | Burba et al. |
| 2015/0324556 A1 | 11/2015 | Hunt et al. |
| 2015/0324601 A1 | 11/2015 | Burba et al. |
| 2015/0325236 A1 | 11/2015 | Levit |
| 2015/0331240 A1 | 11/2015 | Poulos |
| 2015/0331463 A1 | 11/2015 | Obie et al. |
| 2015/0347120 A1 | 12/2015 | Garg et al. |
| 2015/0347274 A1 | 12/2015 | Taylor |
| 2015/0347734 A1 | 12/2015 | Beigi |
| 2015/0350333 A1 | 12/2015 | Cutler et al. |
| 2015/0356759 A1 | 12/2015 | Delling et al. |
| 2015/0363339 A1 | 12/2015 | Huang et al. |
| 2015/0363919 A1 | 12/2015 | Suri et al. |
| 2015/0371409 A1 | 12/2015 | Negrila et al. |
| 2015/0373475 A1 | 12/2015 | Raghuvanshi et al. |
| 2015/0373546 A1 | 12/2015 | Haugen et al. |
| 2015/0378515 A1 | 12/2015 | Powell |
| 2016/0203125 A1 | 7/2016 | Sarikaya et al. |
| 2016/0210035 A1 | 7/2016 | Rodrig et al. |
| 2016/0217092 A1 | 7/2016 | Huang et al. |
| 2016/0239987 A1 | 8/2016 | Negrila et al. |
| 2016/0379343 A1 | 12/2016 | Suri et al. |
| 2017/0103753 A1 | 4/2017 | Levit et al. |
| 2017/0162201 A1 | 6/2017 | Boies et al. |

(56) References Cited

U.S. PATENT DOCUMENTS

| | | |
|---|---|---|
| 2017/0228583 A1 | 8/2017 | Lee |
| 2017/0257769 A1 | 9/2017 | Haugen et al. |

FOREIGN PATENT DOCUMENTS

| | | |
|---|---|---|
| CN | 101415039 | 4/2009 |
| CN | 101753404 | 6/2010 |
| CN | 102737099 | 10/2012 |
| CN | 102792320 | 11/2012 |
| EP | 0704655 | 4/1996 |
| EP | 0553101 | 7/1997 |
| EP | 0816981 | 7/1998 |
| EP | 1055872 | 11/2000 |
| EP | 1174787 | 1/2002 |
| EP | 1331566 | 7/2003 |
| EP | 1628197 | 2/2006 |
| EP | 1965389 | 9/2008 |
| EP | 1970803 | 9/2008 |
| EP | 2096577 | 9/2009 |
| EP | 2267655 | 12/2010 |
| EP | 2312462 | 4/2011 |
| EP | 2482572 | 8/2012 |
| EP | 2575128 | 4/2013 |
| EP | 2590274 | 5/2013 |
| EP | 2650752 | 10/2013 |
| EP | 2701457 | 2/2014 |
| GB | 2431001 | 4/2007 |
| JP | S6140430 | 11/1981 |
| JP | 2002091477 | 3/2002 |
| KR | 20040076079 | 8/2004 |
| KR | 20130022513 | 3/2013 |
| WO | WO-9304468 | 3/1993 |
| WO | WO-0125943 | 4/2001 |
| WO | WO-0250590 | 6/2002 |
| WO | WO-2005013262 | 2/2005 |
| WO | WO-2005033934 | 4/2005 |
| WO | WO-2008124181 | 10/2008 |
| WO | WO-2009015047 | 1/2009 |
| WO | WO-2009082814 | 7/2009 |
| WO | WO-2009089308 | 7/2009 |
| WO | WO-2009128021 | 10/2009 |
| WO | WO-2010141403 | 12/2010 |
| WO | WO-2011014138 | 2/2011 |
| WO | WO-2011150403 | 12/2011 |
| WO | WO-2012152817 | 11/2012 |
| WO | WO-2013008026 | 1/2013 |
| WO | WO-2013048510 | 4/2013 |
| WO | WO-2013154561 | 10/2013 |
| WO | WO-2013171481 | 11/2013 |
| WO | WO-2013184225 | 12/2013 |

OTHER PUBLICATIONS

"Connectify pro FULL+KEY 7 MB", Retrieved From: <http://zonreturn.blogspot.mx/2013/05/connectify-pro-fullkey-7-mb.html> Nov. 14, 2013, May 14, 2013, 5 Pages.

"Connecting to Multiple 802.11 Networks from One WiFi Card Simultaneously", Retrieved From: <http://marketplace.yet2.com/app/insight/techofweek/38576> Nov. 18, 2013, Jun. 20, 2012, 2 Pages.

Al-Hazmi, et al., "Virtualization of 802.11 Interfaces for Wireless Mesh Networks", In Proceeding: Eighth International Conference on Wireless On-Demand Network Systems and Services, Computer Networks and Computer Communications Lab University of Passau, 94032 Passau, Germany,Jan. 26, 2011, pp. 44-51.

Al-Kanj, et al., "Optimized Energy Efficient Content Distribution over Wireless Networks with Mobile-to-Mobile Cooperation", In Proceeding: The IEEE 17th International Conference on Telecommunications, Department of Electrical and Computer Engineering, American University of Beirut,Apr. 4, 2010, pp. 471-475.

Ananthanarayanan, et al., "Collaborative Downloading for Multihomed Wireless Devices", In Proceedings: Eighth IEEE Workshop on Mobile Computing Systems and Applications, Mar. 8, 2007, pp. 79-84.

Ananthanarayanan, et al., "Combine: Leveraging the Power of Wireless Peers through Collaborative Downloading", In Proceedings: The 5th International Conference on Mobile Systems, Applications and Services, Jun. 11, 2007, pp. 286-298.

Chandra, et al., "MultiNet: Connecting to Multiple IEEE 802.11 Networks Using a Single Wireless Card", In Proceedings: IEEE INFOCOM, The 23rd Annual Joint Conference of the IEEE Computer and Communications Societies, Mar. 7, 2004, 12 Pages.

Elrakabawy, et al., "Peer-to-Peer File Transfer in Wireless Mesh Networks", In Proceeding: The Fourth Annual Conference on Wireless on Demand Network Systems and Services, University of Leipzig Department of Computer Science Augustusplatz 10-11 04109 Leipzig, Germany,Jan. 24, 2007, pp. 114-121.

Fiore, et al., "Information Density Estimation for Content Retrieval in MANETs", In Proceedings: The IEEE Transactions on Mobile Computing, vol. 8, Issue 3, Mar. 2009, pp. 289-303.

Florescu, et al., "Towards a Peer-Assisted Content Delivery Architecture", In Proceedings: The 18th International Conference on Control Systems and Computer Science, May 2011, 8 pages.

Ghostmonkeys, "How to Set Up a Wireless Hotspot—From Ethernet (Windows 7)", Available At: <http://www.instructables.com/id/How-to-Set-Up-a-Wireless-Hotspot-Windows-7/>, Apr. 3, 2012, 8 pages.

Hefeeda, "A Framework for Cost-Effective Peer-to-Peer Content Distribution", In Proceedings: The Eleventh ACM International Conference on Multimedia, Department of Computer Sciences Purdue University, West Lafayette, IN 47907,Nov. 2, 2003, 2 Pages.

Jaiswal, et al., "Bulk Content Delivery Using Co-Operating End-Nodes with Upload/Download Limits", in Proceedings: Fifth International Conference on Communication Systems and Networks, Bell Labs Research India, Bangalore, India,Sep. 10, 2012, 11 Pages.

Jluedemann, "Networking & wireless forum: How to set up Dual Network Adapters", Retrieved From: <http://forums.cnet.com/7723-7589_102-531538/how-to-set-up-dual-network-adapters/%20Internet%20is%20only%20available%20via%20an%20ATT%20MiFi%20hot%20spot.> Nov. 14, 2013, Jun. 27, 2011, 3 Pages.

Keller, et al., "MicroCast: Cooperative Video Streaming on Smartphones", In Proceedings: The 10th International Conference on Mobile Systems, Applications, and Services, Jun. 25, 2012, 13 pages.

Luo, et al., "UCAN: A Unified Cellular and AdHoc Network Architecture", In Proceedings: Ninth Annual International Conference on Mobile Computing and Networking, Sep. 14, 2013, 15 pages.

Manetti, et al., "Next Generation CDN services for Community Networks", In Proceedings: The Third International Conference on Next Generation Mobile Applications, Services and Technologies, Sep. 15, 2009, pp. 89-94.

Militano, et al., "Group Interactions in Wireless Cooperative Networks", In Proceedings: IEEE 73rd Conference on Vehicular Technology, May 15, 2011, 5 Pages.

Sato, et al., "Incentive Mechanism Considering Variety of User Cost in P2P Content Sharing", In Proceeding: The IEEE Global Telecommunications Conference, Communications and Computer Engineering, Graduate School of Informatics, Kyoto University Yoshidahonnmachi, Sakyo-ku, Kyoto, 606-8501 Japan,Nov. 30, 2008, 5 Pages.

Sbai, et al., "P2P Content Sharing in Spontaneous Multi-Hop Wireless Networks", In Proceedings: Second International Conference of Communication Systems and Networks, Jan. 5, 2010, 10 Pages.

So, et al., "Routing and Channel Assignment in Multi-Channel Multi-Hop Wireless Networks with Single-NIC Devices", In Proceeding: The Technical Report, Department of Computer Science, Department of Electrical and Computer Engineering, Coordinated Science Laboratory, University of Illinois at Urbana-Champaign,Dec. 2004, 12 Pages.

Song, et al., "Optimal Resource Utilization in Content Distribution Networks", In Proceedings: Technical Report of Computer Science, Dept. of Computer Science, Cornell University, Ithaca, NY 14853,Nov. 14, 2005, 14 Pages.

(56) References Cited

OTHER PUBLICATIONS

Thouin, et al., "Video-on-Demand Networks: Design Approaches and Future Challenges", In Proceeding: The IEEE Network, vol. 21, Issue 2, Mar. 2007, pp. 42-48.

Tysowski, et al., "Peer to Peer Content Sharing on Ad Hoc Networks of Smartphones", In Proceedings: 7th International Conference of Wireless Communications and Mobile Computing, Jul. 4, 2011, pp. 1445-1450.

"Acoustics—Measurement of room acoustic parameters—Part 1: Performance spaces", In ISO 3382-1:2009, May 6, 2014, 2 pages.

"Cisco Bring Your Own Device", Available at: http://www.cisco.com/c/en/us/td/docs/solutions/Enterprise/Borderless_Networks/Unified_Access/byodwp.html, Mar. 2014, 23 Pages.

"Debug Navigator Help: Using Debug Gauges", https://developer.apple.com/library/mac/recipes/xcode_help-debug_navigator/articles/using_debug_gauges.html#//apple_ref/doc/uid/TP40010432-CH8-SW1, May 28, 2014, 3 pages.

"Deployment Planning Tips for Office 365", http://technet.microsoft.com/en-us/library/hh852435.aspx, Oct. 14, 2012, 7 pages.

"Failover Cluster Step-by-Step Guide: Validating Hardware for a Failover Cluster", http://technet.microsoft.com/en-us/library/cc732035(v=ws.10).aspx, Mar. 20, 2011, 10 pages.

"Get history and other info about your code", <<http://msdn.microsoft.com/en-us/library/dn269218.aspx>>, retrieved May 23, 2014,, 10 pages.

"Interactive 3D Audio Rendering Guidelines, Level 2.0", In proceedings of 3D Working Group of the Interactive Audio Special Interest Group, Sep. 20, 1999, 29 pages.

"Interest Point Detection", Available at: http://en.wikipedia.org/wiki/Interest_point_detection, Apr. 21, 2014, 3 pages.

"Lifecycle Services for Microsoft Dynamics User Guide (LCS) [AX 2012]", Available at: http://technet.microsoft.com/en-us/library/dn268616.aspx, Aug. 8, 2013, 5 pages.

"Low-Footprint Adaptation and Personalization fora Deep Neural Network", U.S. Appl. No. 14/201,704, filed Mar. 7, 2014, 20 pages.

"Microsoft CodeLens Code Health Indicator extension", <<https://developer.apple.com/library/ios/documentation/ToolsLanguages/Conceptual/Xcode_Overview/DebugYourApp/DebugYourApp.html>>, Mar. 10, 2014, 13 pages.

"New CodeLens Indicator—Incoming Changes", <<http://msdn.microsoft.com/en-us/library/dn269218.aspx>>, retrieved May 23, 2014,, 8 pages.

"Secure Separation in Cisco Unified Data Center Architecture", Available at: http://www.cisco.com/en//solutions/collateral/ns340/ns414/ns742/ns743/ns1050/white_paper_c11-722425.html, Oct. 1, 2013, 8 pages.

"Shared Hidden Layer Combination for Speech Recognition Systems", U.S. Appl. No. 14/265,110, filed Apr. 29, 2014, 22 pages.

"Types of vCloud Hybrid Service", Available at: http://pubs.vmware.com/vchs/index.jsp?topic=%2FGUID-FD4D5E84-1AB8-4A1B-8C3F-769176FCD154%2FGUID-375065F3-110A-4B84-99FA-FB8467361960.html, Dec. 16, 2012, 2 pages.

"UI Element Guidelines: Menus", Available at: https://developer.apple.com/library/mac/documentation/userexperience/conceptual/applehiguidelines/Menus/Menus.html, Sep. 26, 2011, 22 pages.

"Unified Communications Interoperability Forum and Open Networking Foundation Announce Collaborative Relationship Between Unified Communications and Software-Defined Networks", Retrieved From: <http://www.businesswire.com/news/home/20131120005275/en/Unified-Communications-Interoperability-Forum-Open-Networking-Foundation> Mar. 7, 2014, Nov. 20, 2013, 2 Pages.

"Unified Communications Managed API 3.0 Core SDK Documentation", retrieved from: http://msdn.microsoft.com/en-us/library/gg421023.aspx on Feb. 14, 2012, Dec. 1, 2011, 2 pages.

"Xcode OpenGL ES Tools Overview", Retrieved on: Jun. 5, 2014 Available at: https://developer.apple.com/library/prerelease/ios/documentation/3DDrawing/Conceptual/OpenGLES_Programming-Guide/ToolsOverview/ToolsOverview.html, 10 pages.

Abad, et al., "Context Dependent Modelling Approaches for Hybrid Speech Recognizers", In Proceeding of INTERSPEECH, Sep. 26, 2010, 4 pages.

Abdel-Hamid, et al., "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.

Abid, et al., "A New Neural Network Pruning Method Based on the Singular Value Decomposition and the Weight Initialization", In Proceedings of 11th European Signal Processing Conference, Sep. 3, 2002, 4 pages.

Adams, "The Next Generation of USB Connector Will Plug in Either Way", Retrieved From: <http://www.popsci.com/article/gadgets/next-generation-usb-connector-will-plug-either-way> May 16, 2014, Dec. 4, 2013, 3 Pages.

Ajdler, et al., "The Plenacoustic Function and Its Sampling", In IEEE Transactions on Signal Processing, vol. 54, Issue 10, Oct. 2006, 35 pages.

Ajmani, et al., "Scheduling and Simulation: How to Upgrade Distributed Systems", In Proceedings of the 9th conference on Hot Topics in Operating Systems, vol. 9., May 18, 2013, 6 pages.

Alt, et al., "Increasing the User's Attention on the Web: Using Implicit Interaction Based on Gaze Behavior to Tailor Content", In Proceedings of the 7th Nordic Conference on Human-Computer Interaction—Making Sense through Design, Oct. 14, 2012, 10 pages.

Azizyan, et al., "SurroundSense: Mobile Phone Localization via Ambience Fingerprinting", In Proceedings of the 15th annual international conference on Mobile computing and networking, Sep. 20, 2009, 12 pages.

Barman, et al., "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.

Beymer, et al., "WebGazeAnalyzer: A System for Capturing and Analyzing Web Reading Behavior Using Eye Gaze", In Proceedings of Extended Abstracts on Human Factors in Computing Systems, Apr. 2, 2005, 10 pages.

Bonzi, et al., "The Use of Anaphoric Resolution for Document Description in Information Retrieval", In Proceedings of Information Processing & Management, vol. 25, Issue 4, Jun. 1989, 14 pages.

Bradley, et al., "Accuracy and Reproducibility of Auditorium Acoustics Measures", In Proceedings of British Institute of Acoustics, vol. 10, May 6, 2014, 2 pages.

Broder, "A Taxonomy of Web Search", In Proceedings of ACM SIGIR Forum, vol. 36, Issue 2, Sep. 2002, 8 pages.

Burges, "From Ranknet to Lambdarank to Lambdamart: An Overview", In Microsoft Research Technical Report MSR-TR-2010-82, Jun. 23, 2010, 19 pages.

Burges, "Learning to Rank with Nonsmooth Cost Functions", In Proceedings of the Advances in Neural Information Processing Systems, Dec. 2006, 8 pages.

Buscher, et al., "Generating and Using Gaze-Based Document Annotations", In Proceedings of Extended Abstracts on Human Factors in Computing Systems, Apr. 5, 2008, 6 pages.

Calamia, "Advances in Edge-Diffraction Modeling for Virtual-Acoustic Simulations", In Doctoral Dissertation of Princeton University, Jun. 2009, 159 pages.

Calian, "Passage-Level Evidence in Document Retrieval", In Proceedings of the 17th Annual International ACM SIGIR Conference on Research and Development in Information Retrieval, Jul. 3, 1994, 9 Pages.

Castro, et al., "A Probabilistic Room Location Service for Wireless Networked Environments", In Proceedings of the 3rd international conference on Ubiquitous Computing, Sep. 30, 2001, 19 pages.

Chandak, et al., "Ad-Frustum: Adaptive Frustum Tracing for Interactive Sound Propagation", In IEEE Transactions on Visualization and Computer Graphics, vol. 14, Issue 6, Nov. 2008, 8 pages.

Chen, "Building Language Model on Continuous Space using Gaussian Mixture Models", In Proceedings of Research in Language Modeling, Jan. 2007, 66 pages.

(56) References Cited

OTHER PUBLICATIONS

Cheng, et al., "Entityrank: Searching Entities Directly and Holistically", In Proceedings of the 33rd International Conference on Very Large Data Bases, Sep. 23, 2007, 12 pages.
Cheng, et al., "Heritage and Early History of the Boundary Element Method", In Proceedings of Engineering Analysis with Boundary Elements, vol. 29, Issue 3, Mar. 2005, 35 pages.
Chi, et al., "Visual Foraging of Highlighted Text: An Eye-Tracking Study", In Proceedings of the 12th International Conference on Human-Computer Interaction—Intelligent Multimodal Interaction Environments, Jul. 22, 2007, 10 pages.
Choi, et al., "Face Annotation for Personal Photos Using Collaborative Face Recognition in Online Social Networks", In 16th International Conference on Digital Signal Processing, Jul. 5, 2009, 8 pages.
Choudhury, et al., "A Framework for Robust Online Video Contrast Enhancement Using Modularity Optimization", In IEEE Transactions on Circuits and Systems for Video Technology, vol. 22 , Issue: 9, Sep. 2012, 14 pages.
Clarke, "Exploiting Redundancy in Question Answering", In Proceedings of the 24th Annual International ACM SIGIR Conference on Research and Development in Information Retrieval, Sep. 9, 2001, 8 pages.
Cucerzan, "Large-Scale Named Entity Disambiguation Based on Wikipedia Data", In Proceedings of the Joint Conference on Empirical Methods in Natural Language Processing and Computational Natural Language Learning, Jun. 28, 2007, 9 Pages.
Dahl, et al., "Context-Dependent Pre-Trained Deep Neural Networks for Large Vocabulary Speech Recognition", In IEEE Transactions on Audio, Speech, and Language Processing, vol. 20, Issue 1, Jan. 1, 2012, 13 pages.
Dahl, et al., "Large Vocabulary Continuous Speech Recognition with Context-Dependent DBN-HMMs", In IEEE International Conference on Acoustics, Speech and Signal Processing, May 22, 2011, 4 pages.
Davis, et al., "Low-Rank Approximations for Conditional Feedforward Computation in Deep Neural Networks", In Proceedings of ArXiv preprint arXiv: 1312.4461, Dec. 2013, 10 Pages.
Edens, et al., "An Investigation of Broad Coverage Automatic Pronoun Resolution for Information Retrieval", In Proceedings of the 26th Annual International ACM SIGIR Conference on Research and Development in Information Retrieval, Jul. 28, 2003, 2 pages.
Fang, et al., "A Formal Study of Information Retrieval Heuristics", In Proceedings of the 27th Annual International ACM SIGIR Conference on Research and Development in Information Retrieval, Jul. 25, 2004, 8 pages.
Ferguson, "Five Key Criteria for adaptable SDN Wi-Fi", Retrieved From: <http://www.extremenetworks.com/five-key-criteria-for-adaptable-sdn-wi-fi/> Mar. 7, 2014, Nov. 25, 2013, 7 Pages.
Finkel, "Incorporating Non-Local Information into Information Extraction Systems by Gibbs Sampling", In Proceedings of the 43rd Annual Meeting on Association for Computational Linguistics, Jun. 2005, 8 pages.
Funkhouser, et al., "A Beam Tracing Method for Interactive Architectural Acoustics", In Journal of the Acoustical Society of America, Feb. 2004, 18 pages.
Funkhouser, et al., "Realtime Acoustic Modeling for Distributed Virtual Environments", In Proceedings of the 26th annual conference on Computer graphics and interactive techniques, Jul. 1, 1999, 10 pages.
Gade, "Acoustics in Halls for Speech and Music", In Springer Handbook of Acoustics, May 6, 2014, 8 pages.
Gemello, et al., "Adaptation of Hybrid ANN/HMM Models Using Linear Hidden Transformations and Conservative Training", In IEEE International Conference on Acoustics, Speech and Signal Processing, May 14, 2006, 4 pages.
Goldstein, et al., "Summarizing Text Documents: Sentence Selection and Evaluation Metrics", In Proceedings of the 22nd Annual International ACM SIGIR Conference on Research and Development in Information Retrieval, Aug. 1, 1999, 8 pages.

Gruenstein, et al., "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.
Gumerov, et al., "Fast multipole methods on graphics processors", In Journal of Computational Physics, vol. 227, Issue 18, Sep. 10, 2008, 4 pages.
Harper, et al., "A Language Modelling Approach to Relevance Profiling for Document Browsing", In Proceedings of the 2nd ACM/IEEE-CS Joint Conference on Digital Libraries, Jul. 13, 2007, 8 pages.
Harper, et al., "Within-Document Retrieval: A User-Centred Evaluation of Relevance Profiling", In Journal of Information Retrieval, vol. 7, Issue 3-4, Sep. 2004, 26 pages.
Harris, "On the use of windows for harmonic analysis with the discrete Fourier transform", In Proceedings of the IEEE vol. 66, Issue 1, Jan. 1978, 33 pages.
Hawamdeh, et al., "Paragraph-based nearest neighbour searching in full-text documents", In Proceedings of Electronic Publishing, vol. 2, Dec. 1989, 14 pages.
Hearst, "Tilebars: Visualization of Term Distribution Information in Full Text Information Access", In Proceedings of the SIGCHI Conference on Human Factors in Computing Systems, May 7, 1995, 8 pages.
Heck, et al., "Robustness to Telephone Handset Distortion in Speaker Recognition by Discriminative Feature Design", In Journal of Speech Communication—Speaker Recognition and its Commercial and Forensic Applications, vol. 31, Issue 2-3, Jun. 2000, 12 pages.
Hinton, et al., "Deep Neural Networks for Acoustic Modeling in Speech Recognition", In IEEE Signal Processing Magazine, vol. 29, Issue 6, Nov. 2012, 27 pages.
Hodgson, et al., "Experimental evaluation of radiosity for room sound-field prediction", In the Journal of the Acoustical Society of America, Aug. 2006, 12 pages.
Hsu, et al., "HBCI: Human-Building-Computer Interaction", In Proceedings of the 2nd ACM Workshop on Embedded Sensing Systems for Energy-Efficiency in Building, Nov. 2, 2010, 6 pages.
Hughes, "Apple's Lightning Port Dynamically Assigns Pins to Allow for Reversible Use", Retrieved From: <http://appleinsider.com/articles/12/09/25/apples_lightning_port_dynamically_assigns_pins_to_allow_for_reversible_use> May 16, 2014, Sep. 25, 2012, 9 pages.
Jacob, "QR Directory App—Overview", In Blog of Josh Jacob Dev, Apr. 21, 2011, 3 pages.
Jaitly, et al., "Application of Pretrained Deep Neural Networks to Large Vocabulary Conversational Speech Recognition", In Proceedings of 13th Annual Conference of the International Speech Communication Association, Mar. 12, 2012, 11 pages.
Jones, "Automatic Summarising: The state of the Art", In Journal of Information Processing and Management: an International Journal, vol. 43, Issue 6, Nov. 1, 2007, 52 pages.
Kaszkiel, et al., "Effective Ranking with Arbitrary Passages", In Journal of the American Society for Information Science and Technology, vol. 52, Issue 4, Feb. 15, 2001, 21 pages.
Kaszkiel, et al., "Efficient Passage Ranking for Document Databases", In Journal of ACM Transactions on Information Systems, Oct. 1, 1999, 26 pages.
Kolarik, et al., "Perceiving Auditory Distance Using Level and Direct-to-Reverberant Ratio Cues", In the Journal of the Acoustical Society of America, Oct. 2011, 4 pages.
Konig, et al., "Nonlinear Discriminant Feature Extraction for Robust Text-Independent Speaker Recognition", In Proceeding of the RLA2C, ESCA workshop on Speaker Recognition and its Commercial and Forensic Applications, Apr. 1998, 4 pages.
Koo, et al., "Autonomous Construction of a WiFi Access Point Map Using Multidimensional Scaling", In Proceedings of the 9th international conference on Pervasive computing, Jun. 12, 2011, 18 pages.
Krokstad, "The Hundred Years Cycle in Room Acoustic Research and Design", In Proceedings of Reflections on sound, Jun. 2008, 30 pages.

(56) References Cited

OTHER PUBLICATIONS

Kumar, et al., "Gaze-Enhanced Scrolling Techniques", In Proceedings of the 20th Annual ACM Symposium on User Interface Software and Technology, Oct. 2007, 4 pages.
Kuttruff, "Room Acoustics, Fourth Edition", Available at: http://www.crcpress.com/product/isbn/9780419245803, Aug. 3, 2000, 1 page.
Laflen, et al., "Introducing New Features in the VSTS Database Edition GDR", http://msdn.microsoft.com/en-us/magazine/dd483214.aspx, Nov. 2008, 16 pages.
Lavrenko, et al., "Relevance-Based Language Models", In Proceedings of the 24th Annual International ACM SIGIR Conference on Research and Development in Information Retrieval, Sep. 9, 2001, 8 pages.
Lecouteux, et al., "Dynamic Combination of Automatic Speech Recognition Systems by Driven Decoding", In Journal of IEEE Transactions on Audio, Speech and Language Processing, Jan. 2013, 10 pages.
Li et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.
Li, et al., "Lattice Combination for Improved Speech Recognition", In Proceedings of the 7th International Conference of Spoken Language Processing, Sep. 16, 2002, 4 pages.
Li, et al., "Spatial Sound Rendering Using Measured Room Impulse Responses", In IEEE International Symposium on Signal Processing and Information Technology, Aug. 27, 2006, 5 pages.
Liao, "Speaker Adaptation of Context Dependent Deep Neural Networks", In IEEE International Conference on Acoustics, Speech and Signal Processing, May 26, 2013, 5 pages.
Lin, et al., "What Makes a Good Answer? The Role of Context in Question Answering", In Proceedings of the Ninth IFIP TC13 International Conference on Human-Computer Interaction, Sep. 2003, 8 pages.
Liu, et al., "Use of Contexts in Language Model Interpolation and Adaptation", In Journal of Computer Speech and Language vol. 27 Issue 1, Feb. 2009, 23 pages.
Loizides, et al., "The Myth of Find: User Behaviour and Attitudes Towards the Basic Search Feature", In Proceedings of the 8th ACM/IEEE-CS Joint Conference on Digital Libraries, Jun. 16, 2008, 4 pages.
Lv, et al., "A Comparative Study of Methods for Estimating Query Language Models with Pseudo Feedback", In Proceedings of the 18th ACM Conference on Information and Knowledge Management, Nov. 2, 2009, 4 pages.
Lv, et al., "Positional Language Models for Information Retrieval", In Proceedings of the 32nd International ACM SIGIR Conference on Research and Development in Information Retrieval, Jul. 19, 2009, 8 pages.
Machiraju, et al., "Designing Multitenant Applications on Windows Azure", Available at: http://msdn.microsoft.com/en-us/library/windowsazure/hh689716.aspx, Apr. 18, 2013, 20 pages.
Mavridis, et al., "Friends with Faces: How Social Networks Can Enhance Face Recognition and Vice Versa", In Proceedings of Computational Social Networks Analysis: Trends, Tools and Research Advances, May 24, 2010, 30 pages.
Mehra, et al., "An efficient GPU-based time domain solver for the acoustic wave equation", In Proceedings of Applied Acoustics, vol. 73, Issue 2, Feb. 2012, 13 pages.
Mehra, et al., "Wave-Based Sound Propagation in Large Open Scenes Using an Equivalent Source Formulation", In Journal of ACM transactions on Graphics, vol. 32, Issue 2, Apr. 1, 2013, 13 pages.
Mehrotra, et al., "nterpolation of Combined Head and Room Impulse Response for Audio Spatialization", In Proceeding of IEEE 13th International Workshop on Multimedia Signal Processing, Oct. 17, 2011, 6 pages.
Meinedo, et al., "Combination of Acoustic Models in Continuous Speech Recognition Hybrid Systems", In Proceedings of Sixth International Conference on Spoken Language Processing, Oct. 2000, 4 pages.
Menezes, et al., "Session-based Device Configuration", U.S. Appl. No. 14/257,502, 67 pages.
Mihalcea, et al., "Wikify!: Linking Documents to Encyclopedic Knowledge", In Proceedings of the Sixteenth ACM Conference on Conference on Information and Knowledge Management,, Nov. 6, 2007, 9 Pages.
Mohamed, et al., "Acoustic Modeling Using Deep Belief Networks", In IEEE Transactions on Audio, Speech, and Language Processing, vol. 20, Issue 1, Jan. 2012, 10 pages.
Motlicek, et al., "Feature and Score Level Combination of Subspace Gaussinasin LVCSR Task", In IEEE International Conference on Acoustics, Speech and Signal Processing, May 26, 2013, 5 pages.
Na, et al., "A 2-Poisson Model for Probabilistic Coreference of Named Entities for Improved Text Retrieval", In Proceedings of the 32nd International ACM SIGIR Conference on Research and Development in Information Retrieval, Jul. 19, 2009, 8 pages.
Neve, et al., "Face Recognition for Personal Photos using Online Social Network Context and Collaboration", In Guest Lecture at KAIST, Dec. 14, 2010, 54 pages.
Novak, et al., "Use of Non-Negative Matrix Factorization for Language Model Adaptation in a Lecture Transcription Task", In Proceedings of IEEE International Conference on Acoustics, Speech, and Signal Processing, vol. 1, May 7, 2001, 4 pages.
Papadopoulos, et al., "Image Clustering Through Community Detection on Hybrid Image Similarity Graphs", In 17th IEEE International Conference on Image Processing, Sep. 26, 2014, 4 pages.
Perenson, "In-depth Look at Google+ Photo Update with the Team that Designed it", Available at: http://connect.dpreview.com/post/1400574775/hands-on-with-google-plus-photo-update, May 17, 2013, 10 pages.
Peter, et al., "Frequency-domain edge diffraction for finite and infinite edges", In Proceedings of Acta acustica united with acustica, vol. 95, No. 3, May 6, 2014, 2 pages.
Petkova, et al., "Proximity-Based Document Representation for Named Entity Retrieval", In Proceedings of the Sixteenth ACM Conference on Conference on Information and Knowledge Management, Nov. 6, 2007, 10 pages.
Pierce, "An Introduction to Its Physical Principles and Applications", In Acoustical Society of America, Jun. 1989, 1 page.
Ponte, et al., "A Language Modelling Approach to Information Retrieval", In Proceedings of the 21st Annual International ACM SIGIR Conference on Research and Development in Information Retrieval, Aug. 1, 1998, 7 pages.
Poulos, et al., "Assisted Viewing of Web-based Resources", U.S. Appl. No. 14/161,693, filed Jan. 23, 2014, 48 pages.
Raghuvanshi, "Interactive Physically-based Sound Simulation", In UMI Dissertation, Sep. 9, 2011, 187 Pages.
Raghuvanshi, et al., "Efficient and Accurate Sound Propagation Using Adaptive Rectangular Decomposition", In IEEE Transactions on Visualization and Computer Graphics, vol. 15, Issue 99, Feb. 13, 2009, 13 pages.
Raghuvanshi, et al., "Precomputed wave simulation for real-time sound propagation of dynamic sources in complex scenes", In Journal of ACM Transactions on Graphics, vol. 29, Issue 4, Jul. 26, 2010, 11 pages.
Rindel, et al., "The Use of Colors, Animations and Auralizations in Room Acoustics", In Internoise, Sep. 15, 2013, 9 Pages.
Roberts, et al., "Evaluating Passage Retrieval Approaches for Question Answering", In Proceedings of 26th European Conference on Information Retrieval, Apr. 14, 2003, 8 pages.
Robertson, et al., "Okapi at TREC-3", In Proceedings of Text Retrieval Conference, Jan. 24, 2014, 19 pages.
Rouillard, "Contextual QR Codes", In Proceedings of the Third International Multi-Conference on Computing in the Global Information Technology, Jul. 27, 2008, 6 pages.
Sabine, "Room acoustics", In Transactions of the IRE Professional Group on Audio, vol. 1, Issue 4, Jul. 1953, 9 pages.

(56) References Cited

OTHER PUBLICATIONS

Sainath, et al., "Auto-Encoder Bottleneck Features Using Deep Belief Networks", In Proceedings of IEEE International Conference on Acoustics, Speech and Signal Processing, Mar. 25, 2012, 4 pages.
Sainath, et al., "Low-Rank Matrix Factorization for Deep Neural Network Training with High-Dimensional Output Targets", In proceedings of IEEE International Conference on Acoustics, Speech and Signal Processing, May 26, 2013, 5 pages.
Sainath, et al., "Making Deep Belief Networks Effective for Large Vocabulary Continuous Speech Recognition", In Proceedings of IEEE Workshop on Automatic Speech Recognition and Understanding, Dec. 11, 2011, 6 pages.
Sakamoto, et al., "Calculation of impulse responses and acoustic parameters in a hall by the finite-difference time-domain method", In Proceedings of Acoustical Science and Technology, vol. 29, Issue 4, Feb. 2008, 10 pages.
Saluja, et al., "Context-aware Language Modeling for Conversational Speech Translation", In Proceedings of Machine Translation Summit XIII, Sep. 19, 2011, 8 pages.
Sarukkai, et al., "Improved Spontaneous Dialogue Recognition Using Dialogue and Utterance Triggers by Adaptive Probability Boosting", In Fourth International Conference on Spoken Language, vol. 1, Oct. 3, 1996, 4 pages.
Satoh, et al., "Poster Abstract: Ambient Sound-based Proximity Detection with Smartphones", In Proceedings of the 11th ACM Conference on Embedded Networked Sensor Systems, Nov. 11, 2013, 2 pages.
Savioja, "Real-Time 3D Finite-Difference Time-Domain Simulation of Mid-Frequency Room Acoustics", In Proceedings of the 13th International Conference on Digital Audio Effects, Sep. 6, 2010, 8 pages.
Savioja, et al., "Simulation of room acoustics with a 3-D finite difference mesh", In Proceedings of the International Computer Music Conference, Sep. 1994, 4 pages.
Seide, et al., "Conversational Speech Transcription using Context-Dependent Deep Neural Networks", In Proceeding of 12th Annual Conference of the International Speech Communication Association, Aug. 28, 2011, 4 pages.
Shah, et al., "All Smiles: Automatic Photo Enhancement by Facial Expression Analysis", In Proceedings of Conference on Visual Media Production, Dec. 5, 2012, 10 pages.
Shanklin, "Samsung Galaxy S4 to Feature Eye-Tracking Technology", Available at: http://www.gizmag.com/galaxy-s4-eye-tracking-technology/26503/, Mar. 4, 2013, 5 pages.
Shieh, et al., "Seawall: Performance Isolation for Cloud Datacenter Networks", In Proceedings of the 2nd UNENIX Conference on Hot Topics in Cloud Computing, Jun. 22, 2010, 7 pages.
Singhal, et al., "Pivoted Document Length Normalization", In Proceedings of the 19th Annual International ACM SIGIR Conference on Research and Development in Information Retrieval, Aug. 18, 1996, 12 pages.
Singh-Miller, et al., "Dimensionality Reduction for Speech Recognition Using Neighborhood Components Analysis", In Proceedings of 8th Annual Conference of the International Speech Communication Association, Antwerp, Dec. 27, 2007, 4 pages.
Siniscalchi, et al., "Hermitian Based Hidden Activation Functions for Adaptation of Hybrid HMM/ANN Models", In Proceedings of 13th Annual Conference of the International Speech Communication Association,, Sep. 9, 2012, 4 pages.
Starr, "Facial recognition app matches strangers to online profiles", Available at: http://www.cnet.com.au/facial-recognition-app-matches-strangers-to-online-profiles-339346355.htm, Jan. 7, 2014, 10 pages.
Stettner, et al., "Computer Graphics Visualization for Acoustic Simulation", In Proceedings of the 16th annual conference on Computer graphics and interactive techniques, vol. 23, No. 3, Jul. 1989, 12 pages.
Su, et al., "Error Back Propagation for Sequence Training of Context-Dependent Deep Networks for Conversational Speech Transcription", In IEEE International Conference on Acoustics, Speech, and Signal Processing, May 26, 2013, 5 pages.

Svensson, et al., "The use of Ambisonics in describing room impulse responses", In Proceedings of the International Congress on Acoustics, Apr. 2004, 4 pages.
Swietojanski, et al., "Revisiting Hybrid and GMM-HMM System Combination Techniques", In Proceeding of the IEEE International Conference on Acoustics, Speech and Signal Processing, May 26, 2013, 5 pages.
Takala, et al., "Sound rendering", In Proceedings of Siggraph Computer Graphics, Jul. 1992, 11 pages.
Taylor, et al., "RESound: interactive sound rendering for dynamic virtual environments", In Proceedings of the 17th ACM international conference on Multimedia, Oct. 19, 2009, 10 pages.
Tellex, et al., "Quantitative Evaluation of Passage Retrieval Algorithms for Question Answering", In Proceedings of the 26th Annual International ACM SIGIR Conference on Research and Development in Information Retrieval, Jul. 28, 2003, 7 pages.
Thompson, "A review of finite-element methods for time-harmonic acoustics", In Journal of Acoustical Society of America, vol. 119, Issue 3, Mar. 2006, 16 pages.
Tombros, et al., "Advantages of Query Biased Summaries in Information Retrieval", In Proceedings of the 21st Annual International ACM SIGIR Conference on Research and Development in Information Retrieval, Aug. 1, 1998, 9 Pages.
Trmal, et al., "Adaptation of a Feedforward Artificial Neural Network Using a Linear Transform", In Proceedings of in Text, Speech and Dialogue, Sep. 10, 2010, 8 pages.
Tsay, et al., "Personal Photo Organizer based on Automated Annotation Framework", In 5th International Conference on Intelligent Information Hiding and Multimedia Signal Processing, Sep. 12, 2009, 4 pages.
Valimaki, et al., "Fifty Years of Artificial Reverberation. Audio, Speech, and Language Processing", In IEEE Transactions on Audio, Speech, and Language Processing, vol. 20, Issue 5, Jul. 2012, 28 pages.
Van "Transform Coding of Audio Impulse Responses", In Master's Thesis of Delft University of Technology, Aug. 2003, 109 pages.
Van "Unified Communication and Collaboration from the User's Perspective", retrieved from: http://www.ucstrategies.com/unified-communications-expert-views/unified-communication-and-collaboration-from-the-users-perspective.aspx on Dec. 8, 2009, Dec. 8, 2009, 2 pages.
Vanhoucke, et al., "Improving the Speed of Neural Networks on CPUs", In Proceedings of NIPS Workshop on Deep Learning and Unsupervised Feature Learning, Dec. 16, 2011, 8 pages.
Wu, et al., "Adapting Boosting for Information Retrieval Measures", In Journal of Information Retrieval, vol. 13, Issue 3, Jun. 1, 2010, 17 pages.
Xu, et al., "User-Oriented Document Summarization through Vision-Based Eye-Tracking", In Proceedings of the 14th International Conference on Intelligent User Interfaces, Feb. 8, 2009, 10 pages.
Xue, et al., "Restructuring Deep Neural Network Acoustic Models", U.S. Appl. No. 13/920,323, filed Jun. 18, 2013, 30 pages.
Xue, et al., "Restructuring of Deep Neural Network Acoustic Models with Singular Value Decomposition", In Proceedings of 14th Annual Conference of the International Speech Communication Association,, Aug. 25, 2013, 5 pages.
Yan, et al., "A Scalable Approach to Using DSS-Derived Features in GMM-HMM Based Acoustic Modeling for LVCSR", In Proceeding of the 14th Annual Conference of the International Speech Communication Association, Aug. 25, 2013, 5 pages.
Yang, et al., "Qualifier in TREC-12 QA Main Task", In Proceedings of the Twelfth Text Retrieval Conference, Nov. 2003, 9 Pages.
Yao, et al., "Adaptation of Context-Dependent Deep Neural Networks for Automatic Speech Recognition", In IEEE Spoken Language Technology Workshop, Dec. 2, 2012, 4 pages.
Yeh, et al., "Wave-ray Coupling for Interactive Sound Propagation in Large Complex Scenes", In Journal of ACM Transactions on Graphics, vol. 32 Issue 6, Nov. 2013, 10 pages.
Yu, et al., "Exploiting Sparseness in Deep Neural Networks for Large Vocabulary Speech Recognition", In Proceeding of IEEE International Conference on Acoustics, Speech and Signal Processing, Mar. 25, 2012, 4 pages.

(56) References Cited

OTHER PUBLICATIONS

Yu, et al., "Improved Bottleneck Features Using Pretrained Deep Neural Networks", In Proceedings of 12th Annual Conference of the International Speech Communication Association, Aug. 28, 2011, 4 pages.
Yu, et al., "KL-Divergence Regularized Deep Neural Network Adaptation for Improved Large Vocabulary Speech Recognition", In IEEE International Conference on Acoustics, Speech and Signal Processing, May 26, 2013, 5 pages.
Zhai, et al., "A Study of Smoothing Methods for Language Models Applied to Ad Hoc Information Retrieval", In Proceedings of the 24th Annual International ACM SIGIR Conference on Research and Development in Information Retrieval, Sep. 9, 2009, 9 Pages.
Zwol, et al., "Prediction of Favorite Photos using Social, Visual, and Textual Signals", In Proceedings of the International Conference on Multimedia, Oct. 25, 2010, 4 pages.
"GPU-Accelerated Route Planning", https://www.cs.unc.edu/cms/research/summaries/GPUAcceleratedRoutePlanning.pdf, Aug. 2005, 2 pages.
"Non-Final Office Action", U.S. Appl. No. 13/920,323, dated Feb. 27, 2015, 13 pages.
"Non-Final Office Action", U.S. Appl. No. 14/304,174, dated Jun. 29, 2015, 15 pages.
"Non-Final Office Action", U.S. Appl. No. 14/456,679, dated Jun. 19, 2015, 22 pages.
Abraham,"Hierarchical Hub Labelings for Shortest Paths", In Technical Report MSR-TR-MSR-TR-2012-46, Apr. 2012, 15 pages.
Bast,"Fast Routing in Road Networks with Transit Nodes", In Proceedings of Science, vol. 316, No. 5824, Apr. 27, 2007, p. 566.
Bast,"Route Planning in Transportation Networks", In Technical Report MSR-TR-2014-4, Jan. 8, 2014, 57 pages.
Bleiweiss,"GPU Accelerated Pathfinding", In Proceedings of the 23rd ACM Siggraph/Eurographics symposium on Graphics hardware, Jun. 20, 2008, pp. 65-74.
Cormen,"Introduction to Algorithms", The MIT Press, Jul. 31, 2009, 43 pages.
Delling,"Customizable Route Planning in Road Networks", In Proceedings of the Sixth Annual Symposium on Combinatorial Search, Jul. 2011, pp. 1-31.
Delling,"Customizable Route Planning", In Proceedings of the 10th International Symposium on Experimental Algorithms, May 2011, pp. 1-12.
Delling,"Faster Customization of Road Networks", In Proceedings of the 12th International Symposium on Experimental Algorithms, Jun. 5, 2013, pp. 1-12.
Delling,"Graph Partitioning with Natural Cuts", In Proceedings of the IEEE International Parallel & Distributed Processing Symposium, May 16, 2011, 15 pages.
Delling,"PHAST: Hardware-Accelerated Shortest Path Trees", In Journal of Parallel and Distributed Computing, vol. 73, No. 7, Jul. 2013, 11 pages.
Delling,"Query Scenarios for Customizable Route Planning", U.S. Appl. No. 13/649,114, filed Oct. 11, 2012, 27 pages.
Dong,"Image Retargeting by Content-Aware Synthesis", IEEE Transactions on Visualization and Computer Graphics, vol. XX, No. XX, Jun. 2014, Mar. 26, 2014, 14 pages.
Efentakis,"Optimizing Landmark-Based Routing and Preprocessing", In Proceedings of the Sixth ACM SIGSPATIAL International Workshop on Computational Transportation Science, Nov. 5, 2013, 6 pages.
Geisberger,"Efficient Routing in Road Networks with Turn Costs", In Proceedings of the 10th International Conference on Experimental Algorithms, May 5, 2011, 12 pages.
Gooch,"Color2Gray: Salience-Preserving Color-Removal", In Journal of ACM Transactions on Graphics, vol. 24, Issue 3, Jul. 2006, 6 pages.
Holzer,"Engineering Multilevel Overlay Graphs for Shortest-Path Queries", In ACM Journal of Experimental Algorithmics, vol. 13, Sep. 2008, 26 pages.
Kohler,"Fast Point-to-Point Shortest Path Computations with Arc-Flags", In Proceedings of Shortest Path Computations: Ninth DIMACS Challenge, vol. 24 of DIMACS Book. American Mathematical Society, Nov. 13, 2006, pp. 1-27.
Lilly,"Robust Speech Recognition Using Singular Value Decomposition Based Speech Enhancement", IEEE TENCON, 1997, 4 pages.
Lu,"Context Aware Textures", In Journal of ACM Transactions on Graphics, vol. 26 Issue 1, Jan. 2007, 31 pages.
Madduri,"Parallel Shortest Path Algorithms for Solving Large-Scale Instances", In Proceedings of 9th DIMACS Implementation Challenge—The Shortest Path Problem, Aug. 30, 2006, 39 pages.
Meyer,"D-Stepping: A Parallelizable Shortest Path Algorithm", In Journal of Algorithms, vol. 49, Issue 1, Oct. 2003, pp. 114-152.
Ortega-Arranz,"A New GPU-based Approach to the Shortest Path Problem", In Proceedings of International Conference on High Performance Computing and Simulation, Jul. 1, 2013, 7 pages.
Perumalla, "GPU-based Real-Time Execution of Vehicular Mobility Models in Large-Scale Road Network Scenarios", In ACM/IEEE/SCS 23rd Workshop on Principles of Advanced and Distributed Simulation, Jun. 22, 2009, 9 pages.
Shan,"Image Based Surface Detail Transfer", in IEEE Computer Graphics and Applications, vol. 24 Issue 3, May 2004, 6 pages.
Shen,"Agent-based Traffic Simulation and Traffic Signal Timing Optimization with GPU", 2011 14th International IEEE Conference on Intelligent Transportation Systems, Oct. 5, 2011, pp. 145-150.
Sommer,"Shortest-Path Queries in Static Networks", In Proceedings of ACM Computing Surveys, Apr. 7, 2014, 35 pages.
Wodecki,"Multi-GPU Parallel Memetic Algorithm for Capacitated Vehicle Routing Problem", In Proceedings of Distributed, Parallel, and Cluster Computing, Jan. 21, 2014, pp. 207-214.
"Corrected Notice of Allowance", U.S. Appl. No. 14/275,806, dated Nov. 3, 2015, 2 pages.
"Creating Interactive Virtual Auditory Environments", IEEE Computer Graphics and Applications, Aug. 2002, 10 pages.
"Final Office Action", U.S. Appl. No. 12/970,949, dated Jun. 10, 2015, 25 pages.
"Final Office Action", U.S. Appl. No. 13/327,794, dated Nov. 20, 2014, 13 pages.
"Final Office Action", U.S. Appl. No. 13/530,015, dated Nov. 19, 2014, 48 pages.
"Final Office Action", U.S. Appl. No. 13/920,323, dated Sep. 24, 2015, 24 pages.
"Final Office Action", U.S. Appl. No. 14/304,911, dated Nov. 13, 2015, 7 pages.
"Final Office Action", U.S. Appl. No. 14/456,679, dated Nov. 2, 2015, 26 pages.
"Integrated Vapor Chamber for Thermal Management of Computing Devices", U.S. Appl. No. 14/294,040, filed Jun. 2, 2014, 27 pages.
"International Search Report and the Written Opinion", Application No. PCT/US2015/036595, dated Sep. 24, 2015, 10 pages.
"International Search Report and the Written Opinion", Application No. PCT/US2015/017872, dated Jun. 25, 2015, 11 pages.
"International Search Report and the Written Opinion", Application No. PCT/US2015/033545, dated Aug. 20, 2015, 11 pages.
"International Search Report and the Written Opinion", Application No. PCT/US2015/022887, dated Jun. 26, 2015, 12 pages.
"International Search Report and the Written Opinion", Application No. PCT/US2015/029334, dated Jul. 7, 2015, 12 pages.
"International Search Report and the Written Opinion", Application No. PCT/US2015/033872, dated Sep. 2, 2015, 12 pages.
"International Search Report and the Written Opinion", Application No. PCT/US2015/035219, dated Sep. 29, 2015, 12 pages.
"International Search Report and the Written Opinion", Application No. PCT/US2015/027689, dated Jul. 8, 2015, 13 pages.
"International Search Report and the Written Opinion", Application No. PCT/US2015/026971, dated Jul. 24, 2015, 15 pages.
"International Search Report and the Written Opinion", Application No. PCT/US2014/041023, dated Mar. 6, 2015, 17 pages.
"International Search Report and the Written Opinion", Application No. PCT/US2015/036767, dated Sep. 14, 2015, 19 pages.

(56) References Cited

OTHER PUBLICATIONS

"International Search Report and the Written Opinion", Application No. PCT/US2015/027688, dated Sep. 7, 2015, 9 pages.
"International Search Report and the Written Opinion", Application No. PCT/US2014/041014, dated Oct. 2, 2014, 9 pages.
"International Search Report and Written Opinion", Application No. PCT/US2015/030113, dated Aug. 7, 2015, 10 Pages.
"International Search Report and Written Opinion", Application No. PCT/US2015/030104, dated Aug. 7, 2015, 11 Pages.
"International Search Report and Written Opinion", Application No. PCT/US2015/030096, dated Aug. 19, 2015, 11 Pages.
"International Search Report and Written Opinion", Application No. PCT/US2015/036587, dated Oct. 8, 2015, 11 Pages.
"International Search Report and Written Opinion", Application No. PCT/US2015/032089, dated Jul. 31, 2015, 12 pages.
"International Search Report and Written Opinion", Application No. PCT/US2015/027409, dated Jul. 22, 2015, 13 pages.
"International Search Report and Written Opinion", Application No. PCT/US2015/028383, dated Jul. 24, 2015, 13 pages.
"International Search Report and Written Opinion", Application No. PCT/US2015/030153, dated Aug. 7, 2015, 13 Pages.
"International Search Report and Written Opinion", Application No. PCT/US2015/031270, dated Sep. 4, 2015, 16 Pages.
"International Search Report and Written Opinion", Application No. PCT/US2015/029805, dated Oct. 15, 2015, 20 pages.
"Non-Final Office Action", U.S. Appl. No. 12/970,949, dated Jan. 2, 2015, 24 pages.
"Non-Final Office Action", U.S. Appl. No. 13/530,015, dated Apr. 28, 2015, 32 pages.
"Non-Final Office Action", U.S. Appl. No. 13/903,944, dated Mar. 27, 2015, 24 pages.
"Non-Final Office Action", U.S. Appl. No. 13/923,917, dated May 28, 2015, 9 pages.
"Non-Final Office Action", U.S. Appl. No. 13/923,969, dated May 6, 2015, 7 pages.
"Non-Final Office Action", U.S. Appl. No. 14/201,704, dated Jul. 1, 2015, 6 pages.
"Non-Final Office Action", U.S. Appl. No. 14/264,012, dated Jul. 31, 2015, 7 pages.
"Non-Final Office Action", U.S. Appl. No. 14/266,795, dated Oct. 7, 2015, 10 pages.
"Non-Final Office Action", U.S. Appl. No. 14/273,100, dated Oct. 1, 2015, 20 pages.
"Non-Final Office Action", U.S. Appl. No. 14/275,724, dated Sep. 23, 2015, 8 pages.
"Non-Final Office Action", U.S. Appl. No. 14/275,761, dated Sep. 24, 2015, 8 pages.
"Non-Final Office Action", U.S. Appl. No. 14/304,911, dated Jul. 17, 2015, 6 pages.
"Notice of Allowance", U.S. Appl. No. 12/970,939, dated Dec. 19, 2014, 10 pages.
"Notice of Allowance", U.S. Appl. No. 12/970,943, dated Dec. 19, 2014, 10 pages.
"Notice of Allowance", U.S. Appl. No. 13/026,058, dated Nov. 7, 2014, 5 pages.
"Notice of Allowance", U.S. Appl. No. 13/367,377, dated Feb. 7, 2012, 10 pages.
"Notice of Allowance", U.S. Appl. No. 14/275,806, dated Oct. 8, 2015, 10 pages.
"Notice of Allowance", U.S. Appl. No. 14/312,562, dated Sep. 18, 2015, 13 pages.
"Restriction Requirement", U.S. Appl. No. 14/279,146, dated Sep. 3, 2015, 6 pages.
Ajwani, et al., "Breadth First Search on Massive Graphs", In Proceedings of the 9th DIMACS Implementation Challenge: The Shortest Path Problem, Nov. 2006, 15 pages.
Barrett, et al., "Implementations of Routing Algorithms for Transportation Networks", In Proceedings of the 9th DIMACS Implementation Challenge: The Shortest Path Problem, Nov. 2006, 19 pages.

Belhumeur, et al., "Eigenfaces vs. Fisherfaces: Recognition Using Class Specific Linear Projection", IEEE Transactions on Pattern Analysis and Machine Intelligence, Jul. 1997, pp. 711-720.
Bohus, et al., "Olympus: An Open-Source Framework for Conversational Spoken Language Interface Research", In Proceedings of the Workshop on Bridging the Gap: Academic and Industrial Research in Dialog Technologies, Apr. 2007, 8 pages.
Cao, et al., "Face Recognition with Learning-based Descriptor", In Proceedings of the IEEE Conference on Computer Vision and Pattern Recognition (CVPR), Jun. 2010, 8 pages.
Chandrasekaran, et al., "Sparse and Low-Rank Matrix Decompositions"; IFAC Symposium on System Identification, 2009, 6 pages.
Chen, et al., "Bayesian Face Revisited: A Joint Formulation", In Proceedings of the 12th European Conference on Computer Vision (ECCV), Oct. 2012, 14 pages.
Chen, "Supplemental Material for "Bayesian Face Revisited: A Joint Formulation"", Apr. 2013, 5 pages.
Cootes, et al., "Modeling Facial Shape and Appearance", Handbook of Face Recognition, Springer, New York, US, 2005, pp. 39-63.
Cvetkovic, et al., "Image enhancement circuit using nonlinear processing curve and constrained histogram range equalization", Visual Communications and Image Processing 2004, 2004, 12 pages.
Davis, et al., "Information-Theoretic Metric Learning", In Proceedings of the 24th International Conference on Machine Learning (ICML), Jun. 2007, 8 pages.
Delano, "Integrated Development Environments for Natural Language Processing", Available at: http://www.textanalysis.com/TAI-IDE-WP.pdf, Oct. 2001, 13 pages.
Delling, et al., "Customizable Route Planning", U.S. Appl. No. 13/152,313, filed Jun. 3, 2011, 23 pages.
Delling, et al., "Customizable Route Planning", U.S. Appl. No. 13/868,135, filed Apr. 23, 2013, 33 pages.
Delling, et al., "Customizing Driving Directions With GPUs", In Proceedings of the 20th Euro-Par International Conference on Parallel Processing, Aug. 2014, 12 pages.
Delling, et al., "High-Performance Multi-Level Graphs", In Proceedings of the 9th DIMACS Implementation Challenge: The Shortest Path Problem, Nov. 2006, 13 pages.
Delling, et al., "Highway Hierarchies Star", In Proceedings of the 9th DIMACS Implementation Challenge: The Shortest Path Problem, Nov. 2006, 29 pages.
Demetrescu, et al., "The Shortest Path Problem: Ninth DIMACS Implementation Challenge", In Proceedings of DIMACS Series in Discrete Mathematics and Theoretical Computer Science, Jul. 28, 2009, 3 pages.
Diez, et al., "Optimization of a Face Verification System Using Bayesian Screening Techniques", In Proceedings of the 23rd IASTED International Multi-Conference on Artificial Intelligence and Applications, Feb. 2005, pp. 427-432.
Ding, et al., "Handbook of Face Recognition, Chapter 12: Facial Landmark Localization", Jan. 1, 2011, 19 pages.
dos Reis Mota, "LUP: A Language Understanding Platform", A Dissertation for the Degree of Master of Information Systems and Computer Engineering, Jul. 2012, 128 pages.
Eagle, et al., "Common Sense Conversations: Understanding Casual Conversation using a Common Sense Database", In Proceedings of the Artificial Intelligence, Information Access, and Mobile Computing Workshop, Aug. 2003, 6 pages.
Edmonds, et al., "Single-Source Shortest Paths With the Parallel Boost Graph Library", In Proceedings of the 9th DIMACS Implementation Challenge: The Shortest Path Problem, Nov. 4, 2006, 20 pages.
Geisberger, et al., "Exact Routing in Large Road Networks using Contraction Hierarchies", In Proceedings of Transportation Science, vol. 46, No. 3, Aug. 2012, 17 pages.
Goldberg, et al., "Better Landmarks within Reach", In Proceedings of the 6th International Conference on Experimental Algorithms, Jun. 6, 2007, 14 Pages.
Grasset, et al., "Image-Driven View Management for Augmented Reality Browsers", IEEE International Symposium on Mixed and Augmented Reality (ISMAR), Nov. 5, 2012, 10 pages.

(56) References Cited

OTHER PUBLICATIONS

Guillaumin, et al., "Is that you? Metric Learning Approaches for Face Identification", In Proceedings of 12th IEEE International Conference on Computer Vision (ICCV), Sep. 2009, 8 pages.
He, et al., "What is Discriminative Learning", Discriminative Learning for Speech Recognition Theory and Practice, Achorn International, Jun. 25, 2008, 25 pages.
Hoffmeister, et al., "Log-linear Model Combination with Word-dependent Scaling Factors", Human Language Technology and Pattern Recognition Computer Science Department, 2009, 4 pages.
Huang, et al., "Labeled Faces in the Wild: A Database for Studying Face Recognition in Unconstrained Environments", In Proceedings of the 10th European Conference on Computer Vision (ECCV), Oct. 2008, 11 pages.
Huang, et al., "Unified Stochastic Engine (USE) for Speech Recognition", School of Computer Science, 1993, 4 pages.
Ioffe, "Probabilistic Linear Discriminant Analysis", International Journal of Computer Vision, Jun. 2001, 12 pages.
Karpinski, "Multi-GPU Parallel Memetic Algorithm for Capacitated Vehicle Routing Problem", Lecture Noes in Computer Science, May 8, 2014, 12 pages.
Keshtkar, et al., "A Corpus-based Method for Extracting Paraphrases of Emotion Terms", Proceedings of the NAACL HLT 2010 Workshop on Computational Approaches to Analysis and Generation of Emotion in Text, 2010, 10 pages.
Ko, et al., "Cammia—A Context-Aware Spoken Dialog System for Mobile Environments", In Automatic Speech Recognition and Understanding, Jul. 29, 2011, 2 pages.
Kumar, et al., "Attribute and Simile Classifiers for Face Verification", In Proceedings of the 12th IEEE International Conference on Computer Vision (ICCV), Sep. 2009, 8 pages.
Kumar, et al., "Describable Visual Attributes for Face Verification and Image Research", IEEE Transactions on Pattern Analysis and Machine Intelligence, Oct. 2011, 17 pages.
Kumar, et al., "Face Recognition Using Gabor Wavelets", In Proceedings of the 40th IEEE Asilomar Conference on Signals, Systems and Computers, Oct. 2006, 5 pages.
Lanitis, et al., "Toward Automatic Simulation of Aging Effects on Face Images", IEEE Trans. PAML, vol. 24, No. 4, Apr. 2002, 14 pages.
Lauther, et al., "An Experimental Evaluation for Point-To-Point Shortest Path Calculation on Roadnetworks with Precalculated Edge-Flags", In Proceedings of the 9th DIMACS Implementation Challenge: The Shortest Path Problem, Nov. 2006, 18 pages.
Lee, et al., "Intention-Based Corrective Feedback Generation using Context-Aware Model", In Proceedings of the Second International Conference on Computer Supported Education, Apr. 7, 2010, 8 pages.
Lei, et al., "Face Recognition by Exploring Information Jointly in Space, Scale and Orientation", IEEE Transactions on Image Processing, Jan. 2011, pp. 247-256.
Li, et al., "Bayesian Face Recognition Using Support Vector Machine and Face Clustering", In Proceedings of the IEEE Computer Society on Computer Vision Pattern and Recognition (CVPR), Jun. 2004, 7 pages.
Li, et al., "Comparison of Discriminative Input and Output Transformations for Speaker Adaptation in the Hybrid NN/ HMM Systems", In Proceedings of 11th Annual Conference of the International Speech Communication Association, Sep. 26, 2010, 4 pages.
Li, et al., "Probabilistic Models for Inference about Identity", IEEE Transactions on Pattern Recognition and Machine Intelligence, Jan. 2012, 16 pages.
Liang, et al., "Face Alignment via Component-Based Discriminative Search", Computer Vision, ECCV 2008, Lecture Notes in Computer Science vol. 5303, 2008, 14 pages.
Malony, et al., "Compensation of Measurement Overhead in Parallel Performance Profiling", The International Journal of High Performance Computing Applications, May 1, 2007, 23 pages.

Martin, et al., "CUDA Solutions for the SSSP Problem", In Proceedings of 9th International Conference Baton Rouge, May 25, 2009, 10 pages.
Moghaddam, et al., "Bayesian Face Recognition", The Journal of Pattern Recognition, Nov. 2000, pp. 1771-1782.
Moreira, et al., "Towards the Rapid Development of a Natural Language Understanding Module", In Proceedings of the 10th International Conference on Intelligent Virtual Agents, Jan. 2011, 7 pages.
Nguyen, et al., "Cosine Similarity Metric Learning for Face Verification", In Proceedings of the 10th Asian Conference on Computer Vision (ACCV), Nov. 2010, 12 pages.
Ojala et al., "A Generalized Local Binary Pattern Operator for Multiresolution Gray Scale and Rotation Invariant Texture Classification", In Proceedings of the 2nd International Conference on Advances in Pattern Recognition (ICAPR), Mar. 2001, 10 pages.
Pascoal, et al., "Implementations and Empirical Comparison of K Shortest Loopless Path Algorithms", In Proceedings of the 9th DIMACS Implementation Challenge: The Shortest Path Problem, Nov. 2006, 16 pages.
Phillips, et al., "The FERET Evaluation Methodology for Face-Recognition Algorithms", IEEE Transactions on Pattern Analysis and Machine Intelligence, Oct. 2000, pp. 1090-1104.
Powell, "Increased Accuracy Corner Cube Arrays for High Resolution Retro-Reflective Imaging Applications", U.S. Appl. No. 62/062,732, filed Oct. 10, 2014, 46 pages.
Raghuvanshi, "Parametric Wave Field Coding for Precomputed Sound Propagation", Jul. 2014, 11 pages.
Ramanan, et al., "Local Distance Functions: A Taxonomy, New Algorithms, and an Evaluation", IEEE Transactions on Pattern Analysis and Machine Intelligence, Apr. 2011, 8 pages.
Rodrig, "Command User Interface for Displaying and Scaling Selectable Controls and Commands", U.S. Appl. No. 14/254,681, filed Apr. 16, 2014, 51 pages.
Rosten, et al., "Real-time Video Annotations for Augmented Reality", Advances in Visual Computing Lecture Notes in Computer Science, Jan. 1, 2005, 8 pages.
Sanders, et al., "Robust, Almost Constant Time Shortest-Path Queries in Road Networks", In Proceedings of the 9th DIMACS Implementation Challenge: The Shortest Path Problem, Nov. 2006, 19 pages.
Santos, "K Shortest Path Algorithms", In Proceedings of the 9th DIMACS Implementation Challenge: The Shortest Path Problem, Nov. 2006, 13 pages.
Sarukkai, et al., "Word Set Probability Boosting for Improved Spontaneous Dialog Recognition", IEEE Transactions on Speech and Audio Processing, vol. 5, No. 5, Sep. 1997, 13 pages.
Seneff, et al., "Galaxy-II: A Reference Architecture for Conversational System Development", In Proceedings of the 5th International Conference on Spoken Language Processing, Nov. 2008, 4 pages.
Seo, et al., "Face Verification Using the LARK Representation", IEEE Transactions on Information Forensics and Security, Dec. 2011, 12 pages.
Sing, et al., "Domain Metric Knowledge Model for Embodied Conversation Agents", In 5th International Conference on Research, Innovation & Vision for the Future, Mar. 5, 2007, 7 pages.
Song, et al., "Centralized Control of Wireless Sensor Networks for Real-Time Applications", Retrieved from the Internet: URL:http://citeseerx.ist.psu.edu/viewdoc/download?doi=I0.1.1.187.8761&rep=rep1&type=pdf, Retrieved on Jul. 9, 2015, Nov. 7, 2007, 8 Pages.
Susskind, et al., "Modeling the joint density of two images under a variety of transformations", In Proceedings of the IEEE Computer Society Conference on Computer Vision and Pattern Recognition (CVPR), Jun. 2011, 8 pages.
Taigman, et al., "Leveraging Billions of Faces to Overcome Performance Barriers in Unconstrained Face Recognition", Aug. 4, 2011, 7 pages.
Taigman, et al., "Multiple One-Shots for Utilizing Class Label Information", In Proceedings of the British Machine Vision Conference (BMVC), Sep. 2009, 12 pages.
Tian, et al., "Facial Expression Analysis", Handbook of Face Recognition, pp. 247-275.

(56) References Cited

OTHER PUBLICATIONS

Wang, et al., "A Unified Framework for Subspace Face Recognition", retrieved at <<http://ieeexplore.ieee.org/Xplore/login.jsp?url=http%3A%2F%2Fieeexplore.ieee.org%2Fiel5%2F34%2F29188%2F01316855.pdf&authDecision=-203>>, Sep. 2004, pp. 1222-1228.

Wang, "Bayesian Face Recognition Using Gabor Features", In Proceedings of the ACM SIGMM Workshop on Biometrics Methods and Applications (WBMA), Nov. 8, 2003, pp. 70-73.

Wang, et al., "Boosted Multi-Task Learning for Face Verification with Applications to Web Image and Video Search", In Proceedings of the IEEE Conference on Computer Vision and Pattern Recognition, Jun. 2009, 8 pages.

Wang, et al., "Subspace Analysis Using Random Mixture Models", In Proceedings of the IEEE Computer Society Conference on Computer Vision and Pattern Recognition (CVPR), Jun. 2005, 7 pages.

Weinberger, et al., "Distance Metric Learning for Large Margin Nearest Neighbor Classification", In Proceedings of the Conference on Advances in Neural Information Processing Systems (NIPS), Dec. 2008, 8 pages.

Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, 5 pages.

Ying, et al., "Distance Metric Learning with Eigenvalue Optimization", Journal of Machine Learning Research, Jan. 3, 2012, 26 pages.

Zhang, "Two-Dimensional Bayesian Subspace Analysis for Face Recognition", In Proceedings of the 4th International Symposium on Neutral Networks (ISNN), Jun. 2007, 7 pages.

Zhu, et al. "A Rank-Order Distance based Clustering Algorithm for Face Tagging", In Proceedings of the IEEE Conference on Computer Vision and Pattern Recognition (CVPR), Jun. 2011, pp. 481-488.

"Final Office Action", U.S. Appl. No. 13/920,323, dated Nov. 18, 2016, 24 pages.

"Final Office Action", U.S. Appl. No. 14/266,7995, dated Jan. 17, 2017, 11 pages.

"Final Office Action", U.S. Appl. No. 14/296,644, dated Jan. 12, 2017, 30 pages.

"Final Office Action", U.S. Appl. No. 14/338,078, dated Dec. 30, 2016, 32 pages.

"Final Office Action", U.S. Appl. No. 14/529,636, dated Jan. 31, 2017, 15 pages.

"Final Office Action", U.S. Appl. No. 15/076,125, dated Dec. 8, 2016, 6 pages.

"International Preliminary Report on Patentability", Application No. PCT/US2015/033950, dated Dec. 15, 2016, 14 pages.

"International Preliminary Report on Patentability", Application No. PCT/US2015/033545, dated Dec. 15, 2016, 8 pages.

"Non-Final Office Action", U.S. Appl. No. 14/268,953, dated Jan. 26, 2017, 15 pages.

"Non-Final Office Action", U.S. Appl. No. 14/273,100, dated Jan. 30, 2017, 14 pages.

"Notice of Allowance", U.S. Appl. No. 14/264,012, dated Jan. 5, 2017, 8 pages.

"Notice of Allowance", U.S. Appl. No. 14/264,619, dated Mar. 1, 2017, 6 pages.

"Notice of Allowance", U.S. Appl. No. 14/312,501, dated Feb. 15, 2017, 8 pages.

"Notice of Allowance", U.S. Appl. No. 14/456,679, dated Nov. 30, 2016, 15 pages.

"Advisory Action", U.S. Appl. No. 14/304,911, dated Jan. 14, 2016, 2 pages.

"Final Office Action", U.S. Appl. No. 13/923,917, dated Sep. 29, 2015, 6 pages.

"Final Office Action", U.S. Appl. No. 14/275,274, dated Jan. 29, 2016, 6 pages.

"Final Office Action", U.S. Appl. No. 14/275,761, dated Dec. 18, 2015, 6 pages.

"Flexible Schema for Language Model Customization", U.S. Appl. No. 14/227,492, filed Mar. 27, 2014, 20 pages.

"International Preliminary Report on Patentability", Application No. PCT/US2014/041014, dated Sep. 15, 2015, 6 pages.

"International Search Report and Written Opinion", Application No. PCT/US2015/022886, dated Aug. 31, 2015, 17 pages.

"International Search Report and Written Opinion", Application No. PCT/US2015/036859, dated Dec. 22, 2015, 17 pages.

"Non-Final Office Action", U.S. Appl. No. 14/227,492, dated Aug. 13, 2015, 36 pages.

"Non-Final Office Action", U.S. Appl. No. 14/279,146, dated Dec. 8, 2015, 9 pages.

"Non-Final Office Action", U.S. Appl. No. 14/311,208, dated Jan. 7, 2016, 6 pages.

"Non-Final Office Action", U.S. Appl. No. 14/312,501, dated Dec. 16, 2015, 14 pages.

"Notice of Allowance", U.S. Appl. No. 13/923,969, dated Oct. 1, 2015, 7 pages.

"Notice of Allowance", U.S. Appl. No. 13/923,969, dated Nov. 30, 2015, 5 pages.

"Notice of Allowance", U.S. Appl. No. 14/254,681, dated Dec. 4, 2015, 9 pages.

"Notice of Allowance", U.S. Appl. No. 14/264,012, dated Dec. 18, 2015, 7 pages.

"Notice of Allowance", U.S. Appl. No. 14/304,174, dated Dec. 14, 2015, 8 pages.

"Notice of Allowance", U.S. Appl. No. 14/312,562, dated Jan. 7, 2016, 9 pages.

"Ribbon Layout and Resizing", Retrieved on Mar. 12, 2014 at: https://msdn.microsoft.com/en-us/library/ff701790, 6 pages.

"Second Written Opinion", Application No. PCT/US2015/022887, dated Jan. 7, 2016, 5 pages.

"Second Written Opinion", Application No. PCT/US2015/030104, dated Dec. 4, 2015, 7 pages.

"Second Written Opinion", Application No. PCT/US2015/030153, dated Dec. 4, 2015, 6 pages.

"Step by Step Microsoft Word 2013", Available at: https://dbgyan.files.wordpress.com/2013/02/0735669120_wor.pdf, Mar. 1, 2013, 576 pages.

"The Ribbon Bar", Available at: http://bioinf.scri.ac.uk/tablet/help/ribbon.shtml, Dec. 1, 2012, 36 pages.

Gajos,"Automatically Generating Personalized User Interfaces with Supple", In Proceedings of Artificial Intelligence, vol. 174, Issue, Aug. 1, 2010, 49 pages.

Gajos,"Exploring the Design Space for Adaptive Graphical User Interfaces", In Proceedings of the Working Conference on Advanced Visual Interfaces, May 6, 2006, 8 pages.

Liu,"Language Model Combination and Adaptation using Weighted Finite State Transducers", In Proceedings of IEEE International Conference on Acoustics Speech and Signal Processing, Mar. 14, 2010, 4 pages.

Scarr,"Improving Command Selection with Command Maps", In Proceedings of the SIGCHI Conference on Human Factors in Computing Systems, May 2012, 10 pages.

Yin,"An Associate-Predict Model for Face Recognition", Proceedings of the IEEE Conference on Computer Vision and Pattern Recognition, Jun. 2011, 8 pages.

"Final Office Action", U.S. Appl. No. 14/268,953, dated Sep. 14, 2016, 16 pages.

"Final Office Action", U.S. Appl. No. 14/316,802, dated Sep. 6, 2016, 20 pages.

"International Preliminary Report on Patentability", Application No. PCT/US2015/031270, dated Aug. 17, 2016, 10 pages.

"International Preliminary Report on Patentability", Application No. PCT/US2015/036587, dated Sep. 12, 2016, 7 pages.

"International Preliminary Report on Patentability", Application No. PCT/US2015/036595, dated Oct. 7, 2016, 8 pages.

"International Preliminary Report on Patentability", Application No. PCT/US2015/036859, dated Oct. 7, 2016, 8 pages.

"International Search Report and Written Opinion", Application No. PCT/US2015/033633, dated Sep. 18, 2015, 11 pages.

(56) References Cited

OTHER PUBLICATIONS

"Non-Final Office Action", U.S. Appl. No. 14/264,619, dated Nov. 2, 2016, 10 pages.
"Non-Final Office Action", U.S. Appl. No. 14/281,518, dated Dec. 16, 2016, 27 pages.
"Non-Final Office Action", U.S. Appl. No. 14/316,802, dated Dec. 2, 2016, 22 pages.
"Notice of Allowance", U.S. Appl. No. 4/456,679, dated Nov. 30, 2016, 15 pages.
"Second Written Opinion", Application No. PCT/US2015/033633, dated Apr. 28, 2016, 7 pages.
"Corrected Notice of Allowance", U.S. Appl. No. 14/275,806, dated May 5, 2016, 2 pages.
"Final Office Action", U.S. Appl. No. 14/266,795, dated Apr. 11, 2016, 13 pages.
"Final Office Action", U.S. Appl. No. 14/273,100, dated Mar. 3, 2016, 18 pages.
"Final Office Action", U.S. Appl. No. 14/279,146, dated Apr. 13, 2016, 16 pages.
"International Preliminary Report on Patentability", Application No. PCT/US2015/022887, dated Apr. 7, 2016, 8 pages.
"International Preliminary Report on Patentability", Application No. PCT/US2015/030104, dated Apr. 15, 2016, 8 pages.
"International Preliminary Report on Patentability", Application No. PCT/US2015/030153, dated Apr. 15, 2016, 8 pages.
"Non-Final Office Action", U.S. Appl. No. 14/264,012, dated Mar. 10, 2016, 7 pages.
"Non-Final Office Action", U.S. Appl. No. 14/268,953, dated Apr. 19, 2016, 14 pages.
"Non-Final Office Action", U.S. Appl. No. 14/281,518, dated Feb. 26, 2016, 23 pages.
"Non-Final Office Action", U.S. Appl. No. 147/264,619, dated Apr. 19, 2016, 11 pages.
"Notice of Allowance", U.S. Appl. No. 14/275,761, dated Mar. 2, 2016, 5 pages.
"Notice of Allowance", U.S. Appl. No. 14/275,806, dated Feb. 25, 2016, 9 pages.
"Notice of Allowance", U.S. Appl. No. 14/304,911, dated Feb. 19, 2016, 7 pages.
"Notice of Allowance", U.S. Appl. No. 14/311,208, dated Mar. 30, 2016, 8 pages.
"Preinterview First Office Action", U.S. Appl. No. 14/444,987, dated Mar. 3, 2016, 4 pages.
"Second Written Opinion", Application No. PCT/US2015/026971, dated Mar. 30, 2016, 7 pages.
"Second Written Opinion", Application No. PCT/US2015/027409, dated Mar. 18, 2016, 8 pages.
"Second Written Opinion", Application No. PCT/US2015/027688, dated Feb. 9, 2016, 6 pages.
"Second Written Opinion", Application No. PCT/US2015/028383, dated Apr. 18, 2016, 9 pages.
"Second Written Opinion", Application No. PCT/US2015/029334, dated Mar. 31, 2016, 5 pages.
"Second Written Opinion", Application No. PCT/US2015/030096, dated Apr. 5, 2016, 6 Pages.
"Second Written Opinion", Application No. PCT/US2015/030113, dated Mar. 21, 2016, 8 pages.
"Second Written Opinion", Application No. PCT/US2015/033872, dated Apr. 21, 2016, 6 pages.
"Supplemental Notice of Allowance", U.S. Appl. No. 14/304,174, dated Apr. 26, 2016, 4 pages.
Peng,"Joint and Implicit Registration for Face Recognition", Proceedings of the IEEE Computer Society Conference on Computer Vision and Pattern Recognition (CVPR'09), Jun. 2009, 8 pages.
"Final Office Action", U.S. Appl. No. 12/573,157, dated Feb. 17, 2015, 18 pages.
"Final Office Action", U.S. Appl. No. 12/573,157, dated Jul. 5, 2013, 18 pages.
"Final Office Action", U.S. Appl. No. 14/264,619, dated Aug. 12, 2016, 12 pages.
"Final Office Action", U.S. Appl. No. 14/281,518, dated Aug. 25, 2016, 29 pages.
"Final Office Action", U.S. Appl. No. 14/456,679, dated Aug. 31, 2016, 33 pages.
"First Action Interview Office Action", U.S. Appl. No. 14/444,987, dated Aug. 24, 2016, 9 pages.
"International Preliminary Report on Patentability", Application No. PCT/US2015/028383, dated Jul. 18, 2016, 10 pages.
"International Preliminary Report on Patentability", Application No. PCT/US2015/029805, dated Jul. 27, 2016, 11 pages.
"International Preliminary Report on Patentability", Application No. PCT/US2015/033872, dated Jul. 1, 2016, 6 pages.
"International Preliminary Report on Patentability", Application No. PCT/US2015/029334, dated Jul. 18, 2016, 8 pages.
"International Preliminary Report on Patentability", Application No. PCT/US2015/026971, dated Aug. 10, 2016, 8 pages.
"International Preliminary Report on Patentability", Application No. PCT/US2015/035219, dated Jun. 23, 2016, 9 pages.
"International Preliminary Report on Patentability", Application No. PCT/US2015/032089, dated Jun. 29, 2016, 9 pages.
"International Preliminary Report on Patentability", Application No. PCT/US2015/027689, dated Jul. 18, 2016, 9 pages.
"International Search Report and Written Opinion", Application No. PCT/US2015/021921, dated Jul. 17, 2015, 11 pages.
"Non-Final Office Action", U.S. Appl. No. 12/573,157, dated Apr. 23, 2014, 19 pages.
"Non-Final Office Action", U.S. Appl. No. 12/573,157, dated Aug. 20, 2015, 17 pages.
"Non-Final Office Action", U.S. Appl. No. 12/573,157, dated Nov. 28, 2012, 11 pages.
"Non-Final Office Action", U.S. Appl. No. 13/923,917, dated Jun. 30, 2016, 9 pages.
"Non-Final Office Action", U.S. Appl. No. 14/264,012, dated Aug. 10, 2016, 8 pages.
"Non-Final Office Action", U.S. Appl. No. 14/266,795, dated Jul. 19, 2016, 12 pages.
"Non-Final Office Action", U.S. Appl. No. 14/279,146, dated Aug. 3, 2016, 15 pages.
"Non-Final Office Action", U.S. Appl. No. 14/296,644, dated Aug. 4, 2016, 25 pages.
"Non-Final Office Action", U.S. Appl. No. 14/316,802, dated Jul. 8, 2016, 17 pages.
"Non-Final Office Action", U.S. Appl. No. 14/529,636, dated Jul. 19, 2016, 12 pages.
"Notice of Allowance", U.S. Appl. No. 12/573,157, dated Jun. 6, 2016, 10 pages.
"Notice of Allowance", U.S. Appl. No. 14/227,492, dated Aug. 4, 2016, 11 pages.
"Notice of Allowance", U.S. Appl. No. 14/265,110, dated Aug. 3, 2016, 22 pages.
"Notice of Allowance", U.S. Appl. No. 14/311,208, dated Jul. 19, 2016, 8 pages.
"Second Written Opinion", Application No. PCT/US2015/035218, dated Jul. 27, 2016, 7 pages.
"Supplemental Notice of Allowance", U.S. Appl. No. 14/275,724, dated Aug. 3, 2016, 2 pages.
Astheimer,"What you see is what you hear—Acoustics applied in Virtual Worlds", In Proceedings of IEEE Symposium on Research Frontiers in Virtual Reality, Oct. 25, 1993, pp. 100-107.
Funkhouser,"Survey of Methods for Modeling Sound Propagation in Interactive Virtual Environment Systems", Retrieved from <<http://www-sop.inria.fr/reves/Nicolas.Tsingos/publis/presence03.pdf, Jan. 2003, 53 pages.
Lauterbach,"Interactive Sound Rendering in Complex and Dynamic Scenes Using Frustum Tracing", In Proceedings of IEEE Transactions on Visualization and Computer Graphics (vol. 13, Issue 6), Nov. 2007, pp. 1672-1679.
Lentz,"Virtual Reality System with Integrated Sound Field Simulation and Reproducation", In EURASIP Journal on Applied Signal Processing, Issue 1, Jan. 2007, 22 pages.
Wand,"A Real-Time Sound Rendering Algorithm for Complex Scenes", Retrieved at: <<http://web.archive.org/web/20090605124135/http://www.mpi-de/~mwand/papers/tr03.pdf>>, Jul. 2003, 13 pages.

(56) References Cited

OTHER PUBLICATIONS

"Corrected Notice of Allowance", U.S. Appl. No. 14/275,806, dated Jun. 2, 2016, 2 pages.
"Final Office Action", U.S. Appl. No. 14/312,501, dated May 27, 2016, 13 pages.
"International Preliminary Report on Patentability", Application No. PCT/US2015/030113, dated Jul. 14, 2016, 11 Pages.
"International Preliminary Report on Patentability", Application No. PCT/US2015/027688, dated Apr. 26, 2016, 7 pages.
"International Preliminary Report on Patentability", Application No. PCT/US2014/041023, dated Nov. 13, 2015, 7 pages.
"International Preliminary Report on Patentability", Application No. PCT/US2015/017872, dated Dec. 14, 2015, 7 pages.
"International Preliminary Report on Patentability", Application No. PCT/US2015/030096, dated Jul. 14, 2016, 8 pages.
"International Preliminary Report on Patentability", Application No. PCT/US2015/027409, dated Jun. 16, 2016, 9 pages.
"International Search Report and Written Opinion", Application No. PCT/US20156/021921, dated Jul. 7, 2015, 11 pages.
"International Search Report and Written Opinion", Application No. PCT/US2015/035218, dated May 19, 2016, 19 pages.
"Invitation to Pay Additional Fees/Partial International Search Report", Application No. PCT/US2015/033950, dated Feb. 23, 2016, 6 pages.
"Non-Final Office Action", U.S. Appl. No. 13/920,323, dated Apr. 5, 2016, 22 pages.
"Non-Final Office Action", U.S. Appl. No. 14/264,619, dated Apr. 19, 2016, 11 pages.
"Non-Final Office Action", U.S. Appl. No. 14/265,110, dated Jan. 4, 2016, 26 pages.
"Non-Final Office Action", U.S. Appl. No. 14/338,078, dated Jun. 16, 2016, 19 pages.
"Non-Final Office Action", U.S. Appl. No. 14/465,679, dated May 10, 2016, 31 pages.
"Notice of Allowance", U.S. Appl. No. 13/923,917, dated Mar. 4, 2016, 5 pages.
"Notice of Allowance", U.S. Appl. No. 13/923,917, dated Dec. 15, 2015, 7 pages.
"Notice of Allowance", U.S. Appl. No. 14/201,704, dated Dec. 18, 2015, 7 pages.
"Notice of Allowance", U.S. Appl. No. 14/227,492, dated Apr. 19, 2016, 15 pages.
"Notice of Allowance", U.S. Appl. No. 14/275,724, dated May 9, 2016, 5 pages.
"Notice of Allowance", U.S. Appl. No. 14/304,911, dated May 23, 2016, 7 pages.
"Notice of Allowance", U.S. Appl. No. 15/087,739, dated Jun. 13, 2016, 9 pages.
"Second Written Opinion", Application No. PCT/US2015/021921, dated Feb. 11, 2016, 7 pages.
"Second Written Opinion", Application No. PCT/US2015/027689, dated Apr. 1, 2016, 8 pages.
"Second Written Opinion", Application No. PCT/US2015/029805, dated May 6, 2016, 9 pages.
"Second Written Opinion", Application No. PCT/US2015/031270, dated May 3, 2016, 9 pages.
"Second Written Opinion", Application No. PCT/US2015/032089, dated Apr. 12, 2016, 8 pages.
"Second Written Opinion", Application No. PCT/US2015/035219, dated Apr. 26, 2016, 8 pages.
"Second Written Opinion", Application No. PCT/US2015/036587, dated May 18, 2016, 7 pages.
"Second Written Opinion", Application No. PCT/US2015/036595, dated May 31, 2016, 6 pages.
"Second Written Opinion", Application No. PCT/US2015/036859, dated May 6, 2016, 7 pages.
"Supplemental Notice of Allowance", U.S. Appl. No. 14/275,724, dated May 26, 2016, 2 pages.
"Supplemental Notice of Allowance", U.S. Appl. No. 14/275,724, dated Jul. 6, 2016, 2 pages.
"Supplemental Notice of Allowance", U.S. Appl. No. 14/275,761, dated May 12, 2016, 2 pages.
"Supplemental Notice of Allowance", U.S. Appl. No. 14/275,761, dated Jun. 8, 2016, 2 pages.
"Supplemental Notice of Allowance", U.S. Appl. No. 14/312,562, dated Apr. 28, 2016, 2 pages.
"Final Office Action", U.S. Appl. No. 14/268,953, dated Jun. 6, 2017, 18 pages.
"Non-Final Office Action", U.S. Appl. No. 14/266,795, dated Jun. 16, 2017, 15 pages.
"Non-Final Office Action", U.S. Appl. No. 14/296,644, dated Jun. 14, 2017, 44 pages.
"Notice of Allowance", U.S. Appl. No. 13/920,323, dated Apr. 3, 2017, 8 pages.
"Notice of Allowance", U.S. Appl. No. 14/264,619, dated May 10, 2017, 6 pages.
"Restriction Requirement", U.S. Appl. No. 14/294,410, dated Jun. 2, 2017, 5 pages.
"Notice of Allowance", U.S. Appl. No. 15/076,125, dated Feb. 21, 2017, 5 pages.
"Non-Final Office Action", U.S. Appl. No. 15/259,396, dated Apr. 7, 2017, 7 pages.
"Notice of Allowance", U.S. Appl. No. 14/444,987, dated Mar. 15, 2017, 8 pages.
"Notice of Allowance", U.S. Appl. No. 14/316,802, dated Apr. 20, 2017, 8 pages.
"Final Office Action", U.S. Appl. No. 15/259,396, dated Aug. 30, 2017, 7 pages.
"Non-Final Office Action", U.S. Appl. No. 14/268,953, dated Sep. 18, 2017, 21 pages.
"Non-Final Office Action", U.S. Appl. No. 15/140,315, dated Aug. 7, 2017, 12 pages.
"Notice of Allowance", U.S. Appl. No. 14/281,518, dated Sep. 5, 2017, 8 pages.

* cited by examiner

500

DISTRIBUTING CONTENT IN MANAGED WIRELESS DISTRIBUTION NETWORKS

BACKGROUND

As computing technology has advanced, computing devices have become increasingly powerful. This increase in computing device power has led to more advanced content being available to users, such as complex video games with detailed graphics, high resolution movies, and so forth. While such advanced content is beneficial to users, it is not without its problems. One such problem is that this advanced content can be very large in size (e.g., on the order of tens or hundreds of gigabytes). Transferring such large amounts of content via a network requires a significant amount of bandwidth and can take a significant amount of time (e.g., on the order of hours or days). This results in delays to users who desire to use the content in the near future, leading to user frustration with their computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple portions of protected content to host on a device are identified by the device, the multiple portions of protected content including one or more portions of each of one or more pieces of protected content. The multiple portions of protected content are obtained and stored on the device. The device is one of multiple devices in a managed wireless distribution network that allows portions of protected content to be transferred among the multiple devices via multiple wireless networks hosted by various ones of the multiple devices, and the device is configured to store portions of protected content that can be consumed by a user of the device only if the user of the device has permission to consume the protected content.

In accordance with one or more aspects, for each of multiple devices in a managed wireless distribution network, participation of the device in the managed wireless distribution network is identified. The managed wireless distribution network allows portions of protected content to be transferred among the multiple devices via multiple wireless networks hosted by various ones of the multiple devices, each of the multiple devices being configured to host portions of protected content that can be consumed by a user of the device only if the user of the device has permission to consume the protected content. For each of the multiple devices a reward is generated for a user of the device based on the participation of the device in the managed wireless distribution network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Distributing content in managed wireless distribution networks is discussed herein. Generally, a managed wireless distribution network includes multiple devices that communicate with one another via multiple wireless networks (e.g., multiple Wi-Fi networks). Each device in the managed wireless distribution network can host at least one wireless network and/or join at least one wireless network.

Content (e.g., games, movies, etc.) can be separated into multiple portions, and different ones of the multiple devices in the managed wireless distribution network can host different portions of the content. Permission is needed in order for a device to consume the content (e.g., play the game, watch the movie, etc.), thus the content is also referred to as protected content. This permission can take various forms, such as a key allowing the protected content to be decrypted. A device in the managed wireless distribution network can host protected content regardless of whether a user of the device has permission to consume the content.

A device obtains the portions of the protected content in order to consume the protected content. The device can obtain the portions of the protected content from different ones of the multiple devices in the managed wireless distribution network, with the portions of protected content being transferred via the wireless networks. As the device can obtain the portions of protected content via the wireless networks of the managed wireless distribution network, the device can obtain the portions without having to access a content service over the Internet, resulting in reduced data usage over the user's Internet connection, and faster retrieval of the portions due to the faster speed of wireless networks.

Figure 1:
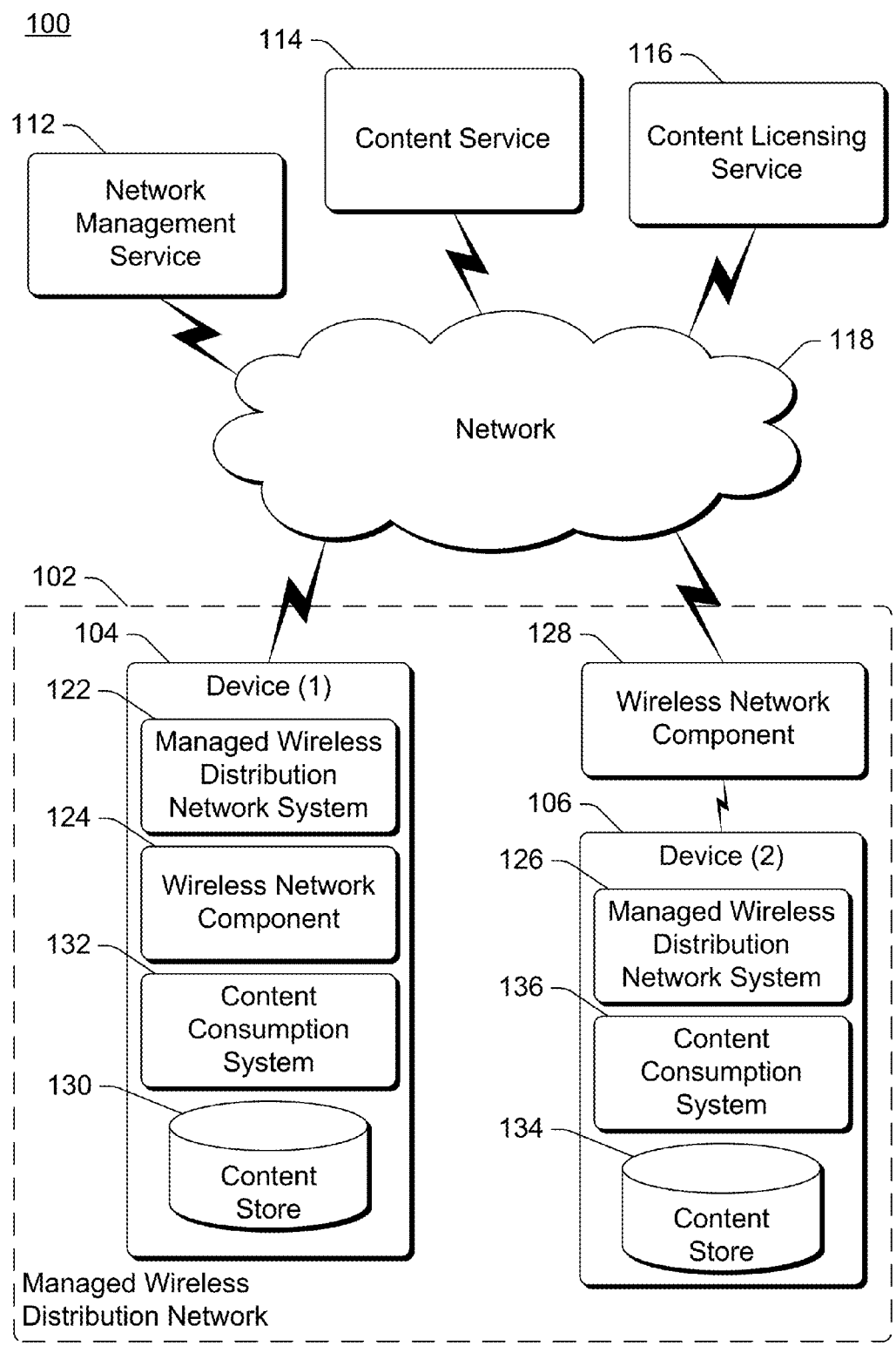
FIG. 1 illustrates an example system implementing the distributing content in managed wireless distribution networks in accordance with one or more embodiments.

FIG. 1 illustrates an example system 100 implementing the distributing content in managed wireless distribution networks in accordance with one or more embodiments. System 100 includes a managed wireless distribution network 102 that includes multiple devices 104 and 106. The managed wireless distribution network 102 is a collection of devices that communicate with one another using one or more wireless data networks, such as a Wi-Fi network or other wireless local area network (WLAN). The managed wireless distribution network includes the devices as well as the wireless data networks created by those devices. Although two devices 104 and 106 are illustrated in the managed wireless distribution network 102, it should be noted that any number of devices can be included in the managed wireless distribution network 102.

Devices 104 and 106 can each be a variety of different types of devices, and devices 104 and 106 can be the same or different types of devices. For example, each of devices 104 and 106 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Thus, each device 104 and 106 may range from a full resource device with substantial memory and processor resources (e.g., personal computers, game consoles) to a low-resource device with limited memory and/or processing resources (e.g., traditional set-top boxes, televisions).

The devices 104 and 106 can communicate with a network management service 112, a content service 114, and a content licensing service 116 via a network 118. Network 118 can be any one or more of a variety of different networks, such as the Internet or a public telephone network. The network 118 differs from the wireless networks in the managed wireless distribution network 102 in that the network 118 has slower data transfer rates than the wireless networks, has costs (e.g., per megabyte or gigabyte) associated with usage of the network 118 that the wireless networks do not have, and/or has limits on the amount of data (e.g., number of bytes) that can be transferred over the network 118 over a given time period that the wireless networks do not have. The services 112, 114, and 116 can be implemented by any of a variety of different types of devices, such as any of the types discussed above with respect to the devices 104 and 106.

The content service 114 makes pieces of protected content available to devices 104 and 106 via the network 118. Any of a variety of different protected content can be made available by the content service 114, such as video content (e.g., different movies being different pieces of protected content), gaming content (e.g., different video games being different pieces of protected content), and so forth. The content licensing service 116 manages providing licenses to the devices 104 and 106 as appropriate to allow the protected content to be consumed (e.g., played back, run, etc.) by the devices 104 and 106. Network management service 112 provides management functionality for the managed wireless distribution network 102, including facilitating establishing and maintaining the managed wireless distribution network 102, facilitating which protected content is to be provided to which devices 104 and 106, and so forth.

Although particular functionality is discussed herein with reference to particular services 112, 114, and 116, it should be noted that the functionality of particular services discussed herein can be separated into multiple services, and at least some functionality of multiple services can be combined into a single service. For example, the content service 114 and the content licensing service 116 can be a single service. By way of another example, the content service 114 can be implemented by multiple services.

The device 104 includes a managed wireless distribution network system 122 and a wireless network component 124. The device 106 includes a managed wireless distribution network system 126, and is associated with a wireless network component 128. The devices included in the managed wireless distribution network 102 can communicate directly or indirectly with the network 118. For example, the device 104 can communicate directly with the network 118, and the device 106 can communicate indirectly with the network 118 via the wireless network component 128.

Each device 104 and 106 has an associated wireless network component. The device 104 has an associated wireless network component 124 that is included as part of the device 104, and the device 106 has an associated wireless network component 128 that the device 106 communicates with (e.g., using a wired connection). The wireless network components 124 and 128 allow devices in the managed wireless distribution network 102 to communicate with one another over a wireless network (e.g., a Wi-Fi network).

Each device 104 and 106 also includes a managed wireless distribution network system. The managed wireless distribution network system of a device 104 or 106 manages the participation of the device 104 or 106 in the managed wireless distribution network 102, including transferring protected content to or from other devices, communicating control information to or from the other devices, and so forth.

The managed wireless distribution network 102 allows protected content to be distributed to devices 104 and 106 from other devices within the managed wireless distribution network 102. After a portion of protected content is stored on at least one device in the managed wireless distribution network 102, that portion of the protected content can be made available to other devices in the managed wireless distribution network 102 without accessing the network 118.

Making protected content available to devices in the managed wireless distribution network 102 without accessing the network 118 enhances the performance and operation of devices in the managed wireless distribution network 102 in various manners. For example, wireless networks used by the devices in the managed wireless distribution network 102 typically provide faster data transfers than can be achieved using the network 118, increasing the speed at which the protected content can be obtained by a device in the managed wireless distribution network 102. By way of another example, particular financial costs may be associated with the use of the network 118. By transferring protected content over the wireless network of the managed wireless distribution network 102, such costs can be avoided. By way of yet another example, data caps or limits may be placed on devices when accessing the network 118 (e.g., an access provider that provides access to the network 118 for a device 104 or 106 may limit the devices 104 or 106 to a particular number of gigabytes of data transfer per month). By transferring protected content over the wireless network of the managed wireless distribution network 102, such data caps or limits can be avoided.

The device 104 also includes a content store 130 and a content consumption system 132. The device 106 also includes a content store 134 and a content consumption system 136. The content stores 130 and 134 can be implemented using any of a variety of storage mechanisms, such as nonvolatile memory (e.g., Flash memory), one or more magnetic disks, one or more optical discs, and so forth. The protected content stored in the content stores 130 and 134 can be obtained from the content service 114, from another device in the managed wireless distribution network 102, or from another source. The content consumption system 132 manages or coordinates consumption of the protected content in the content store 130, and the content consumption system 136 manages or coordinates consumption of the protected content in the content store 134. Consumption of the protected content varies depending on the device, the protected content, and so forth. For example, consumption of the protected content can be playing a game, playing back a movie, and so forth.

In order to consume protected content, the content consumption system 132, 136 obtains permission to consume the protected content, such as from the content licensing service 116. As such permission is needed to consume content, the content is also referred to as protected content. It should be noted that references herein to content refer to protected content. The permission can be received in response to various actions, such as payment of an appropriate fee to consume the protected content. The permission to consume the protected content can take various forms, such as a license including a key that can be used to decrypt the protected content (e.g., in situations in which the protected content is maintained in encrypted form in the content store 130), a license enforced by a security module of the device 104, 106 specifying what actions can be taken with the protected content (e.g., how the protected content can be consumed), and so forth. Regardless of the form of the permission to consume the protected content, the consumption of the protected content is prevented unless the permission is obtained. Consumption of the protected content can be prevented in different manners, such as by not decrypting the protected content, not allowing access to portions of the content store where the protected content is stored, and so forth.

Each of one or more of the devices in the managed wireless distribution network 102 creates at least one wireless network, and the created wireless networks can be accessed by other devices in the managed wireless distribution network 102. The parameters of the created wireless networks are made known to the devices in the managed wireless distribution network 102, allowing each of the devices in the managed wireless distribution network 102 to communicate with one or more other devices in the managed wireless distribution network via a wireless network and independent of the network 118.

Figure 2:
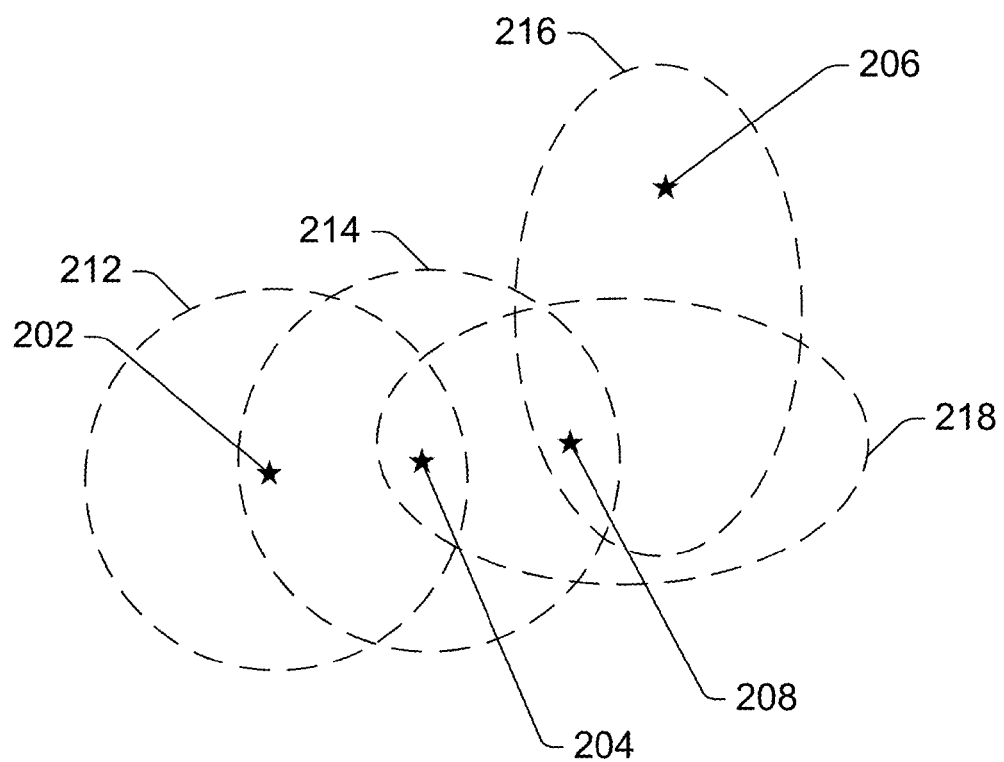
FIG. 2 illustrates an example managed wireless distribution network in accordance with one or more embodiments.

FIG. 2 illustrates an example managed wireless distribution network 200 in accordance with one or more embodiments. Four devices 202, 204, 206, and 208 are illustrated in FIG. 2, each of which can be a device 104 or 106 of FIG. 1. Each of the devices 202-208 creates a wireless network. Device 202 creates wireless network 212, device 204 creates wireless network 214, device 206 creates wireless network 216, and device 208 creates wireless network 218. The wireless networks 212-218 are illustrated as dashed lines showing areas covered by the wireless networks, the areas being places where devices can access the wireless networks.

As illustrated in FIG. 2, each of the devices 202-208 is within the area of one or more networks, but need not be within the area of all of these networks. For example, device 202 is within the areas of wireless networks 212 and 214, but not within the areas of wireless networks 216 and 218. By way of another example, device 208 is within the areas of wireless networks 214, 216, and 218, but is not within the area of wireless network 212.

Given the different devices that are within the ranges of different wireless networks, a chain of wireless networks can be established. For example, the device 202 can join wireless network 214 created by device 204, the device 204 can join the wireless network 218 created by the device 208, and the device 208 can join the wireless network 216 created by the device 206. A chain of wireless networks 214, 218, and 216 allow content to be transferred from device 202 to device 204 to device 208 to device 206, or from device 206 to device 208 to device 204 to device 202.

Returning to FIG. 1, the managed wireless distribution network is a collection of wireless networks created by multiple devices (e.g., devices 104 and 106). The creation of a wireless network refers to hosting the wireless network or serving as an access point for the wireless network. Each wireless network has parameters that include a name (e.g., a Service Set Identifier (SSID)) and a security key (e.g., a password). These parameters can be generated by the device creating the wireless network, or alternatively generated by another device (e.g., the network management service 112) that provides the parameters to the device. The name of the network can be broadcast by the device creating the wireless network, or alternatively not broadcast (e.g., the wireless network can be a hidden network). A device wishing to communicate with one or more other devices via a wireless network joins the wireless network by providing the parameters of the network to the device that created the network. The device creating the network verifies the parameters, and allows the other device to join the wireless network only if the parameters are verified.

Each wireless network can optionally have additional parameters that indicate how to join the wireless network or what devices can join the wireless network. For example, a wireless network may allow only devices with particular addresses (e.g., Media Access Control (MAC) addresses) to join the wireless network. As part of a request to join a wireless network created by a device, another device provides its MAC address and the device creating the network allows the other device to join the network only if the other device has a MAC address that is allowed to join the wireless network.

The parameters of the wireless network can also change over time. For example, the name or security key of the wireless network can be changed at regular or irregular intervals (e.g., every 24 hours). Such changes to the parameters of a wireless network are made known to the devices in the managed wireless distribution network 102. Such changes support various usage scenarios, such as making names or security keys difficult to guess by malicious devices given the rate at which they change.

In one or more embodiments, a device in the managed wireless distribution network 102 creates two wireless networks. A first of the two wireless networks is for the input of protected content to the device creating the two wireless networks. Another device can join the first wireless network to provide protected content to the device creating the two wireless networks. A second of the two wireless networks is for the output of protected content from the device creating the two wireless networks. Another device can join the second wireless network to retrieve or otherwise obtain protected content from the device creating the two wireless networks.

Alternatively, a device can create any other number of wireless networks. For example, a device can create no wireless networks and simply rely on joining wireless networks created by other devices in order to receive protected content from or provide protected content to the other devices. By way of another example, a device can create one wireless network used to both receive protected content from and provide protected content to other devices. By way of yet another example, a device can create multiple wireless networks for the input of protected content to the device, or multiple wireless networks for the output of protected content from the device.

The network management service 112 manages the managed wireless distribution network 102. The management of the managed wireless distribution network 102 includes maintaining a record of which wireless networks are included in the managed wireless distribution network 102, and also maintaining a record of the parameters of the wireless networks included in the managed wireless distribution network 102. The management of the managed wireless distribution network 102 can also include maintaining various other information regarding the wireless networks included in the managed wireless distribution network 102, such as which wireless networks can be seen by which devices in the managed wireless distribution network 102, how many wireless networks are passed through in order to communicate data from one device to another device in the managed wireless distribution network 102, and so forth.

Although the management of the managed wireless distribution network 102 is discussed herein as performed by the network management service 112, the management can alternatively be distributed and performed at least in part by the managed wireless distribution network systems on the devices of the managed wireless distribution network 102. For example, the management can be performed at least in part by the managed wireless distribution network systems 122 and 126, with the network management service 112 facilitating communication among the managed wireless distribution network systems.

The network management service 112 also provides various information that it maintains to the devices in the managed wireless distribution network 102. For example, wireless network parameters maintained by the network management service 112 can be provided to the devices in the managed wireless distribution network 102 so that the devices in the managed wireless distribution network 102 can join the wireless networks in the managed wireless distribution network 102.

The network management service 112 determines which devices to include in the managed wireless distribution network 102, and the determination can be made in any of a variety of different manners. In one or more embodiments, the network management service 112 uses various rules or criteria to determine which devices are included in the managed wireless distribution network 102. These rules or criteria of whether to include a device in the managed wireless distribution network 102 can include, for example, how close the device is geographically to one or more other devices in the network 102 (e.g., geographic areas of devices being obtained from the devices, from the users of the devices, or other sources), whether the device is within range of a wireless network hosted by a device in the network 102, whether the device can access any other device in the network 102 without passing through more than a threshold number of wireless networks, how many devices are already in the network 102, and so forth.

It should be noted that although a single managed wireless distribution network 102 is illustrated in FIG. 1, the system 100 can include any number of managed wireless distribution networks 102. The network management service 112 can maintain various information for each of multiple managed wireless distribution networks 102, and provide information regarding each managed wireless distribution network 102 to devices in that managed wireless distribution network 102 (but not to devices in other managed wireless distribution networks 102).

It should also be noted that the devices included in the managed wireless distribution network 102 can be content sources, content consumers, or both. A content source refers to a device that makes protected content available to one or more other devices in the managed wireless distribution network 102. A content consumer refers to a device that receives or otherwise obtains protected content from another device in the managed wireless distribution network 102. Thus, for example, a device in the managed wireless distribution network 102 can receive and play back protected content from other devices in the network 102, but not make any protected content on the device available to the other devices in the network 102.

It should further be noted that the managed wireless distribution network 102 is managed by the network management service 112 and the managed wireless distribution network systems 122, 126. The managed wireless distribution network systems 122, 126 control the joining or hosting of wireless networks in the managed wireless distribution network 102. Thus, only the managed wireless distribution network systems 122, 126 can communicate data via these wireless networks—other components or modules are not permitted to access theses wireless networks. Furthermore, the managed wireless distribution network systems 122, 126 control what content is permitted to be transferred using these wireless networks. The managed wireless distribution network systems 122, 126 allow for only the transfer of protected content using these wireless networks, and only the protected content that satisfies the criteria or rules of the systems 122, 126 (e.g., protected content having particular identifiers or from particular distributors, protected content stored in a particular portion of the content store 130, etc.) can be transferred using these wireless networks. Thus, all content on the devices 104, 106 is not made available for transfer among devices using the techniques discussed herein, and the devices 104, 106 do not open themselves up to free access for other devices to connect to the devices 104, 106 using the techniques discussed herein.

It should additionally be noted that the inclusion of a user's device in the managed wireless distribution network 102 is performed only after receiving user consent to do so. This user consent can be an opt-in consent, where the user takes an affirmative action to request that the user's device be included as part of the managed wireless distribution network. Alternatively, this user consent can be an opt-out consent, where the user takes an affirmative action to request that the user's device be excluded from the managed wireless distribution network. If the user does not choose to opt out of the managed wireless distribution network, then it is an implied consent by the user to have the user's device included as part of the managed wireless distribution network.

Figure 3:
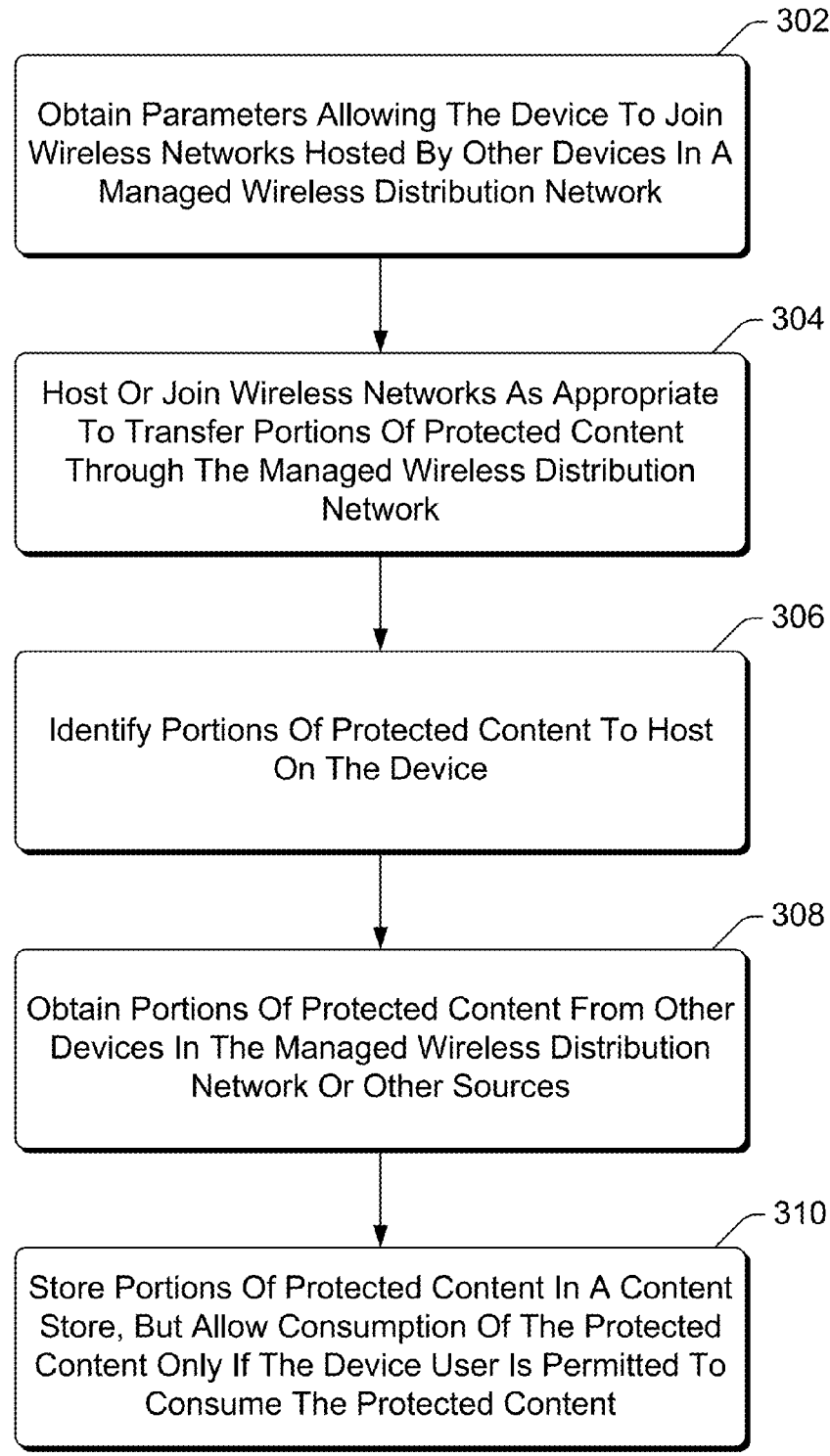
FIG. 3 is a flowchart illustrating an example process for a device implementing the techniques discussed herein in accordance with one or more embodiments.

FIG. 3 is a flowchart illustrating an example process 300 for a device implementing the techniques discussed herein in accordance with one or more embodiments. Process 300 is carried out by a device in a managed wireless distribution network, such as device 104 or 106 of FIG. 1, and can be implemented in software, firmware, hardware, or combinations thereof. Process 300 is shown as a set of acts and is not limited to the order shown for performing the operations of the various acts. Process 300 is an example process for implementing the techniques discussed herein; additional discussions of these techniques are included herein with reference to different figures.

In process 300, parameters allowing a device to join wireless networks hosted by other devices in a managed wireless distribution network are obtained by the device (act 302). The device obtaining the parameters is the device implementing process 300, and the parameters can be obtained from various sources (e.g., other ones of the devices in the managed wireless distribution network, or a network management service). Different parameters can be obtained, such as names (e.g., SSIDs) and security keys (e.g., passwords) of the wireless networks.

The device hosts or joins wireless networks as appropriate to transfer portions of protected content through the managed wireless distribution network (act 304). The protected content can be separated into different portions as discussed below, and different routes to different portions of protected content can be determined in different manners as discussed herein. These routes indicate which wireless networks are to be joined or otherwise accessed by which devices in the managed wireless distribution network in order to transfer protected content between devices.

Portions of protected content to host on the device are identified (act 306). The identified protected content can be protected content that a user of the device desires to consume, protected content to be seeded on the device as discussed in more detail below, protected content stored to be stored on the device for transfer to another device when routing protected content through the managed wireless distribution network, and so forth.

The identified portions of protected content are obtained from other devices in the managed wireless distribution network (act 308). Additionally, some portions of the protected content can be obtained from other sources, such as a content service as discussed above, or a peer-to-peer (P2P) network as discussed in more detail below.

Portions of protected content are also stored in a content store of the device (act 310). However, despite being stored in a content store of the device, consumption of the protected content is allowed only if the user of the device is permitted to consume the protected content as discussed above.

Figure 4:
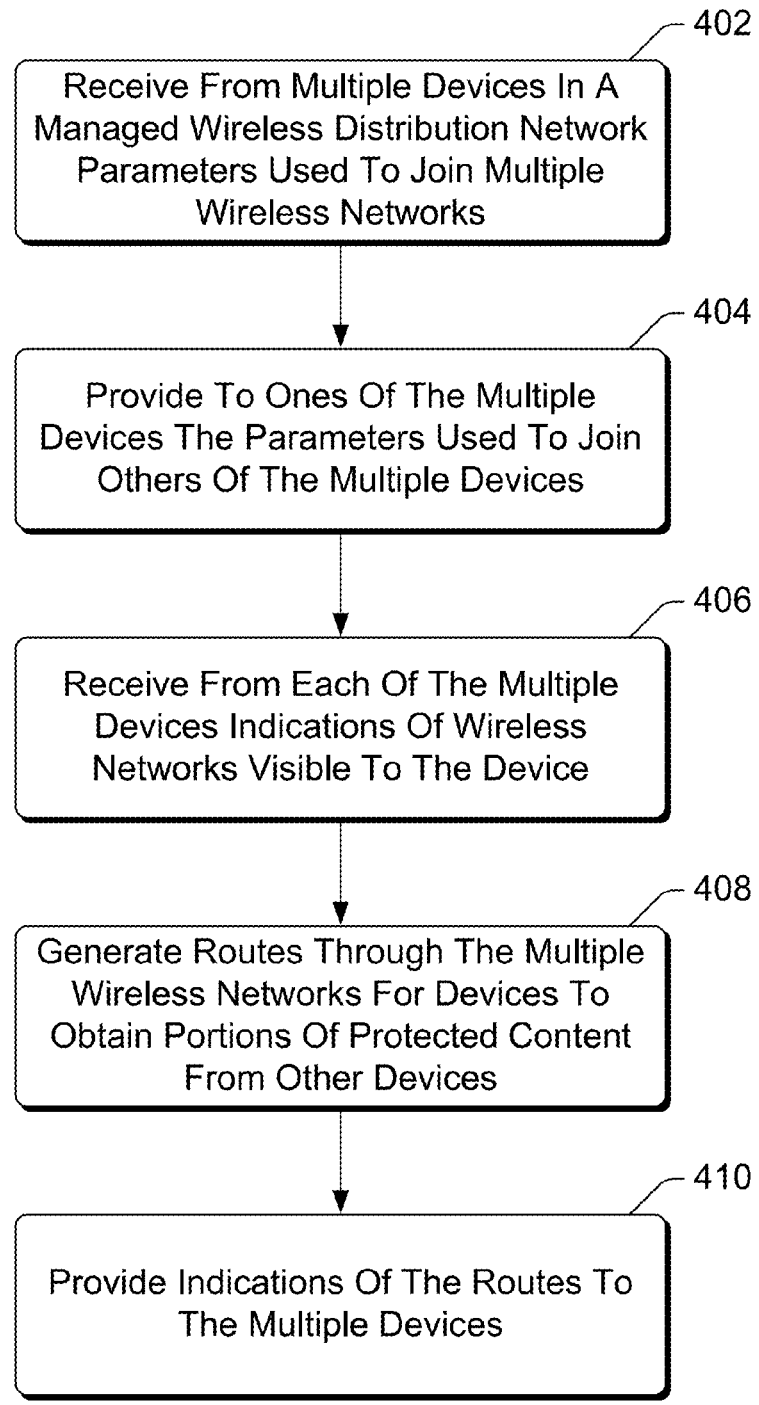
FIG. 4 is a flowchart illustrating an example process for a service implementing the techniques discussed herein in accordance with one or more embodiments.

FIG. 4 is a flowchart illustrating an example process 400 for a service implementing the techniques discussed herein in accordance with one or more embodiments. Process 400 is carried out by a network management service, such as network management service 112 of FIG. 1, and can be implemented in software, firmware, hardware, or combinations thereof. Process 400 is shown as a set of acts and is not limited to the order shown for performing the operations of the various acts. Process 400 is an example process for implementing the techniques discussed herein; additional discussions of these techniques are included herein with reference to different figures.

In process 400, parameters used to join wireless networks hosted by devices in a managed wireless distribution network are received from the devices (act 402). Different parameters can be received, such as names (e.g., SSIDs) and security keys (e.g., passwords) of the wireless networks.

The parameters to join one or more of the wireless networks hosted by others of the multiple devices in the managed wireless distribution network are provided to each of the multiple devices (act 404). Parameters to join all wireless networks in the managed wireless distribution network can be provided to each device in the managed wireless distribution network, or alternatively parameters to join only a subset of the wireless networks in the managed wireless distribution network can be provided to each device. For example, the device may identify to the network management service the names of the other wireless networks that the device can see (that the device is within range of), and the parameters for only those wireless networks can be provided to the device.

From each of the multiple devices in the managed wireless distribution network, indications of the wireless networks that are visible to the device is received (act 406). The wireless networks that are visible to a device are the wireless networks that the device is within range of (and thus can join if given the proper parameters). The determination of which wireless networks are visible to a device can be performed at various times, as discussed in more detail below.

Routes through the multiple wireless networks of the managed wireless distribution network are generated (act 408). These routes are from device to device (or wireless network to wireless network) in the managed wireless distribution network, and allow devices in the managed wireless distribution network to obtain portions of protected content from other devices in the managed wireless distribution network.

Indications of the routes are provided to the devices in the managed wireless distribution network (act 410). These indications can be identifications of full routes (e.g., all the devices or wireless networks between two devices) or portions of routes (e.g., obtain a portion of one protected content from one device and provide the portion to another device).

Device Discovery

In one or more embodiments, in order to identify the various wireless networks in a managed wireless distribution network, the devices in the managed wireless distribution network broadcast the names of each of the one or more wireless networks they have created. Although the devices can continuously broadcast the names of the one or more wireless networks they have created, such continuous broadcasting can result in a large number of wireless network names being broadcast, polluting the area with such names.

In one or more embodiments, the devices broadcast or transmit the names of the one or more wireless networks they have created during a broadcast window, which is a particular range of time. The network management service 112 determines the broadcast window and provides an indication of the broadcast window to the devices in the managed wireless distribution network. The broadcast window can be various ranges of time, such as the first five minutes of every hour, a particular number of minutes at a particular time of each day, a particular number of minutes at particular times of particular days of each week, and so forth.

Additionally, the broadcast window can be a range of time that begins in response to a message or other indication from the network management service 112. For example, the network management service 112 can send a "begin broadcast" message to the devices in the managed wireless distribution network indicating that the broadcast window is to begin immediately (or at a particular time) and last for a particular number of minutes. Such a message or other indication can be sent in response to the occurrence of particular events, such as a new device being added to the managed wireless distribution network.

During the broadcast window, each device in the managed wireless distribution network broadcasts the names of each wireless network it has created. If the wireless network is a hidden wireless network, the device broadcasts an indication of the hidden wireless network (e.g., the name "hidden network"), but does not broadcast the name of the wireless network. Broadcasting the name of a wireless network refers to wirelessly transmitting the name of the wireless network (e.g., in a particular type of packet for Wi-Fi networks) for other devices to see. During the broadcast window, each device in the managed wireless distribution network also determines the names of the other wireless networks it is within range of (the names of the other wireless networks the device can see), also referred to as the other wireless networks that are visible to the device. Various additional information can optionally be determined by the devices, such as the signal strength of the signals received by the device for each of the wireless networks the device can see. Each device in the managed wireless distribution network sends an indication of the names of the wireless networks that the device can see, as well as any additional information determined by the device, to the network management service 112.

The network management service 112 thus has knowledge, for each device in the managed wireless distribution network, of which wireless networks the device is within range of. This allows the network management service 112 to generate a map or topology of the managed wireless distribution network indicating which devices can access which other devices via which wireless networks.

It should be noted that if multiple devices have created hidden networks, the network management service 112 may have somewhat limited knowledge of which wireless networks a device is within range of because the network management service 112 won't know which hidden network a device sees. Nonetheless, the network management service 112 knows that the hidden network a device sees is one of the multiple hidden networks. The network management service 112 can thus, for example, provide the parameters for all of the hidden networks to a device in order for the device to attempt to join all of the hidden networks (and at least one such attempt is expected to be successful).

It should also be noted that devices can join or leave the managed wireless distribution network at various times. Devices can also be powered off or placed in low power modes during which time the devices are unavailable (are not able to send or receive protected content), and effectively have left the managed wireless distribution network while unavailable. By using the broadcast window, the map or topology of the managed wireless distribution network is kept more accurate and up-to-date, accounting for devices joining or leaving the managed wireless distribution network.

Incentivizing Participation

Incentives can optionally be provided to users for participating in (including their devices in) a managed wireless distribution network. Various criteria can be used to determine whether and how much to reward users based on their participation in the managed wireless distribution network, and various rewards can be given to users.

In one or more embodiments, the criteria includes an amount of protected content shared by the user. The amount of protected content refers to how many different protected content pieces (e.g., how many different movies or games), how many different portions of protected content (e.g., how many different parts or chunks of movies or games), and so forth. Protected content or portions of protected content that is made available by a device to transfer to another device in the managed wireless distribution network is referred to as protected content that is shared by the user. Larger rewards can be provided as the amount of protected content shared by the user increases, and smaller rewards can be provided as the amount of protected content shared by the user decreases.

In one or more embodiments, the criteria includes a data transfer rate of the user's device. The data transfer rate of the user's device refers to a data transfer rate (e.g., a number of bits or bytes per second) at which the wireless network created by the user's device can transmit or receive. Larger rewards can be provided for larger data transfer rates, and smaller rewards can be provided for smaller data transfer rates.

In one or more embodiments, the criteria includes the reliability of the user's device. The reliability of the user's device refers to a rating of how reliable the user's device is in being able to receive or provide protected content (e.g., how frequently or for what percentage of the time the user's device has hardware or software problems that interfere with receiving or providing protected content). Larger rewards can be provided for devices with high reliability, and smaller rewards can be provided for devices with low reliability.

In one or more embodiments, the criteria includes how much the user's device is used for seeding protected content. Portions of protected content can be provided to various devices in the managed wireless distribution network from the content service 114 in anticipation of an upcoming event (e.g., the release date of a movie or game), a process referred to as seeding the protected content. Larger rewards can be provided for large amounts of protected content seeded on the user's device, and smaller rewards can be provided for small amounts of protected content seeded on the user's device.

In one or more embodiments, the criteria includes an amount of protected content passed through the user's device. Situations can arise where protected content is not stored on a particular device but passes through the particular device. For example, referring to FIG. 2, protected content may be transferred from device 206 to device 202 through device 204. The devices 206 and 202 store the protected content, but the device 204 need not store the protected content. Larger rewards can be provided for larger amounts of protected content being passed through the user's device, and smaller rewards can be provided for smaller amounts of protected content being passed through the user's device.

In one or more embodiments, the criteria includes the connectivity of the user's device. The connectivity of the user's device refers to how often (e.g., what percentage of the time) the user's device is powered on and participating in the managed wireless distribution network. Larger rewards can be provided for devices with high connectivity rates, and smaller rewards can be provided for devices with low connectivity rates.

In one or more embodiments, the criteria includes the participation of the user's device in assisting neighboring devices obtaining protected content. Situations can arise in which a user desires to obtain protected content on relatively short notice (e.g., would like to start watching a movie or playing a new game as soon as possible). In such situations, the managed wireless distribution network system of the user's device can request assistance from neighboring devices (e.g., other devices in the managed wireless distribution network) in obtaining the protected content. Each of these neighboring devices can obtain a portion of the protected content from the content service 114 and provide it to the user's device (e.g., cooperate with the user's device as discussed in more detail below). Larger rewards can be provided for larger amounts of the assistance provided by a device (e.g., the amount of protected content obtained by the device for another device), and smaller rewards can be provided for smaller amounts of the assistance provided by a device (e.g., the amount of protected content obtained by the device for another device).

In one or more embodiments, the criteria includes how many devices are in the managed wireless distribution network. When larger numbers of devices are already part of the managed wireless distribution network, the addition of more devices to the managed wireless distribution network may not be as important and thus not rewarded as much. Larger rewards can be provided as the number of devices in the managed wireless distribution network decreases, and smaller rewards can be provided as the number of devices in the managed wireless distribution network increases.

Various rewards can be given to users for participating in the managed wireless distribution network. In one or more embodiments, the rewards include a monetary award. A cash amount can be provided to the user, such as a check or debit card, a receipt or coupon that can be cashed in by the user, and so forth.

In one or more embodiments, the rewards include a digital protected content reward. Particular protected content can be made available to a user, or made available to the user earlier than other users (e.g., a day or six hours earlier).

In one or more embodiments, the rewards include a credit award. The credit is a particular amount of money or other currency, can be provided to the user in various manners such as credit applicable towards purchase of protected content or other services.

In one or more embodiments, the rewards include a discount award. The discount can be, for example, a particular percentage off of a price or other cost of some product or service. The discount can be provided to the user in various manners such as a discount on the purchase of protected content or other services.

In one or more embodiments, the rewards include a reputation award. The reputation can be a score, level, and so forth associated with the user. This reputation can be incorporated as part of an additional service available to the user, such as an online gaming service.

In one or more embodiments, the rewards include an achievements award. The achievements can be pins, ribbons, icons, and so forth associated with the user. These achievements can be incorporated as part of an additional service available to the user, such as an online gaming service.

In one or more embodiments, the rewards include a status award. The status award can be a rank, title, group membership, and so forth associated with the user. This status award can be incorporated as part of an additional service available to the user, such as an online gaming service.

In one or more embodiments, the rewards include an exclusive offers award. The exclusive offers can be, for example, particular protected content, products, or services available to the user.

The managed wireless distribution network system of a device monitors the activity of the device based on one or more of the various criteria for determining whether and how much to reward users for participating in the managed wireless distribution network discussed above. Rewards based on the activity can be determined by the managed wireless distribution network system of the device, or a report of the activity can be provided to the network management service 112 for determination of the rewards by the service 112.

It should be noted that the rewards can be provided anonymously. For example, a receipt for a reward can be provided to the user's device. The network management service 112 can know about the user's device and which criteria were satisfied by the user's device, but not know the identity of the user of the device. Thus, the receipt for the reward can be provided to the user's device without any identification of the particular user on the receipt. The user can then submit the receipt to another service in order to redeem the reward. Thus, incentives can be provided to a user while keeping the identity of the user anonymous to the network management service 112.

Figure 5:
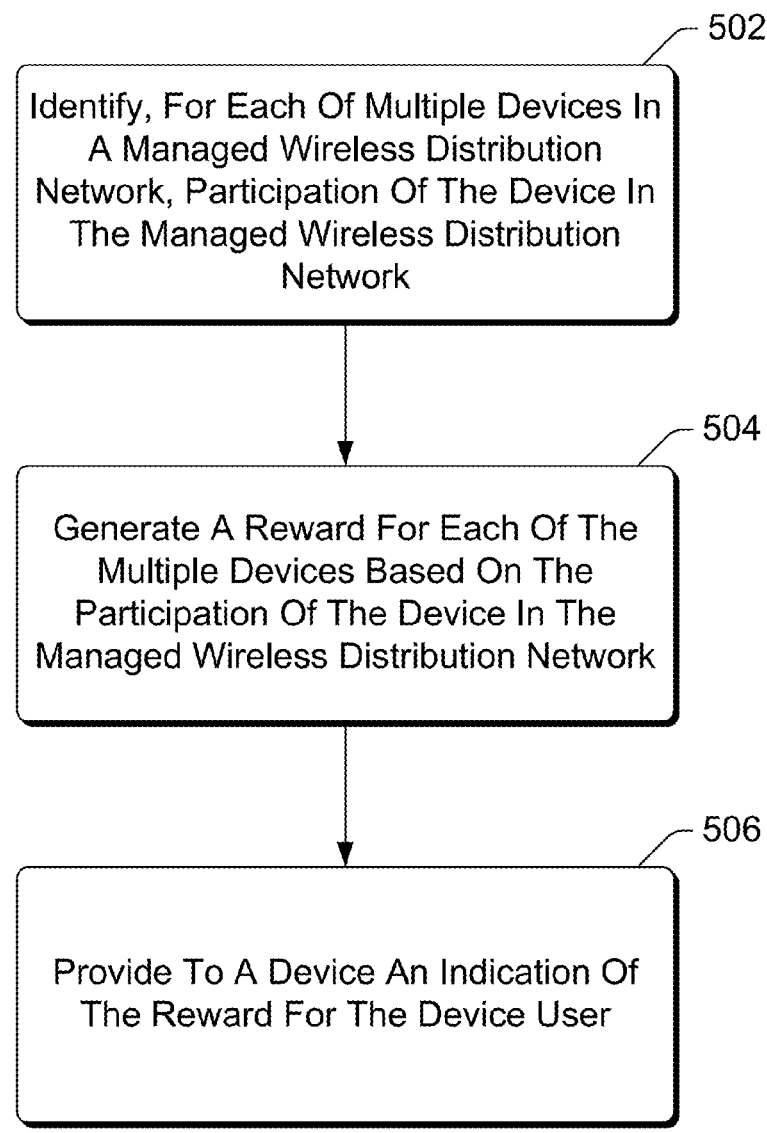
FIG. 5 is a flowchart illustrating an example process for incentivizing users to allow their devices to participate in a managed wireless distribution network in accordance with one or more embodiments.

FIG. 5 is a flowchart illustrating an example process 500 for incentivizing users to allow their devices to participate in a managed wireless distribution network in accordance with one or more embodiments. Process 500 is carried out by a network management service, such as network management service 112 of FIG. 1, and can be implemented in software, firmware, hardware, or combinations thereof. Process 500 is shown as a set of acts and is not limited to the order shown for performing the operations of the various acts. Process 500 is an example process for incentivizing users to allow their devices to participate in a managed wireless distribution network; additional discussions of incentivizing users to allow their devices to participate in a managed wireless distribution network are included herein with reference to different figures.

In process 500, for each of multiple devices in a managed wireless distribution network, participation of the device in the managed wireless distribution network is identified (act 502). The participation of the device in the managed wireless distribution network can be identified in different manners, such as based on information provided to the network management service by the devices in the managed wireless distribution network.

A reward for each of multiple devices in the managed wireless distribution network is generated (act 504). Various criteria can be used to determine whether and how much to reward users based on their participation in the managed wireless distribution network, as well as how to reward the user, as discussed above.

An indication of the reward for a device (or user0 is provided to the user's device (act 506). The indication can be provided in various manners, such as providing a receipt for the reward to the user's device as discussed above.

Distributing Large Protected Content

A device in the managed wireless distribution network can host one or more portions of one or more different pieces of protected content (e.g., different movies, different games, etc.). Hosting or maintaining a portion of protected content refers to storing the portion of protected content and making the portion of protected content available to other devices in the managed wireless distribution network. Which portions of which protected content are hosted by a device can be determined in different manners. In one or more embodiments, the device hosts all portions of all protected content that the user of the device requests be available on the device (e.g., all of the games that the user has purchased). Alternatively, the network management service 112 can determine which portions of which protected content is hosted on which devices of the managed wireless distribution network. The network management service 112, or the managed wireless distribution network systems on the devices, can use various rules or criteria to determine which portions of which protected content is hosted on which devices of the managed wireless distribution network. The network management service 112 provides to each of one or more devices in the managed wireless distribution network an indication of which portions of which protected content are to be hosted on the device. The device then proceeds to obtain the protected content (e.g., from content service 114). Alternatively, the managed wireless distribution network systems on the devices determine which portions of content are to be hosted on each device, and the devices then proceed to obtain the protected content.

Protected content can be separated into different portions in a variety of different manners. For example, the protected content may be separated into a particular number of portions of approximately (within a threshold amount of) the same size. By way of another example, the protected content may be separated into a number of portions having equal to or less than a threshold size (e.g., 1 gigabyte or 5 gigabytes). The number of portions can optionally vary based on the number of devices desiring the protected content. For example, if 50 devices in a managed wireless distribution network have requested particular protected content then that particular protected content can be separated into 50 portions. By way of another example, if 20 devices in the managed wireless distribution network have requested other particular protected content then that other particular protected content can be separated into 20 portions.

It should be noted that a device in the managed wireless distribution network can host a portion of protected content that the user of the device is not permitted to consume. The device can host a portion of protected content simply to make it available to other devices in the managed wireless distribution network. If the user of the device does not have permission to consume the hosted portion of protected content, he or she will not be able to consume the portion of protected content (e.g., he or she will not have access to the appropriate key to decrypt the portion of protected content) as discussed above.

The network management service 112 can determine which portions of which protected content are hosted on which devices of the managed wireless distribution network based on various different rules or criteria. In one or more embodiments, the rules or criteria include an expected use date for the protected content. For example, portions of protected content scheduled to be released on a particular date can be hosted on various devices in the managed wireless distribution network from the content service 114 prior to the release date, a process referred to as seeding the protected content. Users do not have permission to consume the protected content until the release date, so the protected content cannot be consumed by the users until the release date even though portions are hosted on their devices.

A user can also request that particular protected content be available for consumption at a particular time or day. Depending on the amount of time remaining until the particular time or day, the network management service 112 can separate the protected content into multiple portions and indicate to different devices to obtain and host the different portions.

Various other rules or criteria can also be used by the network management service 112 to determine which portions of which protected content are hosted on which devices. For example, a device may indicate to network management service 112 that the device is willing to provide storage for a particular amount of protected content (e.g., 10 gigabytes), in response to which the network management service 112 determines to have no more than that particular amount of protected content stored on the device.

Protected content can be transferred among the devices via the wireless networks of the managed wireless distribution network faster than protected content can be transferred over the network 118. Thus, a user's device is able to obtain protected content more quickly via the managed wireless distribution network than from the network 118. By having different portions of the protected content obtained from the content service 114 by different devices in the managed wireless distribution network, the speed at which data can be obtained by the user's device is increased even further. For example, assume each device in the managed wireless distribution network communicates with the content service 114 at a rate of 5 megabits per second (mbps), but communicates with other devices in the managed wireless distribution network via wireless networks transferring data at a rate of 500 mbps. Further assume that particular protected content is separated into 20 portions that each of 20 different devices in the managed wireless distribution network obtains from the content service 114. Each device thus obtains 1/20 of the protected content at the slower rate of 5 mbps, then can host and transfer the obtained portion to other devices in the managed wireless distribution network at the faster rate of 500 mbps.

In one or more embodiments, the managed wireless distribution network system of a user's device can request assistance from neighboring devices (e.g., other devices in the managed wireless distribution network) in obtaining protected content. In response to such a request, each of these neighboring devices cooperates with the user's device by obtaining one or more portions of the protected content from the content service 114 and providing it to the user's device. Thus, in order to increase the speed with which a device obtains protected content, multiple other devices in the managed wireless distribution network can obtain and host portions of the protected content.

Each device (or the network management service 112) can also employ one or more rules or criteria to determine how long (for what time range) portions of protected content are hosted on the device. The same rules or criteria can be used for all portions of protected content, or different rules or criteria can be used for protected content that the user of the device is permitted to consume than for protected content that the user of the device is not permitted to consume. For example, the rules or criteria can result in protected content that the user of the device is permitted to consume being hosted on the device longer than protected content that the user of the device is not permitted to consume. Various different rules or criteria can be used, such as keeping only a particular amount of protected content (e.g., a particular number of gigabytes) of data hosted on the device, keeping only portions of protected content that have been requested by another device recently (e.g., within the past seven (or other threshold number) of days), keeping only portions of protected content that are anticipated as being requested (e.g., due to an upcoming release date) within the next seven (or other threshold number) of days, and so forth.

Protected content can be consumed on a device in the managed wireless distribution network in various different manners. In one or more embodiments, referred to as total acquisition, the device obtains and stores all portions of the protected content. In other embodiments, referred to as buffered acquisition, the device obtains and stores portions of the protected content as needed for consumption, and can then delete the portions of protected content. For example, portions of a movie are obtained and stored temporarily, and each portion can then be deleted after it has been played back. In other embodiments, referred to as acquisition-as-needed, the device receives parts of each portion of protected content just in time (e.g., within five seconds or one minute) of being needed for consumption of the protected content. The acquisition-as-needed can also be referred to as streaming the protected content to the device. Thus, protected content can be provided to a low-resource device (e.g., having a small amount of memory or storage) and played back after being stored temporarily (e.g., five seconds or one minute) on the device, and then deleted from the low-resource device after being played back.

In one or more embodiments, an estimated time of delivery for protected content is determined and made available to the user. The estimated time of delivery can be made available to the user in different manners, such as in response to a request from the user for the protected content, as part of a library or catalog of available protected content from which the user can select, and so forth. The estimated time of delivery for particular protected content is determined based on the topology of the managed wireless distribution network and which portions of the protected content are hosted on which devices (if any) of the managed wireless distribution network. The network management service 112 can receive indications from the devices of the managed wireless distribution network of which portions of protected content are actually stored on those devices. An estimated time of delivery of each portion of the protected content to a particular device can then be readily determined based on a data transfer rate of devices in the managed wireless distribution network (e.g., as indicated by those devices), how many networks the portions have to pass through (e.g., based on the topology of the managed wireless distribution network), and a data transfer rate of the network 118 (e.g., as indicated by the device) for portions of the protected content not included in the managed wireless distribution network.

In one or more embodiments, devices in the managed wireless distribution network can participate in sharing protected content while in a low power mode in which some resources (such as a hard drive) are not powered on and used. A device operating in a low power mode can still transfer data from one device to another by storing the data temporarily in a cache memory or on a network card but without storing the data on a hard drive (e.g., magnetic disk, optical disc, or solid state drive) of the device. For example, referring to FIG. 2, protected content may be transferred from device 206 to device 202 through device 204. Thus, excess noise and heat due to operation of the hard drive, as well as curiosity from the user as to why his or her hard drive is running when the device is in the low power mode, can be avoided.

Network Interface Card

Each device 104, 106 in the managed wireless distribution network 102 has one or more network interface cards (NICs) that allow the device 104, 106 to communicate with the network 118 or communicate with other devices via a wireless network. These NICs that a device has can be NICs that are part of the device itself (e.g., the NIC can be at least part of wireless network component 124 of device 104) or NICs that are part of a component associated with the device (e.g., the NIC can be at least part of wireless network component 128 associated with device 106). At least one of the one or more network interface cards support wireless communication, allowing communication with other devices via a wireless network. At least one of the one or more network interface cards can also support wired communication, allowing communication with other devices via a wired network (e.g., using an Ethernet network).

The one or more network interface cards of a device 104, 106 can include one or more virtual network interface cards. A virtual network interface card is presented to programs of the device 104, 106 as a physical network interface card, but is actually implemented at least in part in software by an operating system or other component (e.g., hypervisor) of the device 104, 106. The programs of the device 104, 106 interact with the virtual network interface card as if it were a physical network interface card. The operating system or other component manages access to and usage of a physical network interface card by the multiple virtual network interface cards.

In situations in which a device has three or more network interface cards (virtual or physical), one network interface card is used to host a wireless network that can be joined by other devices in the managed wireless distribution network 102. A second of the three or more network interface cards is used to access other devices in the managed wireless distribution network 102, allowing the device to join wireless networks hosted by the other devices in the managed wireless distribution network 102. A third of the three or more network interface cards is used to access the network 118.

In other situations, a device may not support virtual network interface cards, and may have only one or two network interface cards. In situations in which a device has a single network interface card, the device switches between using the single network interface card to connect to the network 118, using the single network interface card to host a wireless network that can be joined by other devices in the managed wireless distribution network 102, and using the single network interface card to join wireless networks hosted by the other devices in the managed wireless distribution network 102.

In situations in which a device has two network interface cards, the device switches between using the network interface cards to do one or two of the following: connect to the network 118, host a wireless network that can be joined by other devices in the managed wireless distribution network 102, and join wireless networks hosted by the other devices in the managed wireless distribution network 102.

The network management service 112 receives from the devices 104, 106 in the managed wireless distribution network 102 information describing the characteristics or properties of the devices 104, 106. These characteristics or properties include the number of network interface cards each device in the managed wireless distribution network 102 has. Thus, the network management service 112 can use this knowledge to orchestrate which devices in the managed wireless distribution network 102 are to host a wireless network that can be joined by other devices in the managed wireless distribution network 102, join wireless networks hosted by another device in the managed wireless distribution network 102, access the network 118, or combinations thereof. The network management service 112 can thus describe and create a route between two devices in the managed wireless distribution network 102 to allow protected content to be communicated between the two devices.

The network management service 112 receives indications from devices in the managed wireless distribution network 102 of the protected content that those devices desire. The protected content can be desired because a user desires to consume the protected content right away (e.g., begin watching a movie as soon as possible), because a user plans to consume protected content at a later time (e.g., watch a movie Saturday night), and so forth. The network management service 112 also knows which devices in the managed wireless distribution network 102 have which portions of which protected content. Based on the received indications, the network management service 112 determines how to configure the devices in the managed wireless distribution network 102 in order for the device to obtain the protected content it desires, including obtaining portions of the protected content from the content service 114 or other devices in the managed wireless distribution network 102.

For example, assume device 104 has a single network interface card connected to the network 118 and desires protected content that is available from device 106. The network management service 112 can instruct the device 104 to obtain the protected content from the device 106, allowing the device 104 to obtain the protected content more quickly than the protected content could be obtained from the content service 114. The managed wireless distribution network system 122 disconnects the network interface card of device 104 from the network 118 and joins a wireless network hosted by the device 106. The managed wireless distribution network system 122 obtains the protected content from the device 106, then disconnects from the wireless network hosted by the device 106 and re-connects to the network 118.

Figure 6:
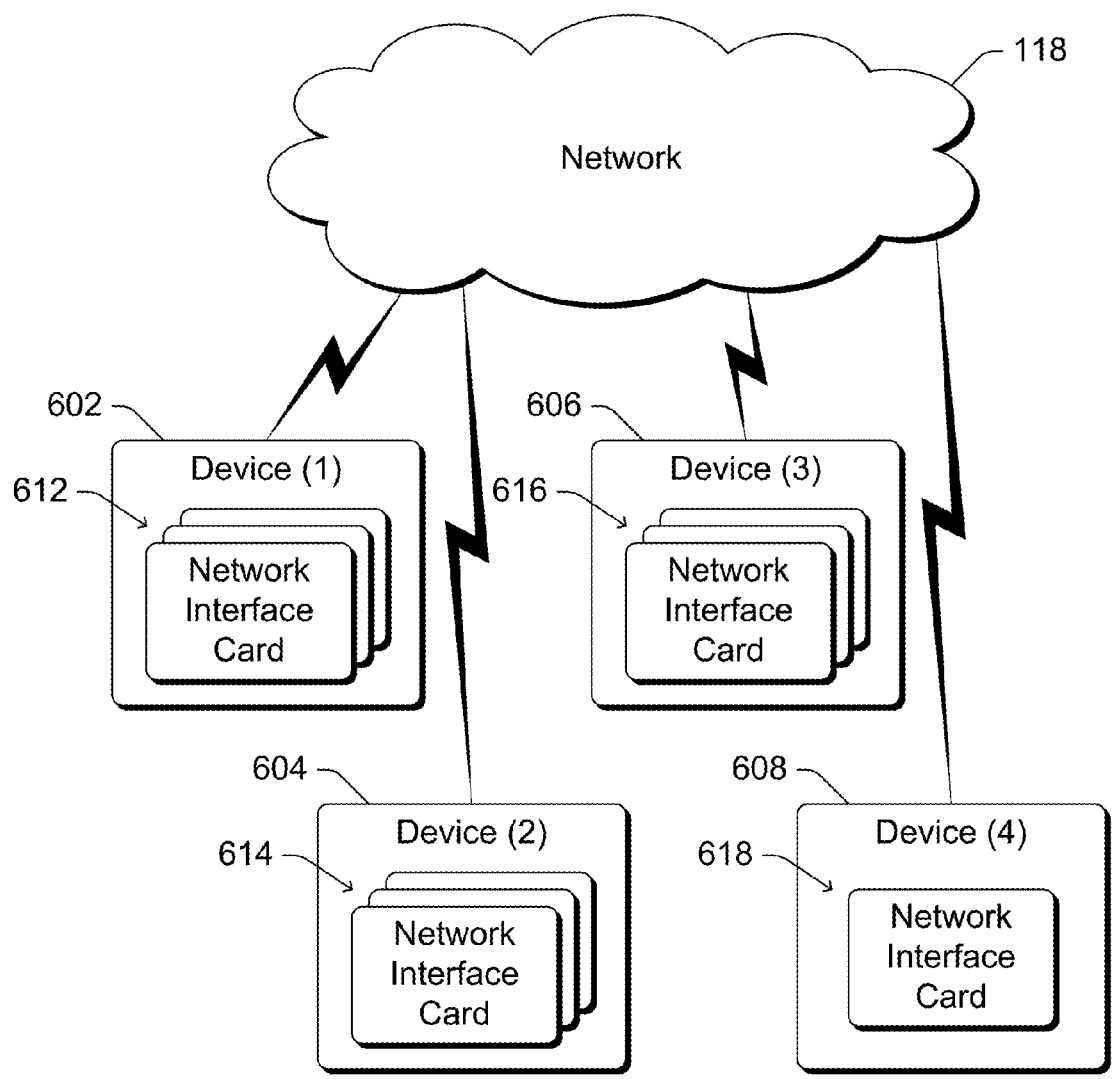
FIG. 6 illustrates an example managed wireless distribution network in accordance with one or more embodiments.

By way of another example, assume the managed wireless distribution network 102 includes devices with varying numbers of network interface cards. FIG. 6 illustrates an example managed wireless distribution network 600 in accordance with one or more embodiments. The managed wireless distribution network 600 includes devices 602, 604, 606, and 608, each of which can be a device 104 or 106 of FIG. 1. Device 602 includes multiple network interface cards 612, device 604 includes multiple network interface cards 614, device 606 includes multiple network interface cards 616, and device 608 includes a single network interface card 618.

Assume device 608 desires protected content that is available from device 602. The network management service 112 can define a route from the device 602 to the device 604 to the device 606 to the device 608 in order to transfer the protected content from the device 602 to the device 608. The network management service 112 instructs the device 602 to use one of network interface cards 612 to join a wireless network hosted by the device 604 using one of network interface cards 614. The network management service 112 also instructs the device 604 to use one of network interface cards 614 to join a wireless network hosted by the device 606 using one of network interface cards 616. The network management service 112 also instructs the device 606 to use one of network interface cards 616 to join a wireless network hosted by the device 608 using the network interface card 618. The protected content can then be transferred from the device 602 to the device 608 via devices 604 and 606. It should be noted that while transferring the protected content from the device 602 to the device 608, each of the devices 602, 604, and 606 can maintain a connection to the network 118 using one of the network interface cards 612, 614, and 616, respectively. As the device 608 has a single network interface card 618, the network interface card 618 disconnects from the network 118 to host the wireless network that is joined by the device 606, then ceases hosting the wireless network and re-connects to the network 118 after the protected content is transferred to the device 608.

Alternatively, the network management service 112 instructs the device 608 to use network interface card 618 to join a wireless network hosted by the device 606 using one of network interface cards 616. The network management service 112 also instructs the device 606 to use one of network interface cards 616 to join a wireless network hosted by the device 604 using one of network interface cards 614. The network management service 112 also instructs the device 604 to use one of network interface cards 614 to join a wireless network hosted by the device 602 using one of the network interface cards 612. The protected content can then be transferred from the device 602 to the device 608 via devices 604 and 606. It should be noted that while transferring the protected content from the device 602 to the device 608, each of the devices 602, 604, and 606 can maintain a connection to the network 118 using one of the network interface cards 612, 614, and 616, respectively. As the device 608 has a single network interface card 618, the network interface card 618 disconnects from the network 118 to join the wireless network that is hosted by the device 606, then disconnects from the wireless network hosted by the device 606 and re-connects to the network 118 after the protected content is transferred to the device 608.

The network management service 112 can also instruct the devices 602, 604, 606, and 608 to operate in different manners based on the number of network interface cards in the devices 602, 604, 606, and 608. For example, if the device 606 has only two network interface cards, then the network management service 112 can instruct the device 606 to disconnect from the network 118 while the protected content is transferred from the device 602 to the device 608, then re-connect to the network 118 (e.g., freeing a network interface card 616 to re-connect to the network by no longer hosting a wireless network, or alternatively no longer joining a network hosted by the device 604 or the device 608).

Returning to FIG. 1, it should be noted that the network management service 112 can also instruct a device 104, 106 to connect to a different wireless network in order to obtain protected content. For example, referring to FIG. 2, assume a device 204 has joined a wireless network 212 hosted by device 202, but that the protected content the device 204 desires is stored on device 208. The network management service 112 instructs the device 204 to disconnect from the wireless network 212 and join the wireless network 218 hosted by the device 208. The device 204 can then obtain the protected content from the device 208 using the wireless network 218. The device 204 can remain connected to the wireless network 218 after the protected content has been obtained from the device 208, or alternatively can disconnect from the wireless network 218 and re-join the wireless network 212.

It should also be noted that the network management service 112 can determine that a device is expected to have an improved experience when obtaining protected content by obtaining the protected content from a particular wireless network, and instruct the device to connect to the particular wireless network in order to obtain the protected content. This particular wireless network can be a different wireless network than the device typically joins or joins during normal operation (e.g., when a user of the device is consuming protected content on the device). The improved experience can be measured in various different manners, such as a reduction in the amount of time taken to obtain the protected content (e.g., due to the particular wireless network being faster), a reduction in the cost of obtaining the protected content (e.g., due to a low cost associated with using the particular wireless network), a reduction in the amount of data transferred over a particular network (e.g., to avoid exceeding limits on how much data the device can obtain over a particular amount of time have the particular wireless network obtain the protected content via the Internet), and so forth.

Dynamic Prioritization

The network management service 112 receives from the devices 104, 106 in the managed wireless distribution network 102 information describing the characteristics or properties of the devices 104, 106 as well as indications of protected content desired by the devices 104, 106. These characteristics or properties include the number of network interface cards each device in the managed wireless distribution network 102 has as discussed above, as well as various additional information such as performance characteristics of the devices 104, 106 (e.g., data transfer rates of wireless networks hosted by the device 104, 106), the reliability of the devices 104, 106 (e.g., whether protected content has been successfully routed through the devices 104, 106 before), reputation or historical analysis of the devices 104, 106 (e.g., times when the devices 104, 106 are typically powered on or off, times when the devices 104, 106 are typically being heavily used (e.g., device resources are being used due to a user playing a game)), wireless signal strength of the devices 104, 106, and so forth.

Protected content can be desired by a device because a user desires to consume the protected content right away (e.g., begin watching a movie as soon as possible), because a user plans to consume protected content at a later time (e.g., watch a movie Saturday night), and so forth. The network management service 112 also knows which devices in the managed wireless distribution network 102 have which portions of which protected content. Based on the received indications, as well as the information describing the characteristics or properties of the devices in the managed wireless distribution network 102, the network management service 112 determines how to configure the devices in the managed wireless distribution network 102 in order for the device to obtain the protected content it desires. This configuration includes identifying which portions of the protected content to obtain from which devices.

The network management service 112 thus has knowledge of characteristics or properties of the devices in the managed wireless distribution network 102, knowledge of which portions of which protected content are stored on which managed wireless distribution network 102, and knowledge of which protected content is desired by which devices in the managed wireless distribution network 102 and when such protected content is desired. The network management service 112 uses this knowledge to describe and create routes through the managed wireless distribution network 102, as well as determine which protected content is to be given priority for transfer through the managed wireless distribution network 102 in the event there are insufficient resources or bandwidth in the managed wireless distribution network 102 to transfer all desired protected content approximately concurrently (or for consumption at the requested time). The network management service 112 can give priority to delivering particular protected content to a device based on the protected content, the user desiring the protected content, or both. The priority given to delivering particular protected content is dynamic and can vary over time as changes are made in the characteristics or properties of the devices in the managed wireless distribution network 102, changes are made in portions of which protected content are stored on which managed wireless distribution network 102, and changes are made in which protected content is desired by which devices in the managed wireless distribution network 102.

The network management service 112 can prioritize protected content delivery based on the protected content itself, so that all (or at least a threshold number) of the users receive the protected content they desire at their devices as needed (e.g., are received by a "fulfill-by" time associated with the protected content). For example, when multiple users desire to have different pieces of protected content that are different movies delivered to their devices, the network management service 112 can assign priorities to particular portions of the pieces of protected content so that a next amount of each movie to be played back (e.g., the next five minutes of each movie) is given a higher priority than other portions of the protected content. Thus, the network management service 112 can prioritize protected content so that the next amount of each movie to be played back is delivered to devices before concern is given to delivering later portions of each movie to the devices. If one user doesn't desire protected content be delivered until the next day, portions of such protected content can be given lower priorities than other protected content that another user desires to consume in the next few minutes.

The network management service 112 can also prioritize protected content delivery based on the user desiring the protected content. Users can be assigned different levels or tiers, with protected content delivery for higher level or higher tier users being given higher priority than protected content delivery for lower level or lower tier users. Levels or tiers can be determined in different manners, such as based on rewards given to the users, fees paid by the users, and so forth.

The network management service 112 creates routes through the managed wireless distribution network 102, and provides indications of such routes to the devices in the managed wireless distribution network 102. The creation of the routes is based on the priority of the protected content, the user, or both, providing faster routes (e.g., passing through devices with higher data transfer rates, passing through smaller numbers of devices) for higher priority protected content or users than for lower priority protected content or users. The indications of the routes include indications of which wireless networks are to be joined by which devices in the managed wireless distribution network 102, and which portions of which protected content are to be obtained by which devices from which other devices. The network management service 112 also informs the devices along the routes of the priorities of the different portions of protected content. Thus, if a device is receiving or sending multiple portions of protected content, the device can determine which portion is higher priority and thus is to be obtained or sent first. Devices can also allocate different amounts of resources to delivery of protected content based on the priorities of the different portions of protected content. For example, for protected content being delivered to a higher tier user the device may allocate 10 gigabytes of storage for the protected content or 500 megabits of bandwidth, while for protected content being delivered to a lower tier user the device may allocate 5 gigabytes of storage for the protected content or 100 megabits of bandwidth.

A device can also assess its ability to deliver particular portions of protected content in a particular amount of time, and inform the network management service 112 of the result of such assessment. For example, a device may already have multiple portions of protected content to transfer at a high priority, and if requested to transfer another portion of protected content at a high priority may be unable to do so for several minutes. The device can notify the network management service 112 of this expected several-minute delay, allowing the network management service 112 to take an appropriate remedial action, such as create a different route, notify a user of the device that desires the protected content that the protected content will be delayed several minutes, and so forth.

It should be noted that situations can arise in which there are bottlenecks in the managed wireless distribution network 102. Such bottlenecks can be a result of, for example, numerous routes for different protected content passing through a small number of devices. The network management service 112 can identify such bottlenecks and identify devices that could be used to help alleviate such bottlenecks (e.g., by adding more devices to the managed wireless distribution network in a same geographical area or that can see (or is expected to be able to see based on its geographical area) wireless networks of the small number of devices through which the numerous routes pass). The network management service 112 can notify the identified devices to request their assistance by joining the managed wireless distribution network 102. Various different rewards as discussed above can be given to such devices if they join the managed wireless distribution network 102.

Protected Content Discovery

Each device in the managed wireless distribution network 102 can host various portions of various different pieces of protected content. This protected content can include protected content that the user of the device has permission to consume as well as protected content that the user of the device does not have permission to consume. Which portions of which protected content are hosted on which devices can be determined in various different manners.

In one or more embodiments, a local discovery technique is used for the devices in the managed wireless distribution network 102 to determine which portions of which protected content are hosted on which devices. Each device in the managed wireless distribution network 102 sends an indication of the portions of protected content that device hosts to one or more other devices in the managed wireless distribution network 102. Each device in the managed wireless distribution network 102 maintains a record, referred to as a catalog, of the portions of protected content hosted by the device. Each device also maintains, as part of the catalog or as one or more additional catalogs, a record of portions of protected content that the device is aware that other devices host.

Figure 7:
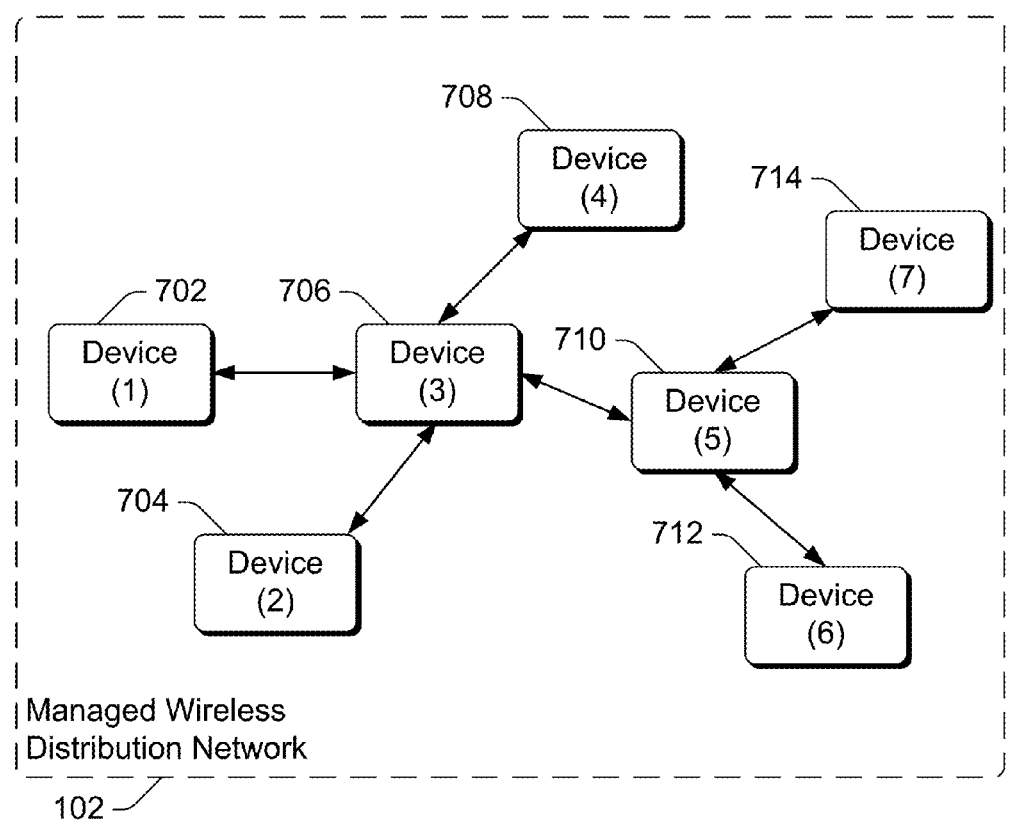
FIG. 7 illustrates an example managed wireless distribution network using a local discovery technique in accordance with one or more embodiments.

FIG. 7 illustrates an example managed wireless distribution network using a local discovery technique in accordance with one or more embodiments. The managed wireless distribution network 102 includes a device 702, a device 704, a device 706, a device 708, a device 710, a device 712, and a device 714. Arrows are shown in FIG. 7 to illustrate examples of which devices exchange catalogs of protected content portions with each other. For example, devices 702 and 706 can exchange catalogs with each other, devices 706 and 704 can exchange catalogs with each other, and so forth. For any two of devices 702-714, if one of the two devices hosts a wireless network that is joined by the other of the two devices, then either or both of the two devices can obtain the catalog of the other.

Devices can request catalogs from other devices, or simply provide (e.g., push) their catalogs to other devices, at various times or in response to various events. For example, catalogs (or changes to catalogs) can be requested or provided at regular or irregular intervals, such as every few hours. By way of another example, catalogs (or changes to catalogs) can be provided in response to a change to the catalog.

The catalog of a device identifies which portions of which protected content that device hosts. For example, the catalog of device 706 includes an indication of each portion of protected content hosted by the device 706.

The catalog of a device can optionally identify which portions of which protected content are hosted by other devices. Each time a device obtains a catalog from another device, the information in the obtained catalog is maintained by the device. The information in the obtained catalog can be maintained in different manners, such as being maintained as a separate catalog, being incorporated into the catalog of the device, and so forth. When one device obtains a catalog of another device, it also obtains the information in any other catalogs obtained by the other device. In doing so, a record is maintained of the number of additional devices to be accessed or "hops" to take in order to access the protected content. For example, from the perspective of the device 706, protected content hosted on the device 706 is zero hops away, protected content hosted on the device 710 is one hop away, protected content hosted on the device 712 is two hops away, and so forth. Each time a catalog is provided to another device, the hop count for each portion of protected content in the catalog is incremented (e.g., by one).

For example, assume that device 706 hosts portion 1 and portion 15 of a Movie A (separated into 25 portions), and all portions of Movie B, which is reflected in a catalog of device 706. Further assume that device 708 hosts portion 7 and portion 8 of Movie A, and all portions of Movie C, which is reflected in a catalog of device 708. Device 706 can obtain the catalog of device 708 from device 708 and incorporate the catalog of device 708 into the catalog of device 706, and include an indication of which portions are available from which devices. Thus, the catalog of device 706 reflects that portion 1 and portion 15 of Movie A, as well as all portions of Movie B, are available from device 706, and that portion 7 and portion 8 of Movie A, as well as all portions of Movie C, are available from device 708. This catalog of device 706 can then be obtained by device 702, so device 702 then knows that portion 1 and portion 15 of Movie A, as well as all portions of Movie B, are available from device 706 one hop away, and that portion 7 and portion 8 of Movie A, as well as all portions of Movie C, are available from device 708 two hops away.

The catalog can also reflect routes to particular portions of protected content. Continuing with the previous example, the catalog at device 706 can include an indication that the route for portion 7 of Movie A is simply the device 708. When the catalog is provided from device 706 to device 702, the catalog can be updated by device 706 or 702 to reflect that, from the perspective of device 702, the route for portion 7 of Movie A is device 706 to device 708.

Each device includes a managed wireless distribution network system as discussed above, and this managed wireless distribution network system can determine based on the catalog where to obtain particular portions of protected content. Continuing with the previous example, if the device 702 desires all portions of Movie A, then the device 702 knows that portions 1 and 15 can be obtained from device 706, and that portions 7 and 8 can be obtained from device 708.

It should be noted that the same portion of the same protected content can be stored on two different devices. Continuing with the previous example, assume portion 7 of Movie A is also hosted by device 712. Thus, the catalog of device 702 reflects that portion 7 of Movie A can be obtained from device 708 or device 712. If device 702 requests portion 7 of Movie A, which of devices 708 and 712 portion 7 of Movie A is obtained from can be determined based on various criteria (e.g., the device that can be accessed via the smaller number of hops, the device that is currently powered on, and so forth).

When requesting a portion of protected content, a device submits a request for the portion to the next device in the route to the device that hosts the portion. Continuing with the previous example, the catalog received by device 702 from device 706 indicates to the device 702 portions of protected content hosted by device 706 and device 708, and since the catalog was received from device 706 the next device in the route is device 706. The request can specify the particular device from which a portion of protected content is to be obtained (e.g., specify device 708 to obtain portion 7 of Movie A), or alternatively can simply specify the portion of that is to be obtained (e.g., and rely on the next device in the route to provide the request to the appropriate device or appropriate next device in the route).

The number of hops that a catalog is passed through can optionally be limited to a threshold number of hops (e.g., five or seven), after which the information in the catalog is no longer passed to other devices. For example, if the threshold number of hops is seven and the catalog for device 708 is already provided to seven different devices along a route, then when the seventh device provides its catalog to another device in the managed wireless distribution network 102, the seventh device does not provide the information in the catalog for device 708 to the eighth device (or the eighth device receives but drops or otherwise ignores the information in the catalog for the device 708).

It should be noted that multiple different routes can exist to the same portion of protected content. For example, one route for sending a portion of protected content hosted by device 708 to device 702 may be from device 708 to device 706 to device 702, and another route may be from device 708 to device 710 to device 706 to device 702. Various different rules or criteria can be used to select one of the routes, such as using the route with the smallest number of hops, or using the route in which devices are currently powered on.

Various additional metadata regarding the devices 702-714 can also be included in the catalog or otherwise provided from one device to another along with the catalog. The metadata can be any of a variety of different characteristics or information regarding the devices, and can be used by the managed wireless distribution network system to determine routes to different devices. These characteristics or properties include the number of network interface cards each device in the managed wireless distribution network 102 has (or whether virtual network interface cards are included in each device) as discussed above, as well as various additional information such as performance characteristics of the devices 702-714 (e.g., data transfer rates of wireless networks hosted by the device 702-714), the reliability of the devices 702-714 (e.g., whether protected content has been successfully routed through the devices 702-714 before), reputation or historical analysis of the devices 702-714 (e.g., times when the devices 702-714 are typically powered on or off, times when the devices 702-714 are typically being heavily used (e.g., device resources are being used due to a user playing a game)), wireless signal strength of the devices 702-714, and so forth.

In one or more embodiments, various rules or formulas are applied to the characteristics or information regarding the devices in order to determine a score or ranking of different routes to the same portion of protected content. Different characteristics or information can be weighted differently to contribute to the score or ranking differently. The route with the highest or greatest score or ranking can then be selected as the route to use to obtain the portion of protected content.

The catalogs can optionally be used to display to a user of a device in the managed wireless distribution network 102 an indication of what protected content is available from other devices in the managed wireless distribution network 102. In such situations, the managed wireless distribution network system can optionally filter information in the catalog based on various different criteria, such as protected content ratings, to restrict what information is displayed to the user. For example, protected content can have different ratings (e.g., maturity ratings), and titles or other identifiers of particular protected content having particular ratings displayed to a user only if the user is permitted (e.g., as specified by a user, administrator, or account manager of the device) to consume protected content having those particular ratings.

Various additional criteria can also be applied to the catalog to determine what protected content is displayed to preserve anonymity of the source of the protected content. The additional criteria can include, for example, a density of devices in the managed wireless distribution network 102, a popularity of protected content, a rating of protected content, and so forth. For example, if a device is in part of the managed wireless distribution network 102 with a low density of other devices (e.g., fewer than a threshold number, such as 10), then an identifier of the protected content is not displayed. This avoids the situation where, for example, a user in a low density area can guess what protected content his or her neighbor has based on the catalog. By way of another example, if a device is in part of the managed wireless distribution network 102 with a low density of other devices, and the protected content has a particular rating (e.g., a rating indicating adults only), then an identifier of the protected content is not displayed. By way of yet another example, if a device is in part of the managed wireless distribution network 102 with a low density of other devices, and the protected content is not popular (e.g., is not in a top threshold number (e.g., top 100) of protected content consumed by users), then an identifier of the protected content is not displayed.

It should be noted that a device can additionally filter the protected content included in its catalog using any of the same or similar criteria. For example, a device may filter protected content having a particular rating (e.g., a rating indicating adults only), so that the protected content is not identified in the catalog of the device. Thus, other devices in the managed wireless distribution network 102 are not aware that the device has the protected content, and cannot obtain the protected content from the device via the managed wireless distribution network 102.

In other embodiments, an enhanced local discovery technique is used for the devices in the managed wireless distribution network 102 to determine which portions of which protected content are on which devices. The enhanced local discovery technique is similar to the local discovery technique discussed above, except that rather than devices communicating their catalogs to each other, the devices communicate their catalogs to a central service (e.g., network management service 112 of FIG. 1).

Figure 8:
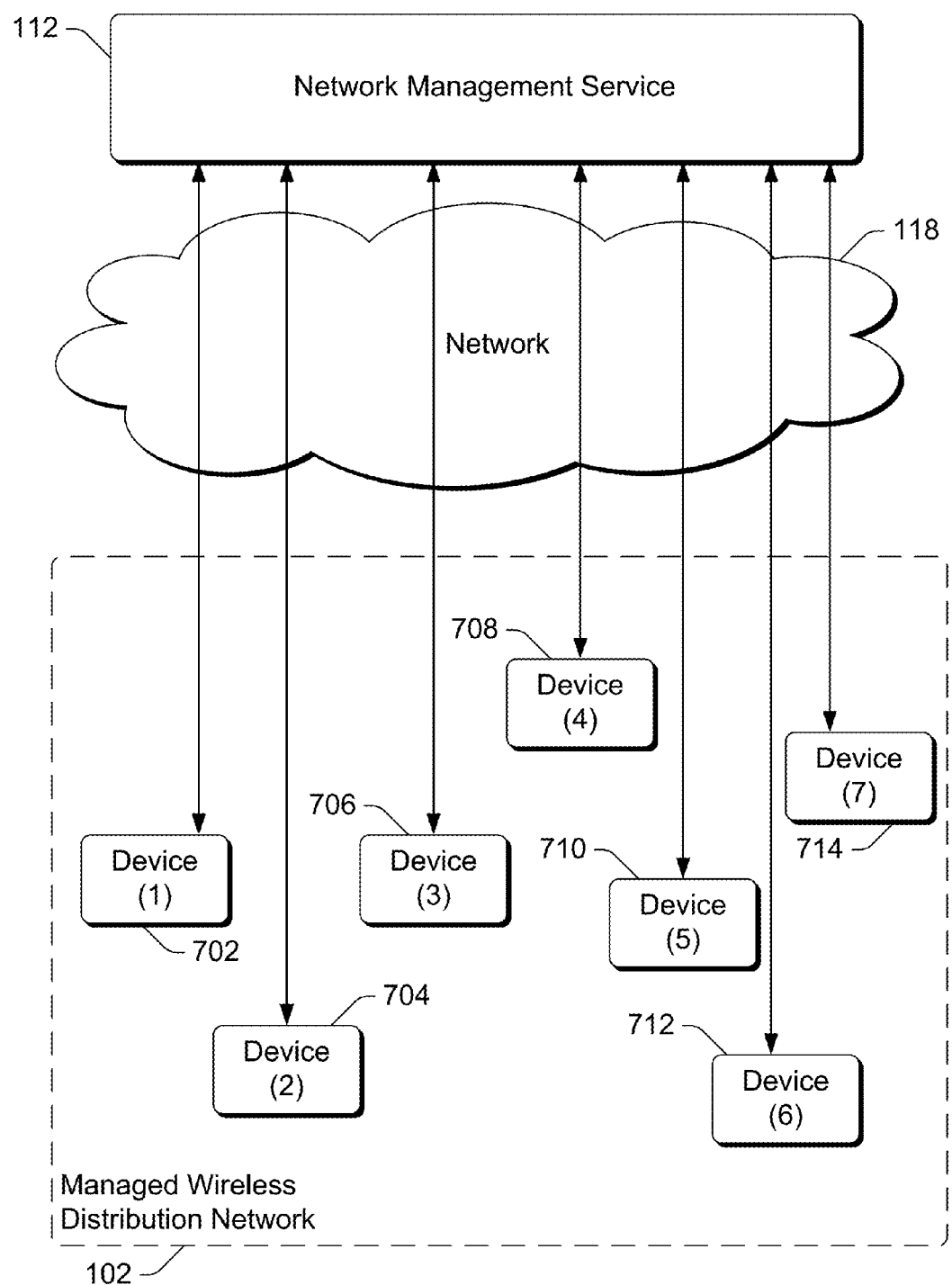
FIG. 8 illustrates an example system using an enhanced local discovery technique in accordance with one or more embodiments.

FIG. 8 illustrates an example system 800 using an enhanced local discovery technique in accordance with one or more embodiments. The managed wireless distribution network 102 includes a device 702, a device 704, a device 706, a device 708, a device 710, a device 712, and a device 714, as discussed above with reference to FIG. 7. Arrows are shown in FIG. 8 to illustrate the exchange of catalogs. Thus, as can be seen in FIG. 8, rather than transmitting catalogs to one another, catalogs are transferred from the devices 702-714 to the network management service 112 via network 118, and also from the network management service 112 to the devices 702-714 via network 118. Otherwise, the use of catalogs when using the enhanced local discovery technique is the same as in the local discovery technique.

The catalog of each device includes information identifying the portions of protected content hosted by the device. Updated catalogs can be provided to the network management service 112, and received from the network management service 112, at regular or irregular intervals or in response to particular events, analogous to the discussion above. Various metadata can also be included as part of the catalogs or transferred along with the catalogs, analogous to the discussion above.

It should be noted that some information when using the local discovery technique discussed above is obtained while transmitting the catalog from one device to another, and such information is not included in the catalogs provided to the devices 702-714 by the network management service 112. However, information regarding the topology of the managed wireless distribution network 102 can be provided to the network management service 112, which in turn can provide the information to the devices 702-714, which in turn can determine routes between devices based on the topology.

The topology of the managed wireless distribution network 102 can be determined in various different manners. In one or more embodiments, each device can provide to the network management service 112 an indication of the wireless networks that the device can see, as well as any wireless networks that the device is hosting as discussed above. Given this information, routes between two devices can be readily determined.

The catalogs are used in the same manner as discussed above, along with characteristics or information regarding the devices as discussed above, and along with route information (based on topology of the managed wireless distribution network 102) to allow particular routes between particular devices to be determined. These routes are determined by the managed wireless distribution network systems on the devices 702-714 rather than by the network management service 112. Thus, the network management service 112 essentially operates as a database, storing the catalogs of the devices 702-714 and providing the catalogs to different ones of the devices 702-714.

In other embodiments, a managed discovery technique is used for the devices in the managed wireless distribution network 102 to determine which portions of which protected content are on which devices. The managed discovery technique differs from the local discovery technique and the enhanced local discovery technique in that the devices communicate their catalogs to a central service (e.g., network management service 112 of FIG. 1) and the central service determines routes for transferring portions of protected content.

Figure 9:
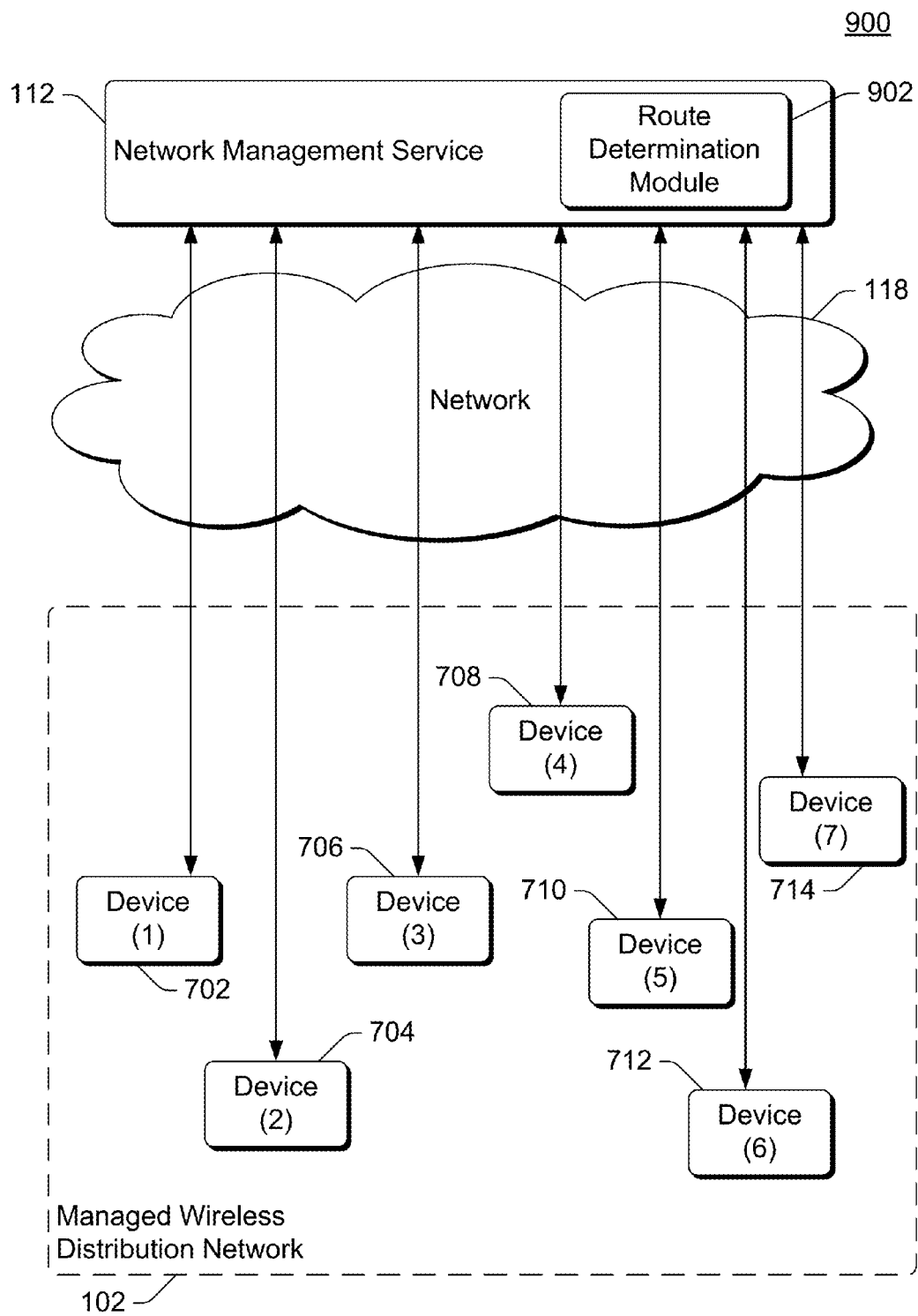
FIG. 9 illustrates an example system using a managed discovery technique in accordance with one or more embodiments.

FIG. 9 illustrates an example system 900 using a managed discovery technique in accordance with one or more embodiments. The managed wireless distribution network 102 includes a device 702, a device 704, a device 706, a device 708, a device 710, a device 712, and a device 714, as discussed above with reference to FIG. 7. Arrows are shown in FIG. 9 to illustrate the exchange of catalogs. Thus, as can be seen in FIG. 9, catalogs are transferred from the devices 702-714 to the network management service 112 via network 118, and also from the network management service 112 to the devices 702-714 via network 118.

The catalog of each device includes information identifying the portions of protected content hosted by the device. Updated catalogs can be provided to the network management service 112, and received from the network management service 112, at regular or irregular intervals or in response to particular events, analogous to the discussion above. Various metadata can also be included as part of the catalogs or transferred along with the catalogs, analogous to the discussion above.

The topology of the managed wireless distribution network 102 can be determined in various different manners, analogous to the discussion above regarding the enhanced local discovery technique. For example, each device can provide to the network management service 112 an indication of the wireless networks that the device can see, as well as any wireless networks that the device is hosting. Given this information, routes between two devices can be readily determined.

The catalogs are used in the same manner as discussed above, along with characteristics or information regarding the devices as discussed above, and along with route information (based on topology of the managed wireless distribution network 102) to allow particular routes between particular devices to be determined. However, the routes are determined by a route determination module 902 of the network management service 112.

When a device 702-714 desires a particular portion of protected content, the device requests a route to the protected content from the network management service 112. The route determination module 902 determines the route and provides instructions to the various devices along the route to transfer the particular portion of protected content to the requesting device. The requesting device and other devices along the route may, but need not, know the entire route. Similarly, if protected content is to otherwise be stored on a particular device 702-714, the route determination module 902 determines the route and provides instructions to the various devices along the route to transfer the particular portion of protected content to the particular device.

The network management service 112 receives various characteristics and information regarding the devices 702-714, and can receive this information at regular or irregular intervals or in response to particular events. For example, threshold values can be set by the network management service 112, and a device 702-714 notifies the network management service 112 if a characteristic of the device changes (e.g., the device transitions to a low power mode, the device is transferring data at a rate greater than a threshold level, etc.). Because the network management service 112 generates the routes between devices, and also receives this information from the devices 702-714, the network management service 112 can manage routes for various data requests to satisfy various criteria. This criteria can include using various techniques discussed above (e.g., dynamic prioritization), ensuring devices do not get overloaded (e.g., devices don't use more than a threshold amount of their resources in transferring protected content), and so forth.

The network management service 112 also monitors (e.g., is informed of by the devices 702-714) which portions of protected content are obtained from a protected content service (e.g., content service 114), and thus the network management service 112 knows when particular portions of protected content will be available on particular devices 702-714 in the future. This knowledge, along with knowledge of when a portion is to be stored on a device for consumption at the device, can be used in determining routes and when to transfer portions of protected content. For example, assume device 702 requests a movie be stored on the device 702 for playback to the user of device 702 in six hours. Further assume that no device 702-704 currently has the movie, but that the device 708 is obtaining the movie from a content service (e.g., content service 114) and will have it in approximately thirty minutes. The network management service 112 can delay providing a route from the device 708 to the device 702, and delay instructing devices to send the movie to the device 702, until the device 708 has obtained the movie. By thus delaying providing protected content based on knowledge of future protected content on devices 702-714, additional access to the content service can be avoided and the protected content can be stored on the device 702 more quickly.

By way of another example, assume device 702 requests a movie be stored on the device 702 for playback to the user as soon as possible. Further assume that no device 702-704 currently has the first portion of the movie (e.g., the first five minutes), but that the device 708 is obtaining the first portion of the movie from a content service (e.g., content service 114) and will have it in approximately five minutes. The network management service 112 can delay providing a route from the device 708 to the device 702, and delay instructing devices to send the first portion of the movie to the device 702, until the device 708 has obtained the first portion of the movie. By thus delaying providing protected content based on knowledge of future protected content on devices 702-714, additional access to the content service can be avoided and the protected content can be stored on the device 702 more quickly.

Figure 10:
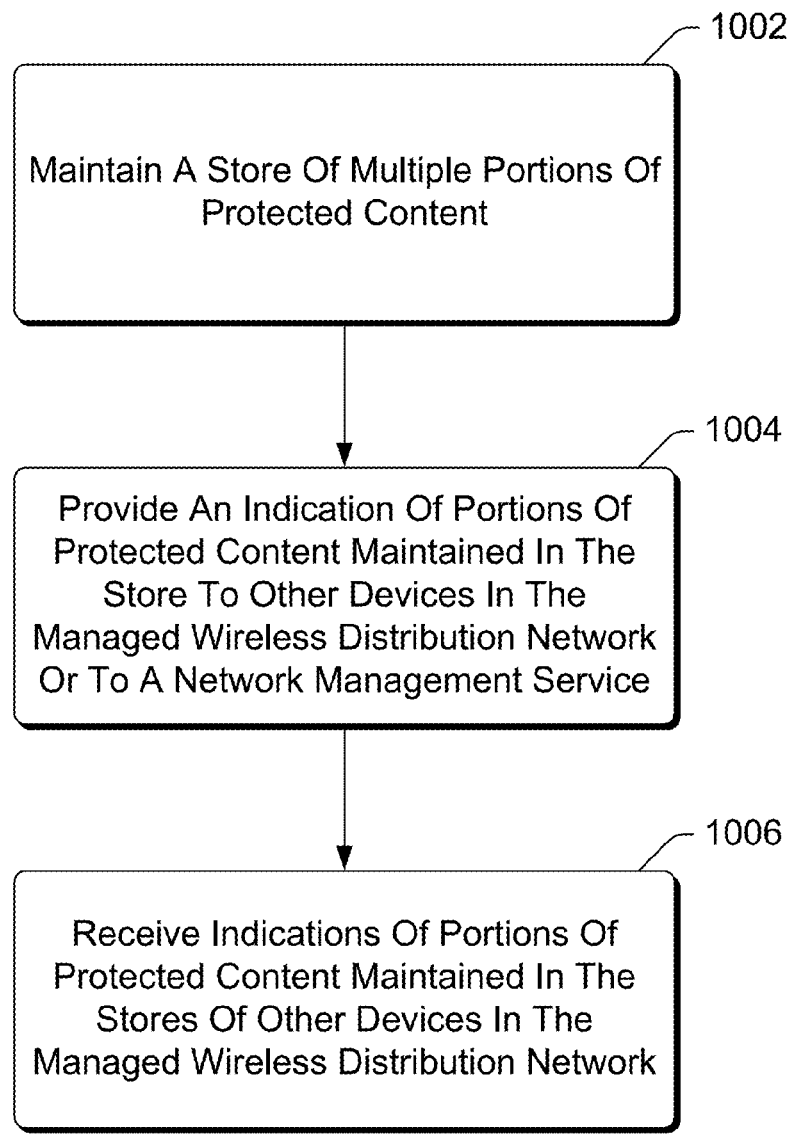
FIG. 10 is a flowchart illustrating an example process for discovering content in a managed wireless distribution network in accordance with one or more embodiments.

FIG. 10 is a flowchart illustrating an example process 1000 for discovering content in a managed wireless distribution network in accordance with one or more embodiments. Process 1000 is carried out by a device in a managed wireless distribution network, such as device 104 or 106 of FIG. 1, and can be implemented in software, firmware, hardware, or combinations thereof. Process 1000 is shown as a set of acts and is not limited to the order shown for performing the operations of the various acts. Process 1000 is an example process for discovering content in a managed wireless distribution network; additional discussions of discovering content in a managed wireless distribution network are included herein with reference to different figures.

In process 1000, a store of multiple portions of protected content is maintained on a device (act 1002). The device storing the protected content is the device implementing process 1000. The protected content maintained on the device, also referred to as hosted by the device, can include protected content for consumption by a user of the device, protected content seeded on the device, protected content stored on the device for transfer to another device when routing protected content through the managed wireless distribution network, and so forth.

An indication of portions of protected content maintained in the store is provided to other devices in the managed wireless distribution network or to a network management service (act 1004). Using the local discovery technique, the indication is provided to other devices in the managed wireless distribution network as discussed above. Using the enhanced local discovery technique or managed discovery technique, the indication is provided to a network management service as discussed above.

Indications of portions of protected content maintained in the stores of other devices in the managed wireless distribution network is also received (act 1006). Using the local discovery technique, the indications are received from other devices in the managed wireless distribution network as discussed above. Using the enhanced local discovery technique or managed discovery technique, the indications are received from a network management service as discussed above.

Figure 11:
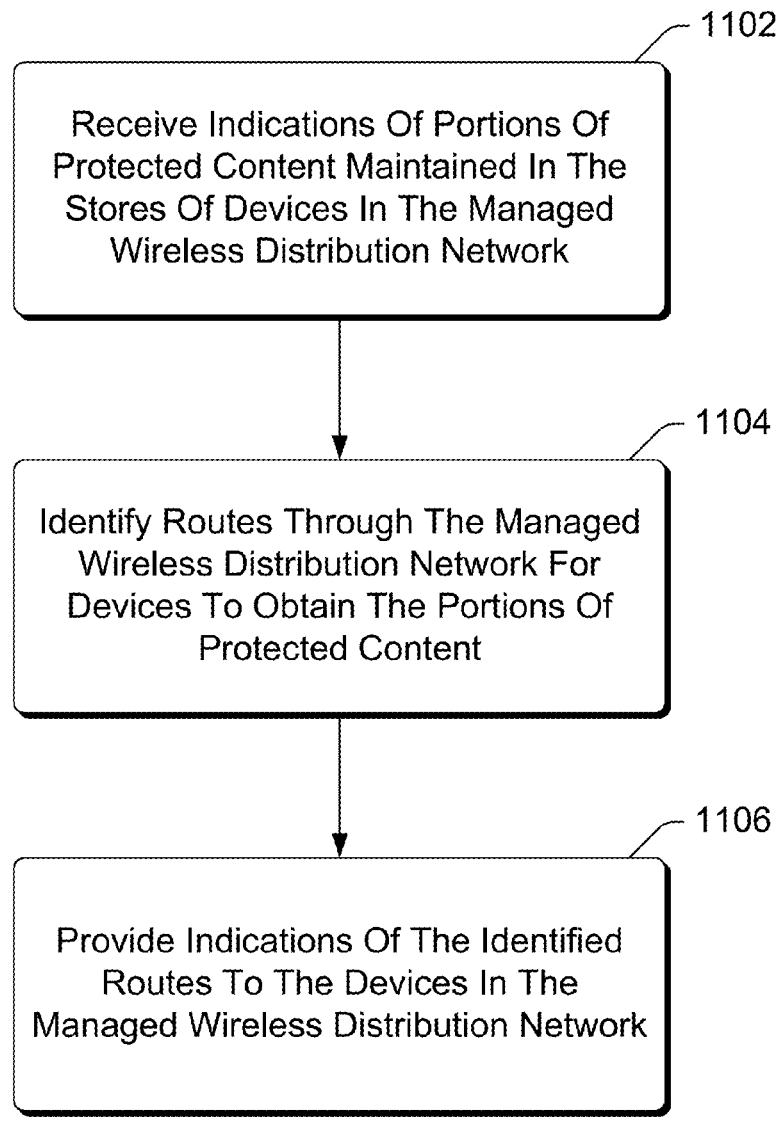
FIG. 11 is a flowchart illustrating an example process for discovering content and generating routes in a managed wireless distribution network in accordance with one or more embodiments.

FIG. 11 is a flowchart illustrating an example process 1100 for discovering content and generating routes in a managed wireless distribution network in accordance with one or more embodiments. Process 1100 is carried out by a network management service, such as network management service 112 of FIG. 1, and can be implemented in software, firmware, hardware, or combinations thereof. Process 1100 is shown as a set of acts and is not limited to the order shown for performing the operations of the various acts. Process 1100 is an example process for discovering content and generating routes in a managed wireless distribution network; additional discussions of discovering content and generating routes in a managed wireless distribution network are included herein with reference to different figures.

In process 1100, indications of portions of protected content maintained in the stores of devices in the managed wireless distribution network are received (act 1102).

Routes through the managed wireless distribution network are identified for devices to obtain the portions of protected content (act 1104). These routes can be identified in a variety of different manners as discussed herein, including based on content priorities, user priorities, other criteria, and so forth.

Indications of the identified routes are provided to the devices in the managed wireless distribution network (act 1106). These indications can be identifications of full routes (e.g., all the devices or wireless networks between two devices) or portions of routes (e.g., obtain a portion of one protected content from one device and provide the portion to another device).

Protected Content Sources

Portions of protected content can be obtained by a device in a managed wireless distribution network from a variety of different sources. Portions of protected content can be obtained from a content service or from another device in the managed wireless distribution network as discussed above. Additionally, portions of protected content can be obtained from other locations, such as other devices or services external to the managed wireless distribution network.

Figure 12:
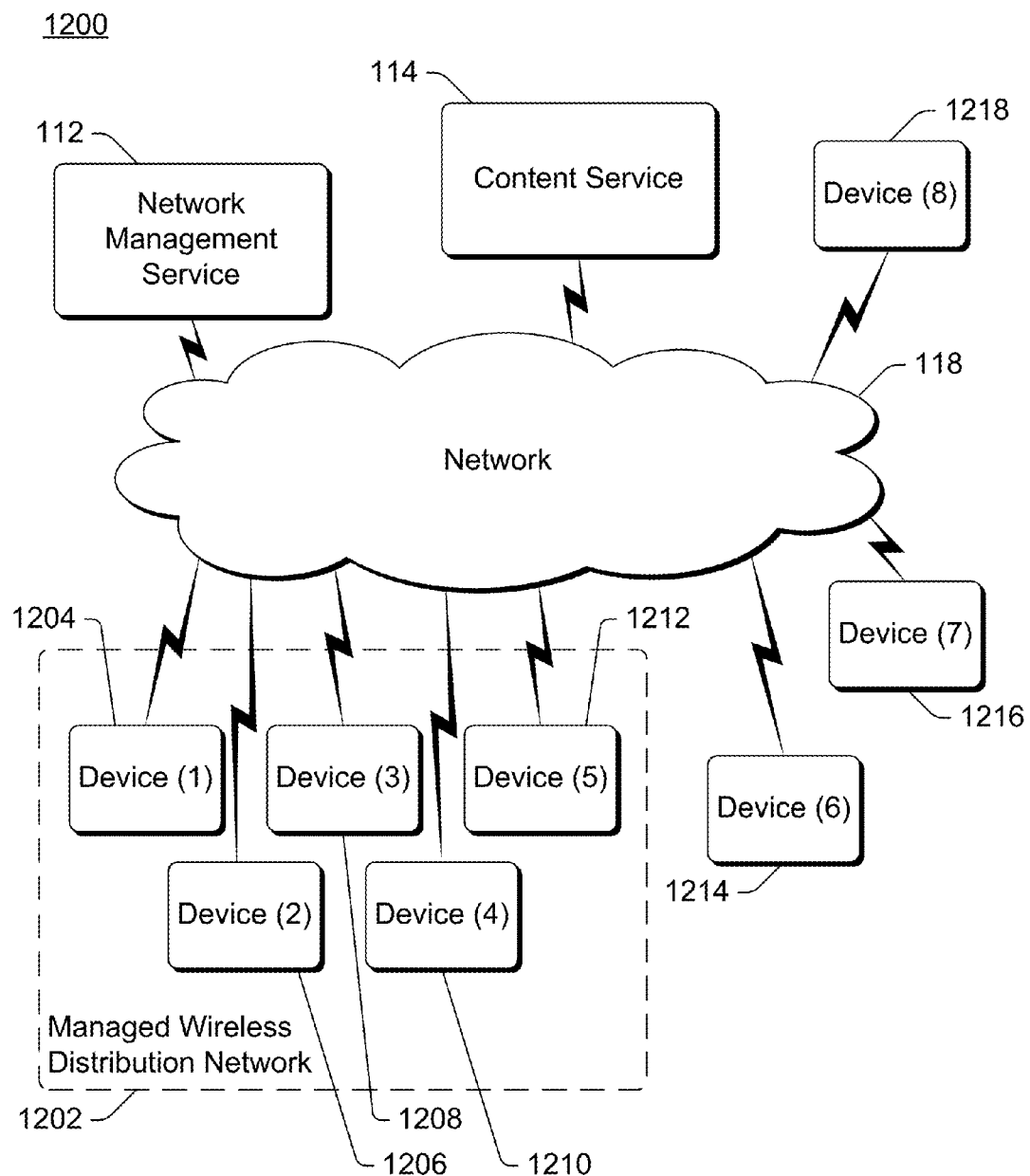
FIG. 12 illustrates an example system implementing the distributing content in managed wireless distribution networks in accordance with one or more embodiments.

FIG. 12 illustrates an example system 1200 implementing the distributing content in managed wireless distribution networks in accordance with one or more embodiments. System 1200 includes a managed wireless distribution network 1202 that includes multiple devices 1204, 1206, 1208, 1210, and 1212. System 1200 also includes multiple devices 1214, 1216, and 1218 that are not part of the managed wireless distribution network 1202. The devices 1204-1218 can be any of a variety of different types of devices, analogous to devices 104 and 106 of FIG. 1.

The devices 1204-1212 can communicate with one another via the wireless networks of the managed wireless distribution network 1202. The devices 1204-1212 can also communicate with one another, as well as device 1214-1218, network management service 112, and content service 114 via the network 118.

Portions of protected content can be obtained by devices 1204-1212 using the managed wireless distribution network 1202, or from the content service 114, as discussed above. Additionally, portions of protected content can be obtained by devices 1204-1212 from one or more of devices 1214-1218 via the network 118 using any of a variety of peer-to-peer (P2P) networks or communication protocols. The devices 1204-1212 can be aware of the devices 1214-1218 in any of a variety of different manners, such as from the network management service 112.

In one or more embodiments, the network management service 112 maintains a record of which portions of which protected content are stored by each of the devices 1202-1218 as well as the content service 114. The network management service 112 can query each of the devices 1202-1218 as well as the content service 114 for a listing of portions each stores, or the devices 1202-1218 as well as the content service 114 can provide an indication to the network management service 112 whenever there is a change to which portions of which protected content each stores. For example, if a portion of protected content is newly obtained by the device 1214, the device 1214 can notify the network management service 112 that it now stores that newly obtained portion of protected content.

When a device 1204-1212 desires a particular portion of protected content, the device sends a request to the network management service 112 for the location of the portion of protected content. In response to the request, the network management service 112 provides to the device an indication of one or more locations or sources of the portions. The locations or sources can include an identifier of or path to the portion in the content service 114, one or more routes to the portion in the managed wireless distribution network 1202, one or more identifiers (e.g., Internet protocol (IP) addresses) of devices 1214-1218 that store the portion, or combinations thereof.

Given the sources or locations of a portion of protected content, the device can proceed to obtain the portion from any of these different sources or locations as desired by the device. Various different rules or criteria can be used by the device to determine which source or location the portion is obtained from, or alternatively used by the network management service 112 to identify a particular source or location of the portion and provide an indication of the identified source or location to the device (so that the device can obtain the portion from the identified source or location). The rules or criteria can be based on, for example, attempting to avoid using the network 118. For example, routes to the portion in managed wireless distribution network 1202 are selected over routes to content service 114 or devices 1214-1218. By way of another example, the rules or criteria can be based on attempting to avoid accessing the content service 114, so routes to the portion on devices 1214-1218 are selected over routes to the content service 114.

Protected Content Seeding

The network management service 112 can instruct different devices in the managed wireless distribution network 102 to host different portions of protected content based on various criteria such as current or expected popularity of protected content. For example, a movie that has been retrieved from the content service 114 with greater than a threshold frequency or more than a threshold number of times can be protected content that currently has a high popularity. By way of another example, a movie release or a game release scheduled for three days in the future can be protected content that is expected to have high popularity. Portions of protected content provided to various devices in the managed wireless distribution network based on such criteria (e.g., current or expected popularity of protected content), as opposed to portions of protected content provided to various devices in response to requests to consume protected content on the devices, is referred to as seeding the protected content or portions of protected content.

Various different rules or criteria, or combinations thereof, can be used to determine which devices are to be instructed to host which portions of which protected content. These rules or criteria can include topology analysis, which the network management service 112 uses to ensure that portions of the protected content are close to (e.g., within a threshold number of hops of) at least a threshold number of different devices in the managed wireless distribution network 102. These rules or criteria can also include protected content density, which the network management service 112 uses to prevent more than a threshold number of copies of each portion of protected content from being hosted close to (e.g., within a threshold number of hops of) at least a threshold number of different devices in the managed wireless distribution network 102.

These rules or criteria can include network connectivity, which the network management service 112 uses to ensure that portions of the protected content are hosted on devices that are powered on and participating in the managed wireless distribution network 102 at least a threshold percentage of the time. These rules or criteria can include protected content popularity, which the network management service 112 uses to keep portions of protected content that has a higher popularity on different devices in the managed wireless distribution network 102 than protected content that has a lower popularity.

These rules or criteria can include protected content predicted popularity, which the network management service 112 uses to keep portions of protected content that has a higher predicted future popularity on different devices in the managed wireless distribution network 102 than protected content that has a lower predicted future popularity. These rules or criteria can include protected content consumption trend analysis, which the network management service 112 uses to determine how many of which portions of protected content to keep in the managed wireless distribution network 102 based on the manner in which the protected content tends to be consumed (e.g., the whole movie is watched, the first ten minutes of the movie is watched and then turned off, and so forth).

Additionally, similar to the discussions above, devices in the managed wireless distribution network 102 can select portions to host rather than being instructed by the network management service 112 which portions to host. Each device can then announce to (e.g., send a message to) other devices in the managed wireless distribution network 102 the portions that the device hosts. The devices can thus collectively operate to host all of the portions of the protected content, with each device determining to host one or more portions that are not already hosted by another device in the managed wireless distribution network 102.

When seeding portions of protected content, the devices hosting the portions of protected content can use different methods to acquire the protected content from different sources (e.g., acquiring the protected content from another device in the managed wireless distribution network, acquiring the protected content from another device via a P2P network, acquiring the protected content from a content service, and so forth). Different acquisition rules or criteria, or combinations thereof, can be used in determining the method to use to acquire protected content, and these acquisition rules or criteria can be applied by the network management service 112 or the devices hosting the portions of protected content.

These acquisition rules or criteria can include a time reduction, so that the devices hosting the portions of protected content obtain the protected content as quickly as they can (or in less than a threshold amount of time). Thus, for each device the faster of the acquisition methods is used to obtain the one or more portions hosted by the device. These acquisition rules or criteria can include a monetary reduction, so that the devices hosting the portions of protected content obtain the protected content at a lowest monetary cost (or with less than a threshold monetary cost). Thus, for each device the financially cheaper of the acquisition methods is used to obtain the one or more portions hosted by the device.

These acquisition rules or criteria can include a bit cap reduction, so that the devices hosting the portions of protected content obtain the protected content using a small amount of a data bit cap (a limit on how much data the device can obtain over a particular amount of time) as they can (or using less than a threshold amount of a data bit cap). Thus, for each device the acquisition method that uses the smallest amount of data as applied towards the data bit cap is used to obtain the one or more portions hosted by the device.

These acquisition rules or criteria can include a hard disk usage reduction, so that the devices hosting the portions of protected content use a small amount (or less than a threshold amount) of hard disk storage space. Thus, for each device, the device hosts a portion of protected content only if the portion of protected content uses a small amount (or less than the threshold amount) of hard disk storage space on the device. These acquisition rules or criteria can include a device noise reduction, so that hard disks (or other storage devices that generate at least a threshold amount of noise when used) on particular devices hosting the portions of protected content are not used. Thus, for each particular device, the device hosts a portion of protected content only if it can store portion of protected content without using the hard disk (or otherwise not exceeding the threshold amount of noise).

These acquisition rules or criteria can include a time range, so that the devices hosting the portions of protected content obtain the protected content during only one or more specified time ranges (e.g., specified for a device by a user of the device). Thus, for each device the device hosts a portion of protected content only if the protected content can be acquired by the device during a specified time range. A time range can be, for example, a range beginning when the device has been idle for a threshold amount of time and ending when the device is no longer idle (e.g., a user begins consuming protected content on the device), a particular time range (e.g., between 2 pm and 7 am), and so forth.

Accelerated Protected Content Delivery

Situations can arise in which multiple devices in the managed wireless distribution network 102 are managed or controlled by the same user. For example, a user may have multiple devices in his or her home, such as two different game consoles. These multiple devices can be leveraged to increase the speed at which protected content can be obtained by the device on which the user is consuming the protected content.

The multiple devices managed or controlled by the user are configured or otherwise instructed to cooperate to obtain particular portions of protected content. This configuration or instruction can be provided in various manners, such as the user setting of a preference value or configuration setting, user selection of a collaboration option on the devices, direction from the network management service 112, and so forth.

The multiple cooperating devices each connect to a different wireless network in the managed wireless distribution network 102 to obtain different ones of the desired portions of protected content. One of the multiple cooperating devices (e.g., the device on which the protected content is to be consumed) can direct or manage obtaining the protected content, directing others of the multiple cooperating devices as to which portions of the protected content to obtain (and optionally changing which portions particular devices are to obtain based on how quickly ones of the multiple cooperating devices obtained previous portions). For example, referring to FIG. 2, the devices 204 and 208 may be cooperating, with the device 204 joining the wireless network 212 to obtain some portions of the protected content from the device 202, and the device 208 joining the wireless network 216 to obtain some portions of the protected content from the device 206. After the portions are obtained by the multiple cooperating devices, the cooperating devices rejoin the same wireless network as appropriate. The device on which the protected content is being consumed then obtains, via the wireless network, the portions of protected content obtained by the other of the cooperating devices.

Alternatively, the network management service 112 can indicate to each of the multiple cooperating devices which portion of the protected content the device is to obtain. The network management service 112 can provide the indication to each of the multiple cooperating devices individually, or alternatively via one of the multiple cooperating devices (e.g., the device on which the protected content is to be consumed).

It should be noted that it is assumed that multiple cooperating devices are in close proximity, and have increased wireless signal strength and reliability relative to other devices in the managed wireless distribution network. The multiple cooperating devices obtain the portions of protected content via different wireless networks, and then the device on which the protected content is being consumed obtains from the cooperating devices the portions that the cooperating devices obtained. Overall speed of retrieval of the portions of the protected content by the multiple cooperating devices is increased (e.g., the speed at which the portions become stored on devices in the user's house is increased). Further, given the increased wireless signal strength and reliability, it is assumed that portions can be obtained by a device on which the protected content is being consumed from the other of the multiple cooperating devices more quickly than the portions could be obtained from other devices in the managed wireless distribution network.

Figure 13:
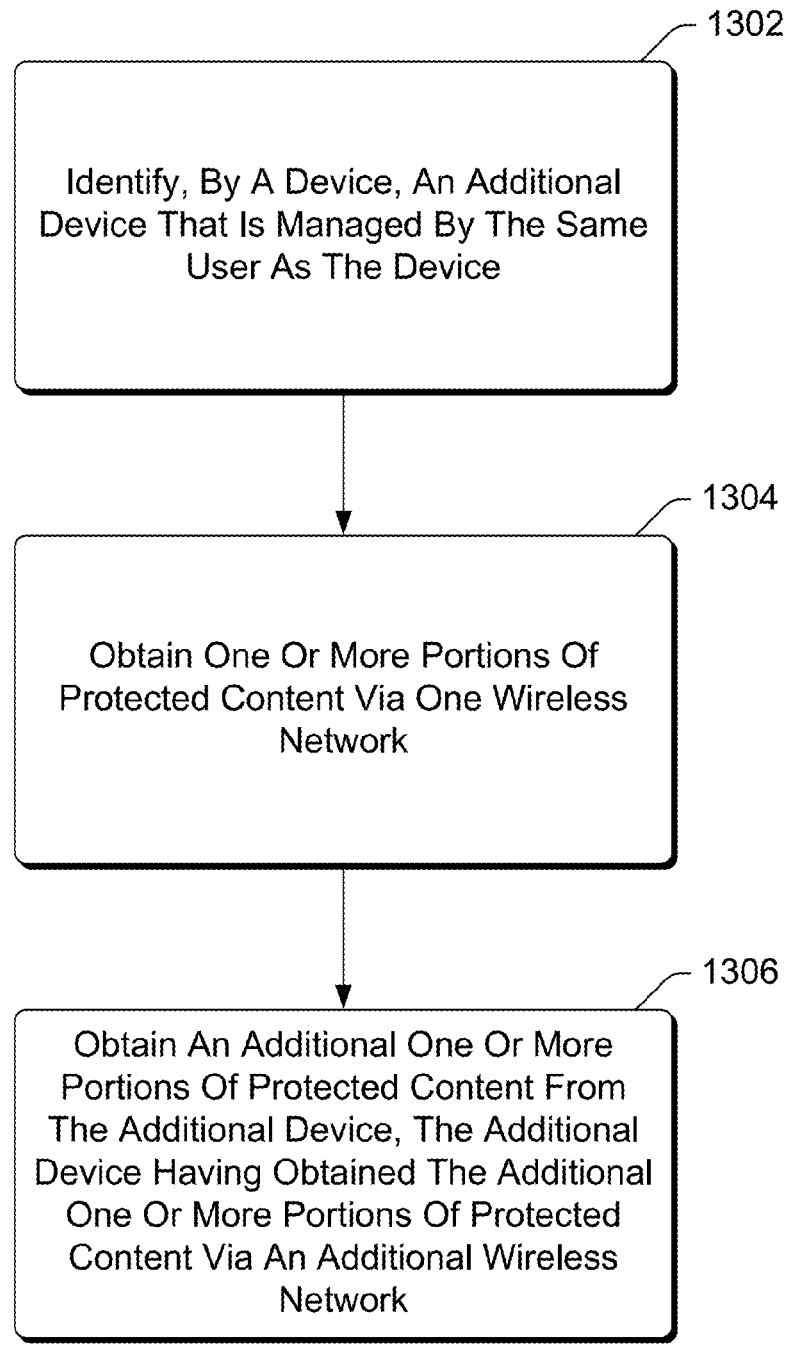
FIG. 13 is a flowchart illustrating an example process for devices cooperating to obtain protected content in accordance with one or more embodiments.

FIG. 13 is a flowchart illustrating an example process 1300 for devices cooperating to obtain protected content in accordance with one or more embodiments. Process 1300 is carried out by a device in a managed wireless distribution network, such as device 104 or 106 of FIG. 1, and can be implemented in software, firmware, hardware, or combinations thereof. Process 1300 is shown as a set of acts and is not limited to the order shown for performing the operations of the various acts. Process 1300 is an example process for devices cooperating to obtain protected content; additional discussions of devices cooperating to obtain protected content are included herein with reference to different figures.

In process 1300, a device identifies an additional device that is managed by the same user as the device (act 1302). The device identifying the additional device is the device implementing process 1300. The devices managed by the same user can be identified in various manners as discussed above, and can be, for example, multiple devices in the user's home.

The device obtains one or more portions of protected content via one wireless network (act 1304). The device can obtain the one or more portions from another device in the managed wireless distribution network, or alternatively from other sources as discussed above.

The device also obtains an additional one or more portions of the protected content from the additional device (act 1306). The additional device obtained the additional one or more portions of the protected content via an additional wireless network. The additional device can have obtained the additional one or more portions of the protected content from another device in the managed wireless distribution network, or alternatively from other sources as discussed above.

Thus, the device and the additional device cooperate, using different wireless networks to obtain different portions of protected content for the device.

Example System

Figure 14:
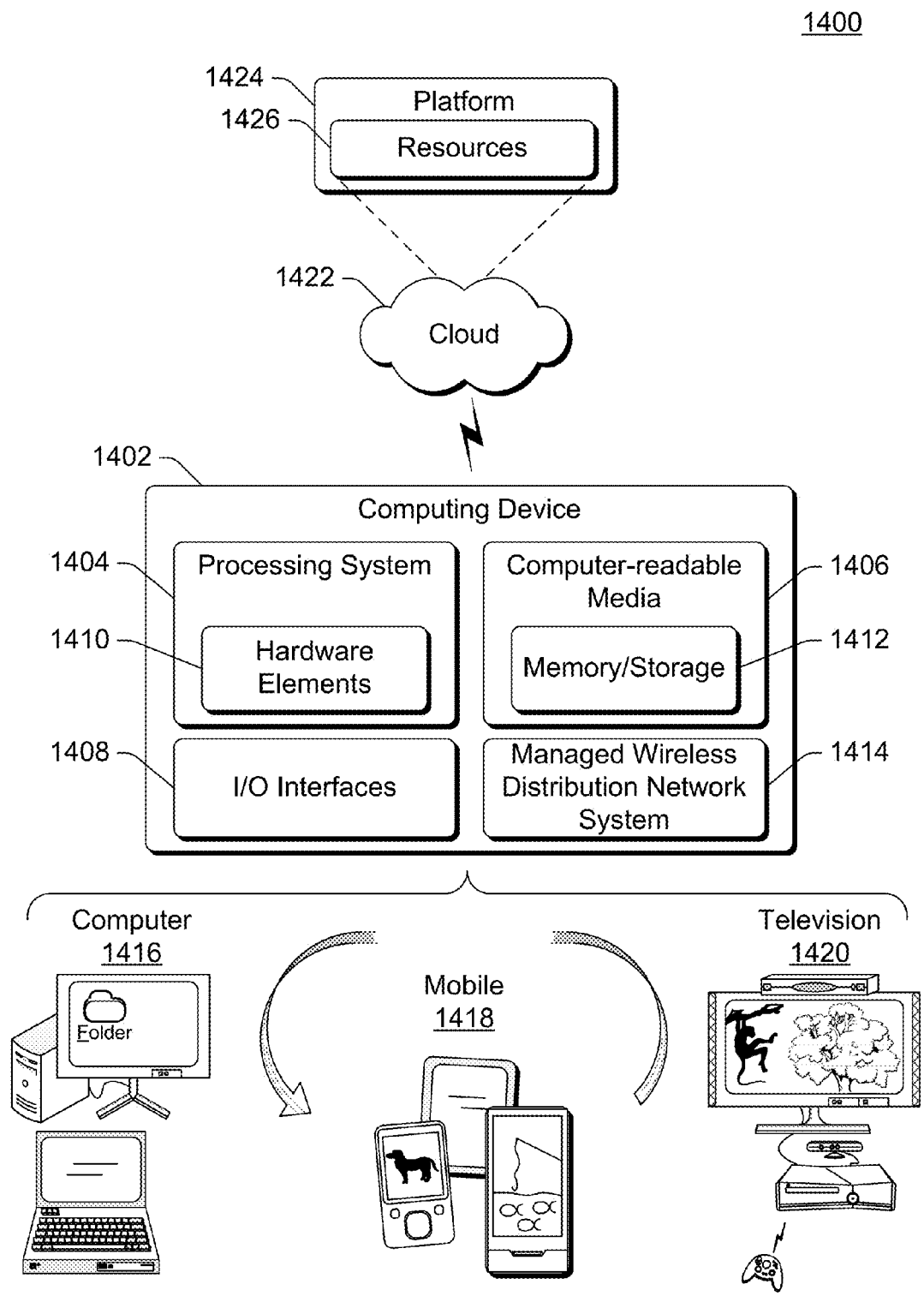
FIG. 14 illustrates an example system that includes an example computing device that is representative of one or more systems and/or devices that may implement the various techniques described herein.

FIG. 14 illustrates an example system generally at 1400 that includes an example computing device 1402 that is representative of one or more systems and/or devices that may implement the various techniques described herein. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O Interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Computing device 1402 also includes a managed wireless distribution network system 1414. Managed wireless distribution network system 1414 provides functionality supporting transferring portions of protected content via a managed wireless distribution network as discussed above. Managed wireless distribution network system 1414 can implement, for example, a managed wireless distribution network system 122 or 126 of FIG. 1, or at least part of a network management service 112 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules as a module that is executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1416, mobile 1418, and television 1420 uses. Each of these configurations includes devices that may have generally different constructs and capabilities, and thus the computing device 1402 may be configured according to one or more of the different device classes. For instance, the computing device 1402 may be implemented as the computer 1416 class of a device that includes a personal computer, desktop computer, a multi-screen computer, laptop computer, netbook, and so on.

The computing device 1402 may also be implemented as the mobile 1418 class of device that includes mobile devices, such as a mobile phone, portable music player, portable gaming device, a tablet computer, a multi-screen computer, and so on. The computing device 1402 may also be implemented as the television 1420 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. This functionality may also be implemented all or in part through use of a distributed system, such as over a "cloud" 1422 via a platform 1424 as described below.

The cloud 1422 includes and/or is representative of a platform 1424 for resources 1426. The platform 1424 abstracts underlying functionality of hardware (e.g., servers) and software resources of the cloud 1422. The resources 1426 may include applications and/or data that can be utilized while computer processing is executed on servers that are remote from the computing device 1402. Resources 1426 can also include services provided over the Internet and/or through a subscriber network, such as a cellular or Wi-Fi network.

The platform 1424 may abstract resources and functions to connect the computing device 1402 with other computing devices. The platform 1424 may also serve to abstract scaling of resources to provide a corresponding level of scale to encountered demand for the resources 1426 that are implemented via the platform 1424. Accordingly, in an interconnected device embodiment, implementation of functionality described herein may be distributed throughout the system 1400. For example, the functionality may be implemented in part on the computing device 1402 as well as via the platform 1424 that abstracts the functionality of the cloud 1422.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
identifying by a device multiple portions of protected content to host on the device, the multiple portions of protected content including one or more portions of each of one or more pieces of protected content;
obtaining the multiple portions of protected content;
storing the multiple portions of protected content on the device; and
allowing additional devices to obtain from the device at least one of the multiple portions of protected content regardless of whether the additional devices and respective users of the additional devices have permission to consume the protected content, the device as well as each of the additional devices being one of multiple devices in a managed wireless distribution network that allows portions of protected content to be transferred among the multiple devices, the device being configured to store portions of protected content that can be consumed by a user of the device only if the user of the device has permission to consume the protected content.

2. The method as recited in claim 1, the identifying comprising receiving an indication of the multiple portions from a network management service.

3. The method as recited in claim 1, the identifying comprising determining by the device which portions of which protected content are the multiple portions to host on the device.

4. The method as recited in claim 3, further comprising determining by the device how long to host each of the multiple portions of the protected content.

5. The method as recited in claim 1, further comprising:
receiving by the device a user request to consume particular protected content at the device;
determining an estimated time of delivery of the particular protected content, the estimated time of delivery comprising a time at which one or more portions of the particular protected content are estimated to be obtained by the device from one or more other devices in the managed wireless distribution network; and
displaying the estimated time of delivery.

6. The method as recited in claim 1, further comprising:
receiving by the device a user request to consume particular protected content at the device;
requesting assistance from one or more other devices in the managed wireless distribution network to obtain the particular protected content;
receiving some portions of the particular protected content from the one or more other devices in the managed wireless distribution network; and
receiving other portions of the particular protected content from a content service via the Internet.

7. The method as recited in claim 1, further comprising:
receiving by the device a portion of particular protected content being transferred through the managed wireless distribution network from a first other device in the managed wireless distribution network to a second other device in the managed wireless distribution network;
storing the portion of particular protected content in a memory of the device in the absence of saving the portion of particular protected content to a hard drive of the device; and
providing the portion of particular protected content to the second other device in the managed wireless distribution network.

8. The method as recited in claim 7, the storing comprising storing the portion of particular protected content in the memory of the device to allow the device to remain in a low power mode while receiving the portion of particular protected content from the first other device and providing the portion of particular protected content to the second other device.

9. The method as recited in claim 1, the managed wireless distribution network allowing the portions of protected content to be transferred among the multiple devices via multiple wireless networks, each of the multiple wireless networks comprising a Wi-Fi network.

10. The method as recited in claim 1, the device configured to store portions of protected content regardless of whether the device or the user of the device has permission to consume the protected content.

11. A device comprising:
a content store configured to store multiple portions of protected content on the device, the device being one of multiple devices in a managed wireless distribution network that allows portions of protected content to be transferred among the multiple devices, the device being configured to store portions of protected content that can be consumed by a user of the device only if the user of the device has permission to consume the protected content and to allow additional devices of the multiple devices to obtain from the device at least one of the multiple portions of protected content regardless of whether the additional devices and respective users of the additional devices have permission to consume the protected content; and
a managed wireless distribution network system configured to:
identify the multiple portions of protected content to host on the device, the multiple portions of protected content including one or more portions of each of one or more pieces of protected content;
obtain the multiple portions of protected content;
receive a user request to consume particular protected content at the device;
request assistance from one or more other devices in the managed wireless distribution network to obtain the particular protected content;
receive some portions of the particular protected content from the one or more other devices in the managed wireless distribution network; and
receive other portions of the particular protected content from a content service via the Internet.

12. The device as recited in claim 11, the device configured to store portions of protected content regardless of whether the device or the user of the device has permission to consume the protected content.

13. A device comprising:
- a content store to store multiple portions of protected content on the device, the device being one of multiple devices in a managed wireless distribution network that allows portions of protected content to be transferred among the multiple devices;
- a managed wireless distribution network system to identify the multiple portions of protected content to host on the device, the multiple portions of protected content including one or more portions of each of one or more pieces of protected content;
- a wireless network component to communicate with one or more other devices of the multiple devices to obtain the multiple portions of protected content and to allow each of the other devices to obtain at least one of the multiple portions of protected content regardless of whether the other device and a user of the other device has permission to consume the protected content; and
- a content consumption system to allow consumption of the protected content only in response to the device or a user of the device having permission to consume the protected content.

14. The device as recited in claim 13, the managed wireless distribution network system to identify the multiple portions of protected content by receiving an indication of the multiple portions from a network management service.

15. The device as recited in claim 13, the managed wireless distribution network system to identify the multiple portions of protected content by determining which portions of which protected content are the multiple portions to host on the device.

16. The device as recited in claim 15, the managed wireless distribution network system being further to determine how long to host each of the multiple portions of the protected content.

17. The device as recited in claim 13, the managed wireless distribution network system being further to:
- receive a user request to consume particular protected content at the device;
- determine an estimated time of delivery of the particular protected content, the estimated time of delivery comprising a time at which one or more portions of the particular protected content are estimated to be obtained by the device from one or more other devices in the managed wireless distribution network; and
- display the estimated time of delivery.

18. The device as recited in claim 13, the managed wireless distribution network system being further to:
- receive a user request to consume particular protected content at the device;
- request assistance from one or more other devices in the managed wireless distribution network to obtain the particular protected content;
- receive some portions of the particular protected content from the one or more other devices in the managed wireless distribution network; and
- receive other portions of the particular protected content from a content service via the Internet.

19. The device as recited in claim 13, the managed wireless distribution network system being further to:
- receive by the device a portion of particular protected content being transferred through the managed wireless distribution network from a first other device in the managed wireless distribution network to a second other device in the managed wireless distribution network;
- store the portion of particular protected content in a memory of the device without saving the portion of particular protected content to a hard drive of the device; and
- provide the portion of particular protected content to the second other device in the managed wireless distribution network.

20. The device as recited in claim 13, the device configured to store portions of protected content regardless of whether the device or the user of the device has permission to consume the protected content.

* * * * *